US012806915B2

(12) United States Patent
Tajima et al.

(10) Patent No.: US 12,806,915 B2
(45) Date of Patent: Nov. 24, 2026

(54) HEAD UNIT AND INKJET RECORDING APPARATUS

(71) Applicant: CANON KABUSHIKI KAISHA, Tokyo (JP)

(72) Inventors: Hiroki Tajima, Kanagawa (JP); Kyosuke Toda, Kanagawa (JP); Chiaki Muraoka, Saitama (JP); Yuji Tamaru, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 120 days.

(21) Appl. No.: 18/658,285

(22) Filed: May 8, 2024

(65) Prior Publication Data

US 2024/0375408 A1 Nov. 14, 2024

(30) Foreign Application Priority Data

May 11, 2023 (JP) ................................ 2023-078544

(51) Int. Cl.

*B41J 2/21* (2006.01)
*B41J 2/15* (2006.01)
*B41J 2/18* (2006.01)

(52) U.S. Cl.

CPC ............... *B41J 2/2103* (2013.01); *B41J 2/15* (2013.01); *B41J 2/18* (2013.01); *B41J 2/2117* (2013.01)

(58) Field of Classification Search

None
See application file for complete search history.

(56) References Cited

U.S. PATENT DOCUMENTS

| | | | | |
|---|---|---|---|---|
| 8,231,203 | B2 | 7/2012 | Akama et al. | |
| 10,144,219 | B2 | 12/2018 | Seki et al. | |
| 2021/0086521 | A1 * | 3/2021 | Suyama | B41J 2/175 |
| 2022/0016916 | A1 * | 1/2022 | Saito | B41J 2/2114 |
| 2023/0065145 | A1 * | 3/2023 | Ishigai | B41J 2/2114 |

FOREIGN PATENT DOCUMENTS

| | | | |
|---|---|---|---|
| JP | 2004-025603 | A | 1/2004 |
| JP | 2020-185737 | A | 11/2020 |

* cited by examiner

*Primary Examiner* — Alejandro Valencia
(74) *Attorney, Agent, or Firm* — Venable LLP

(57) ABSTRACT

A head unit includes a first head formed with a nozzle array that ejects a reaction liquid which reacts with at least one selected from the group consisting of a color ink and a white ink and a second head formed with a nozzle array that ejects the color ink and with a nozzle array that ejects the white ink. The first head and the second head are disposed to be arranged in a main scanning direction such that the nozzle array for the reaction liquid is located at a position closest to a first end portion which is one end portion of the head unit in the main scanning direction and that the nozzle array for the white ink is located at a position closest to a second end portion which is another end portion of the head unit in the main scanning direction.

18 Claims, 35 Drawing Sheets

HEAD UNIT AND INKJET RECORDING APPARATUS

BACKGROUND OF THE INVENTION

Field of the Invention

The present invention relates to a head unit and an inkjet recording apparatus.

Description of the Related Art

In the field of inkjet printers in recent years, to allow even a liquid-ejection-head-scanning-type liquid ejection apparatus to output a high-quality-image printed material, there has been a demand for an ink-circulation-type liquid ejection apparatus so as to allow a special ink to be used in order to conform to a higher-quality recording medium. In addition, to allow a higher image quality to be obtained, a configuration in which color inks are combined with a reaction liquid or a configuration in which a white ink is added is also considered.

In Japanese Patent Application Publication No. 2020-185737, an inkjet printer is described which uses UV-cured color inks, a white ink, and a clear ink. In an inkjet head portion in Japanese Patent Application Publication No. 2020-185737, nozzle arrays that eject the color inks and nozzle arrays that eject the white ink and the clear ink are disposed to be arranged along a main scanning direction, while being arranged to be displaced from each other in a sub-scanning direction. In the main scanning direction, the nozzle arrays for the color inks are disposed such that the nozzle arrays for the clear ink are interposed therebetween from both sides in the main scanning direction, and UV light irradiators are provided at both end portions of an inkjet head portion such that the nozzle arrays for the color inks are interposed therebetween from both sides in the main scanning direction. Thus, distances between the UV light irradiators and nozzles for the clear ink are ensured to inhibit the nozzles for the clear ink from being clogged due to stray light of irradiating light from the UV light irradiators.

Meanwhile, in Japanese Patent Application Publication No. 2004-25603, a printing method is described which applies color inks onto a medium to form a color image and is characterized by using a white ink in addition to the color inks. Besides, a printing method is known which applies a reaction liquid containing a component that increases a viscosity of an ink onto a recording medium before ink ejection to immediately fix the ink having reached the recording medium and thereby inhibits color mixture to improve an image quality. In addition, a configuration of a head unit can be considered in which a head for a white ink and a head for a reaction liquid are formed of respective single-color heads and arranged in combination with heads for other color inks in the main scanning direction.

In the inkjet printer in Japanese Patent Application Publication No. 2020-185737, heads for the color inks and a head for the white ink and the clear ink are arranged to be displaced from each other in the sub-scanning direction, and accordingly an increased size of a head unit in the sub-scanning direction presents a problem. Moreover, since the heads for the color inks are disposed on both sides of the head for the clear ink and the white ink in the main scanning direction, a carriage travel distance in a printing mode using neither the clear ink nor the white ink remains unchanged from a carriage travel distance in a printing mode using the clear ink and the white ink. Accordingly, there is room for improvement in throughputs of printing in the different printing modes. Meanwhile, in the head unit having the configuration in which the head for the white ink and the head for the reaction liquid are formed of the respective single-color heads and arranged in combination with the heads for the other color inks in the main scanning direction, the heads are easily replaceable, but an increased size of the head unit in the main scanning direction presents a problem.

SUMMARY OF THE INVENTION

The present invention achieves, in a head unit of an inkjet recording apparatus capable of recording using color inks, a white ink, and reaction liquids, both of a size reduction of the head unit and easy replacement of heads.

The present invention is a head unit of an inkjet recording apparatus, the head unit comprising a plurality of heads formed with nozzle arrays each including a plurality of nozzles that eject a liquid and performing recording by ejecting the liquid onto a recording medium, while reciprocating in a main scanning direction, wherein the plurality of heads includes:

a first head formed with a nozzle array that ejects a reaction liquid which reacts with at least one selected from the group consisting of a color ink and a white ink; and a second head formed with a nozzle array that ejects the color ink and with a nozzle array that ejects the white ink, and wherein the first head and the second head are disposed to be arranged along the main scanning direction such that the nozzle array for the reaction liquid is located at a position closest to a first end portion which is one end portion of the head unit in the main scanning direction and that the nozzle array for the white ink is located at a position closest to a second end portion which is another end portion of the head unit in the main scanning direction.

Further features of the present invention will become apparent from the following description of exemplary embodiments with reference to the attached drawings.

DESCRIPTION OF THE EMBODIMENTS

Figure 1:
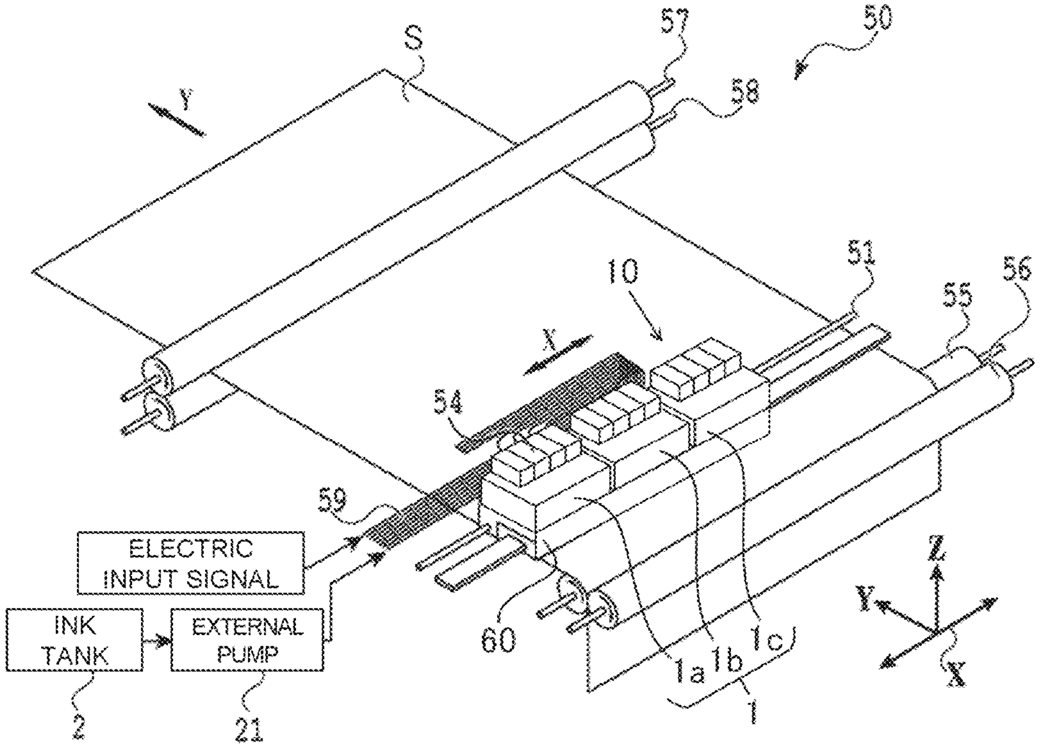
FIG. 1 is a schematic configuration diagram of a liquid ejection apparatus in each of embodiments.

Referring to the drawings, the following will illustratively describe modes for carrying out this invention in detail on the basis of embodiments. It should be noted that, unless particularly specified otherwise, the dimensions, materials, shapes, a relative arrangement, or the like of components described in the embodiments are not intended to limit the scope of this invention only thereto. In the present disclosure, each of "at least one of A or B" and "at least one of A and B" means "A, B, or A and B".

FIG. 1 is a schematic configuration diagram of a liquid ejection apparatus 50 (recording apparatus), which is inkjet recording apparatus using a head unit 10. The liquid ejection apparatus 50 in each of the embodiments is a serial-scan-type inkjet recording apparatus that ejects inks from the head unit 10 to record an image on a recording sheet S. The head unit 10 is mounted on a carriage 60, and the carriage 60 moves in a main scanning direction indicated by an arrow X along a guide shaft 51. The carriage 60 is reciprocated in the main scanning direction X by a carriage motor 105 (see FIG. 12) which is a drive unit provided in the liquid ejection apparatus 50. The recording sheet S is conveyed by conveying rollers 55, 56, 57, and 58 in a sub-scanning direction indicated by an arrow Y and crossing (in a case of the present embodiment, perpendicular to) the main scanning direction.

The head unit 10 includes a plurality of liquid ejection heads 1 (e.g., a first head 1*a*, a second head 1*b*, and a third head 1*c*), and the plurality of liquid ejection heads 1 are disposed to be arranged along the main scanning direction. Over the plurality of liquid ejection heads 1, circulation units 54 are mounted to perform ink circulation on a per-ink basis. While FIG. 1 illustrates a configuration in which the head unit 10 includes the three liquid ejection heads 1 by way of example, this is exemplary illustration, and the number of the liquid ejection heads 1 included in the head unit 10 is not limited thereto.

Additionally, in the liquid ejection apparatus 50, ink tanks 2 each serving as an ink supply source and external pumps 21 are provided, and inks stored in the ink tanks 2 are supplied to the circulation units 54 by drive forces of the external pumps 21 via ink supply tubes 59. Each of the ink supply tubes 59 includes electric wiring required for printing and tubing that supplies air to the head unit 10 and to the carriage 60. The head unit 10 is capable of high-image-quality full-color printing using reaction liquids, a white ink, and a plurality of color inks. Each of the reaction liquids contains a component that increases a viscosity of an ink, and is applied onto the recording sheet S before ink ejection to be able to immediately fix the ink having reached the recording sheet S, inhibit color mixture, and provide a higher image quality. In the following description, the reaction liquids, the white ink, and the color inks may be generally referred to simply as the inks. In a case where a cap member is disposed at a position deviated from a conveyance path for the recording sheet S and a recording operation is not performed, the cap member relatively moves to a position where a face surface of the head unit 10 is covered therewith to prevent ejection ports from drying or perform a sucking operation for filling and recovery.

Figure 2A:
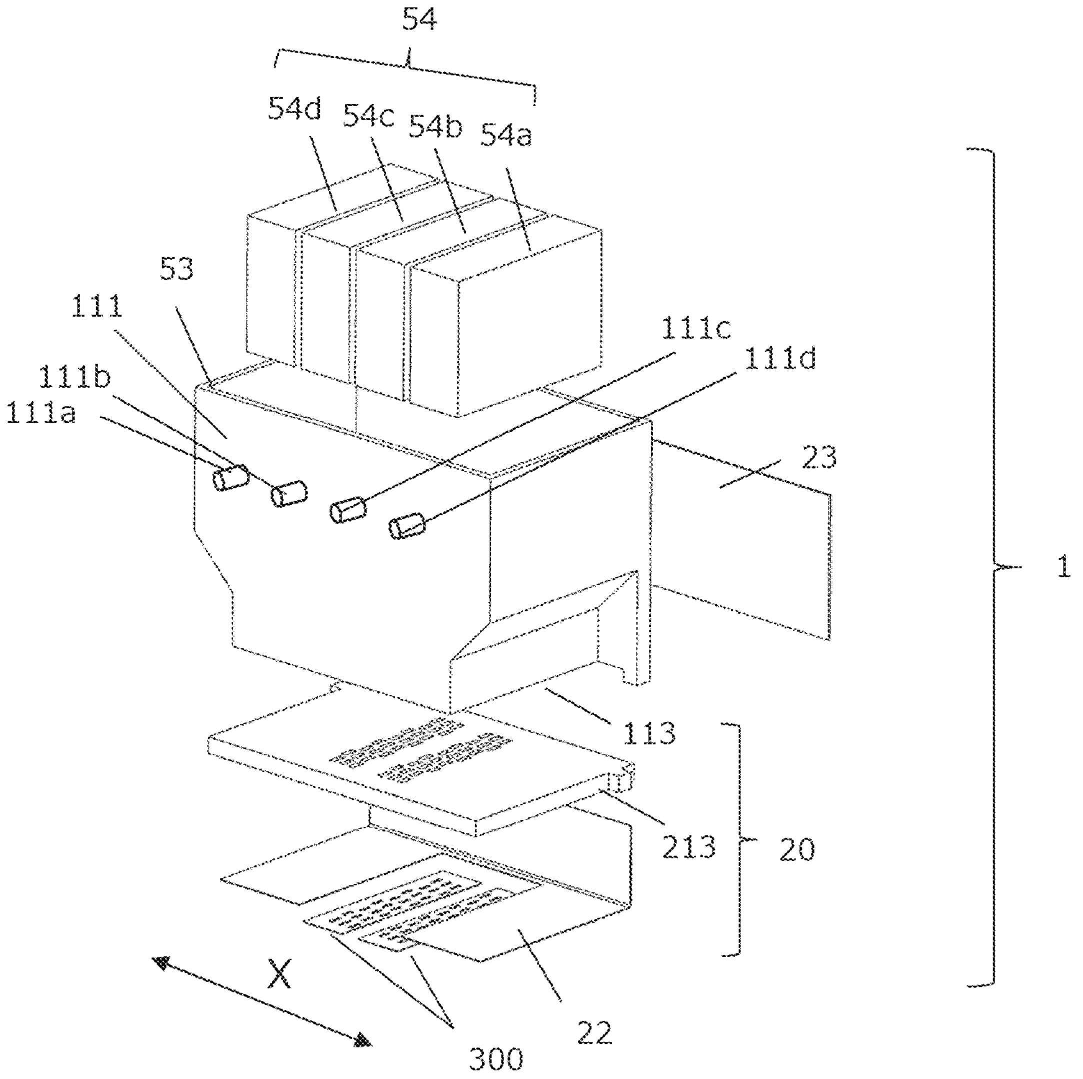
FIG. 2A is an exploded perspective view of a liquid ejection head in the embodiment.
Figure 2C:
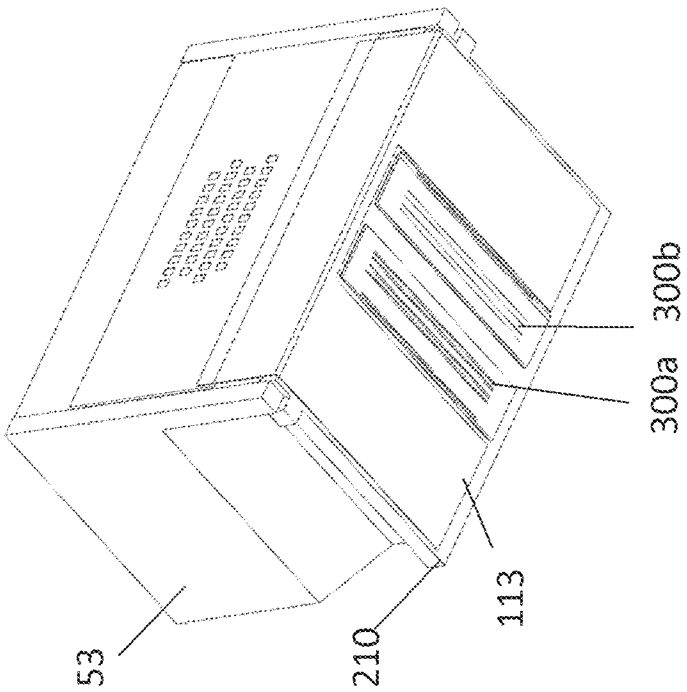
FIG. 2B and FIG. 2C are perspective views of the liquid ejection head in the embodiment.
Figure 2B:
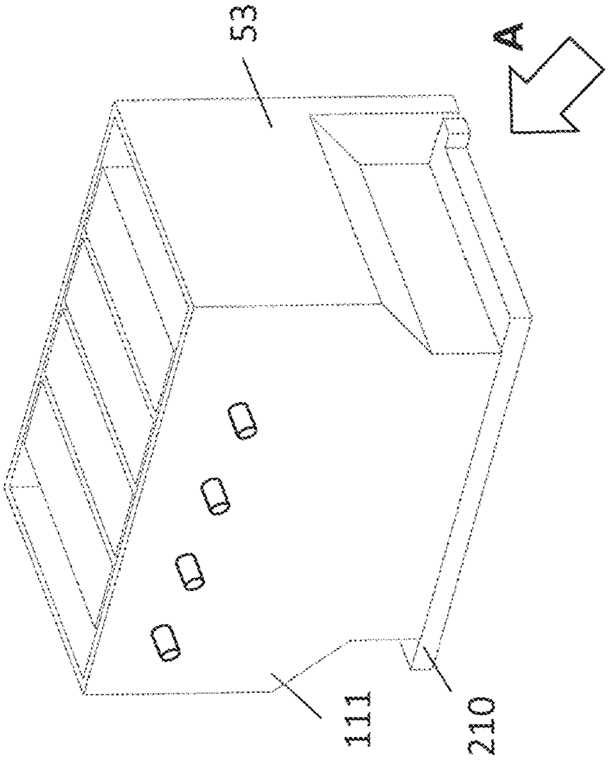

FIG. 2A illustrates an exploded perspective view of the liquid ejection head 1. FIG. 2B is a perspective view of a state where individual components are assembled, while FIG. 2C illustrates a view taken along an arrow A in FIG. 2B. The liquid ejection head 1 has the circulation units 54 which are circulation devices that supply liquids to ejection ports 331 (see FIG. 10A, FIG. 10B, and FIG. 11A to FIG. 11C) that eject the liquid, while collecting the liquid that has not been ejected from the ejection ports 331 and supplying the collected liquid to the ejection ports 331 again. The circulation units 54 correspond to individual inks, and accordingly the number of the circulation units 54 to be mounted is determined according to ink types. In each of the embodiments, a configuration including, e.g., four-color circulation units 54*a*, 54*b*, 54*c*, and 54*d* is provided. Each of the circulation units 54*a* to 54*d* is connected to a head housing 53.

The head housing 53 has a joint surface 111 for receiving the inks from the liquid ejection apparatus 50, and the joint surface 111 has joints 111*a*, 111*b*, 111*c*, and 111*d* communicating with the respective circulation units 54*a* to 54*d*. When the liquid ejection head 1 is attached to the liquid ejection apparatus 50, supply tubes (not shown) corresponding to the individual inks are connected to the respective joints 111*a* to 111*d* from the liquid ejection apparatus 50 side. The individual inks supplied from the ink tanks 2 provided in an apparatus main body of the liquid ejection apparatus 50 via the supply tubes pass through the respective joints 111*a* to 111*d* of the head housing 53 to be supplied to the respective circulation units 54*a* to 54*d*.

Figure 10A:
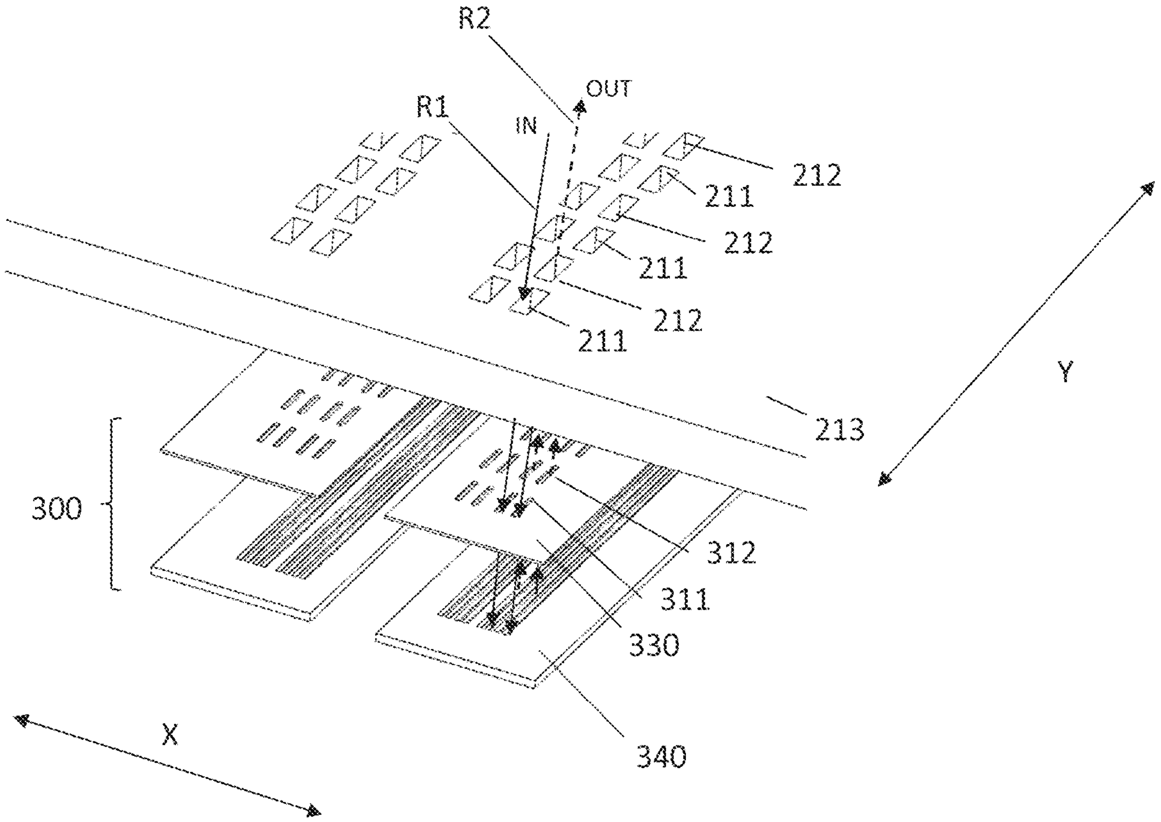
FIG. 10A is a diagram illustrating ink flows in an ejection unit in each of the embodiments.

In the head housing 53, a wiring substrate 23 (PWB) that receives an electric signal from the main body of the liquid ejection apparatus 50 is provided. To a bottom surface 113 of the head housing 53, a support member 213 on which an ejection module 300 (including an aperture plate 330 and a recording element substrate 340, as illustrated in FIG. 10A) (described later) is mounted is connected. In the embodiment, as illustrated in FIG. 2C, on the bottom surface 113 of the head housing 53, two ejection modules 300*a* and 300*b* are provided. In the ejection module 300, nozzle arrays 332 (see FIG. 10A and FIG. 10B), each including the plurality of ejection ports (nozzles) 331 (see FIG. 11A to FIG. 11C) that eject the liquid, are formed. The nozzle arrays 332 extend in the Y-direction, and the plurality of nozzle arrays 332 are disposed to be arranged in an X-direction. The head unit 10 has the plurality of liquid ejection heads 1 formed with the nozzle arrays 332, and performs recording by ejecting the liquid onto the recording sheet S serving as a recording medium, while reciprocating along the main scanning direction X. The ejection module 300, the support member 213, and an electric wiring member 22 (FPC) form an ejection unit 20. The ejection unit 20 and the head housing 53 form each of the liquid ejection heads 1.

Figure 11A:
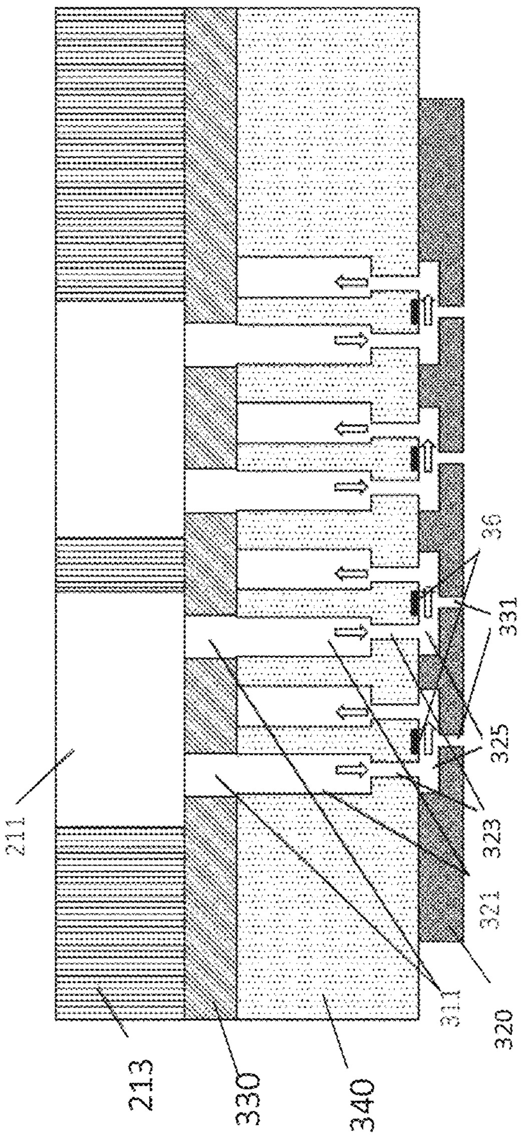
FIG. 11A and FIG. 11B are schematic cross-sectional views of the ejection unit in the embodiment.
Figure 11B:
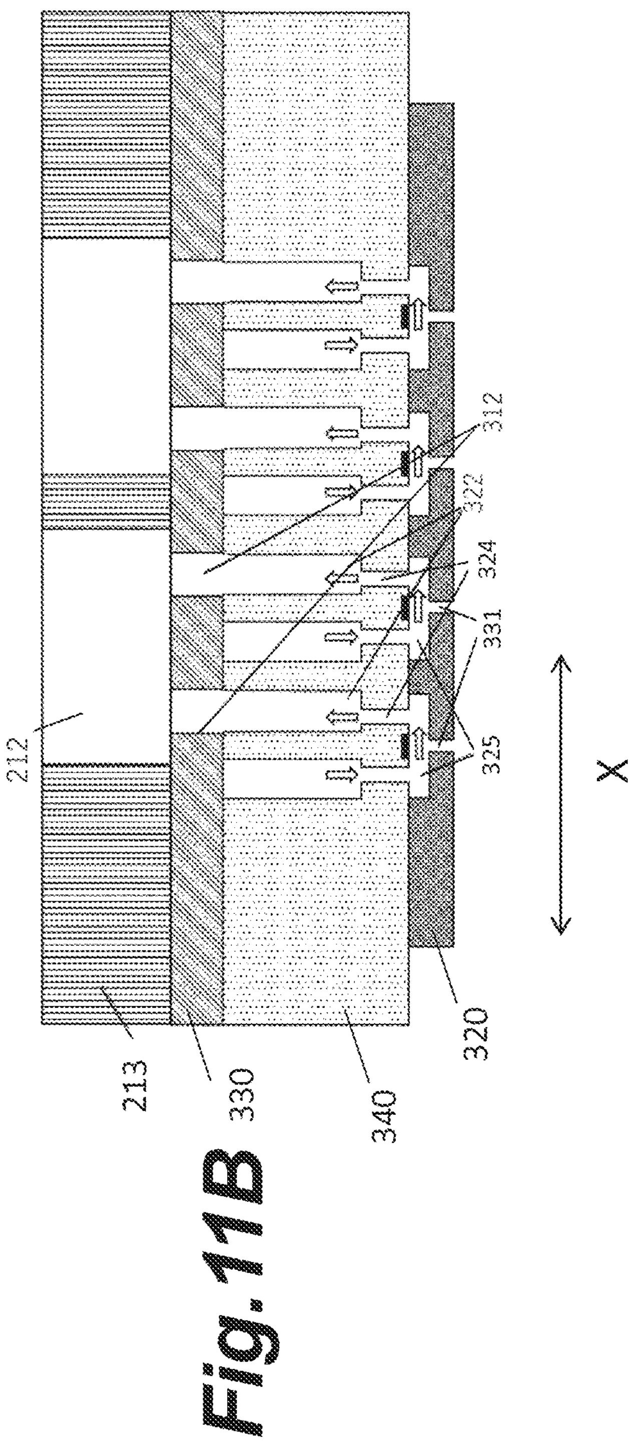

Each of the inks supplied to the circulation units 54*a* to 54*d* passes through the head housing 53 to be supplied to the support member 213. The ejection module 300 and the support member 213 are bonded together with an adhesive. The ejection module 300 includes a silicon substrate having a thickness of 0.5 to 1 mm and an energy generation element provided on one surface of the silicon substrate to eject the liquid. As illustrated in FIG. 11A and FIG. 11B, in the embodiment, a plurality of heat generating resistive elements 36 (heaters) are each used as the energy generation element, and electric wiring that supplies electric power to each of the heat generating resistive elements 36 is formed on the silicon substrate by a deposition technique. In the silicon substrate, a plurality of pressure chambers 325 corresponding to the heat generating resistive elements 36 and the plurality of ejection ports 331 that eject the inks are formed by a photolithographic technique. At a back surface of the silicon substrate, common supply flow paths 321 and a plurality of plate supply ports 311, which supply the inks to the plurality of pressure chambers 325, common collection flow paths 322 and a plurality of plate collection ports 312, which collect the inks from the pressure chambers 325, are opened.

Figure 10B:
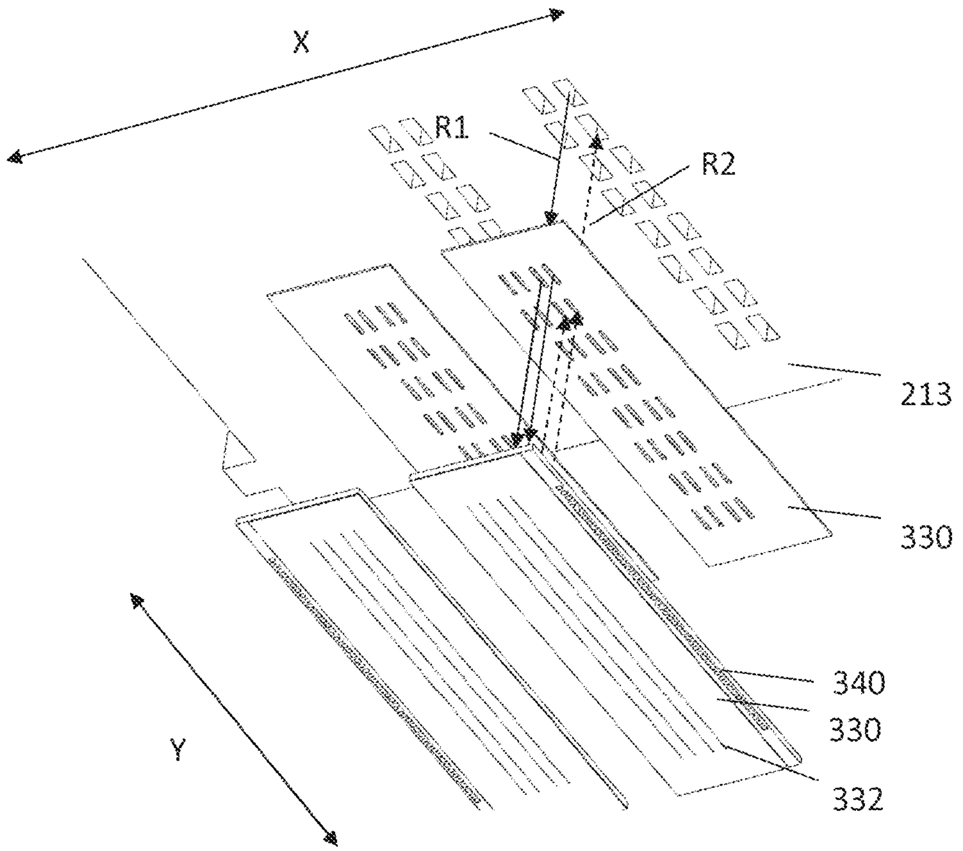
FIG. 10B is a diagram illustrating ink flows in the ejection unit in each of the embodiments.

Referring to FIG. 10A and FIG. 10B, a description will be given of ink flows in the ejection unit 20. FIG. 10A is an exploded perspective view obtained by viewing the ejection unit 20 from the support member 213 side, while FIG. 10B is an exploded perspective view obtained by viewing the ejection unit 20 from the recording element substrate 340 side. For the sake of simplification, a connection substrate and an electric substrate are omitted. The ink flows for only one color will be described, but the same applies also to another color. An ink flow path in the ejection unit 20 includes the support member 213 and the ejection module 300. The ejection module 300 includes the aperture plate 330 and the recording element substrate 340. On a surface of the recording element substrate 340 which is opposite to the aperture plate 330, a nozzle plate 320 formed with the ejection ports 331 is provided. To a surface of the recording element substrate 340 which is opposite to the nozzle plate 320, the aperture plate 330 is connected. A surface of the aperture plate 330 which is opposite to the recording element substrate 340 is joined to the support member 213. Thus, the ejection module 300 is fixed to the support member 213.

Arrows R1 and R2 illustrated in FIG. 10A and FIG. 10B indicate the ink flows between the support member 213, the aperture plate 330, and the recording element substrate 340. The solid-line arrow R1 indicates the ink flow to be supplied to the recording element substrate 340, while the broken-line arrow R2 indicates the ink flow to be collected from the recording element substrate 340 to the support member 213 side. In the aperture plate 330, the plate supply ports 311 and the plate collection ports 312 are provided. In the support member 213, support member supply ports 211 and support member collection ports 212 are provided. The supply ink flow indicated by the arrow R1 passes through the support member supply ports 211 and the plate supply ports 311, while the collection ink flow indicated by the arrow R2 passes through the plate collection ports 312 and the support member collection ports 212.

FIG. 11A illustrates a schematic cross-sectional view along a cross section of a portion with the plate supply ports 311 which is perpendicular to the Y-direction, while FIG. 11B illustrates a schematic cross-sectional view along a cross section of a portion with the plate collection ports 312 which is perpendicular to the Y-direction. Note that a description will be given of the ink flow using one of the opening portions of each of the members, but the ink flow is the same in any opening. First, the ink is supplied from the head housing 53 side to the support member supply port 211 of the support member 213, and then the ink is supplied from the support member supply port 211 to the common supply flow paths 321 of the recording element substrate 340 via the plate supply port 311. Subsequently, the ink is supplied from the common supply flow paths 321 to the pressure chamber 325 via supply connection flow paths 323. Next, a description will be given of a collection flow. Of the ink supplied to the pressure chamber 325, the ink that has not been ejected from the ejection port 331 flows to the common collection flow paths 322 via collection connection flow paths 324. Then, the ink flows from the common collection flow paths 322 to the support member collection ports 212 of the support member 213 via the plate collection ports 312 of the aperture plate 330 to be subsequently collected to the head housing 53 side.

As illustrated in FIG. 11A and FIG. 11B, such ink flows connecting the support member 213, the common supply flow paths 321, and the common collection flow paths 322 are formed where the plate supply ports 311 and the plate collection ports 312 are present. Note that another region where the plate supply ports 311 and the plate collection ports 312 are not present serves as a region separating the support member supply ports 211 and the support member collection ports 212 from each other in the support member

Figure 11C:
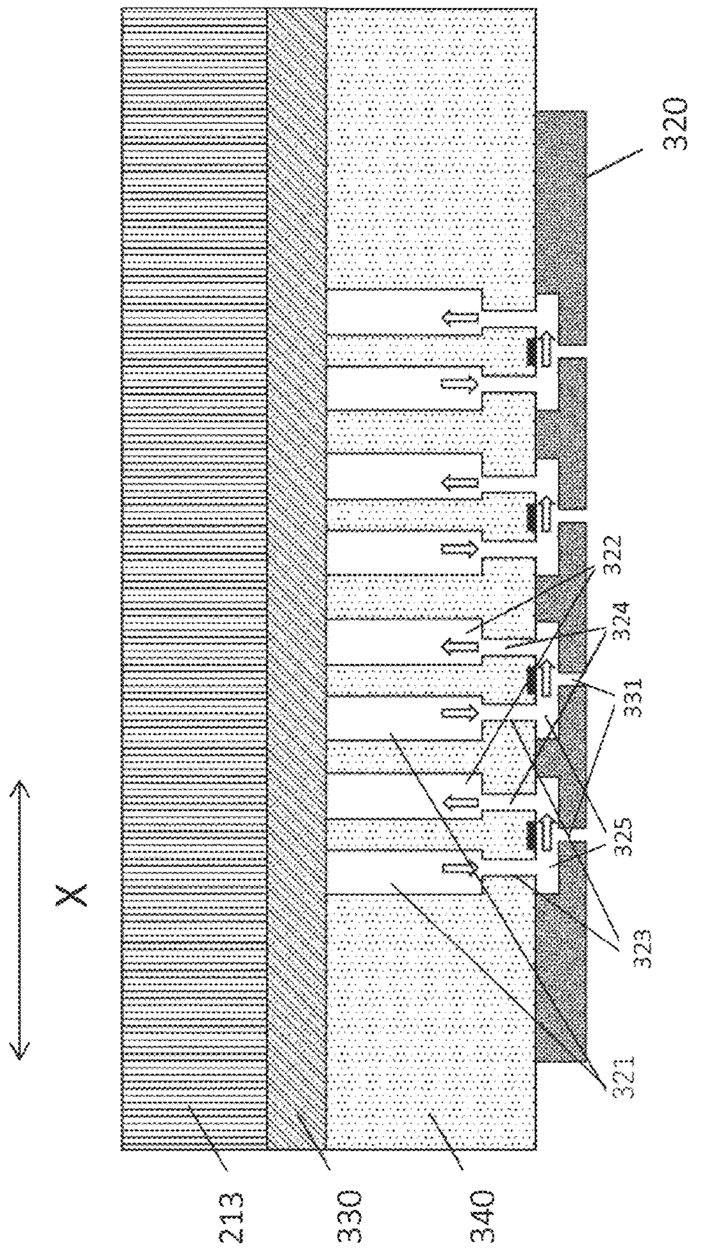
FIG. 11C is a schematic cross-sectional view of the ejection unit in the embodiment.

213. This region is used as an adhesive region in a case where the ejection module 300 and the support member 213 are bonded together, and accordingly even the support member 213 has no opening. Consequently, in such a region where the plate openings and the support member openings are not present, as illustrated in FIG. 11C, there is no direct connection between the ink in the common supply flow paths 321 and the common collection flow paths 322 and the ink in the support member 213 and on the head housing 53 side.

As the ink flows, the ink in the support member 213 is supplied from portions where the plate supply ports 311 are open, as illustrated in FIG. 11A. The ink further flows from the supply connection flow paths 323 into the pressure chambers 325 to flow to the common collection flow paths 322 via the collection connection flow paths 324. As in the cross section in FIG. 11A, at this time, the plate collection ports 312 are not present on the common collection flow path 322 side. Accordingly, the ink flows once in a region where the aperture plate 330 has no opening as illustrated in FIG. 11C and, when the ink reaches a region where the plate collection ports 312 are present as in FIG. 11B, the ink flows flowing to the common collection flow paths 322 are formed.

As also described above, the common supply flow paths 321 and the common collection flow paths 322 are the flow paths separate from each other. The common supply flow paths 321 have the supply connection flow paths 323 that supply the ink to the ejection ports 331, while the common collection flow paths 322 have the collection connection flow paths 324 that collect the ink from the ejection ports 331. In other words, the ejection ports 331 are present in routes connecting the supply connection flow paths 323 and the collection connection flow paths 324, and consequently the ink flows flowing from the supply connection flow path 323 side to the collection connection flow path 324 side are generated in the pressure chambers 325 in the vicinity of the ejection ports 331. This ink circulation can maintain the ink in each of the pressure chambers 325 in a constantly fresh state and prevent problems such as a concentration change and sticking due to ink evaporation in advance.

First Embodiment

Figure 3:
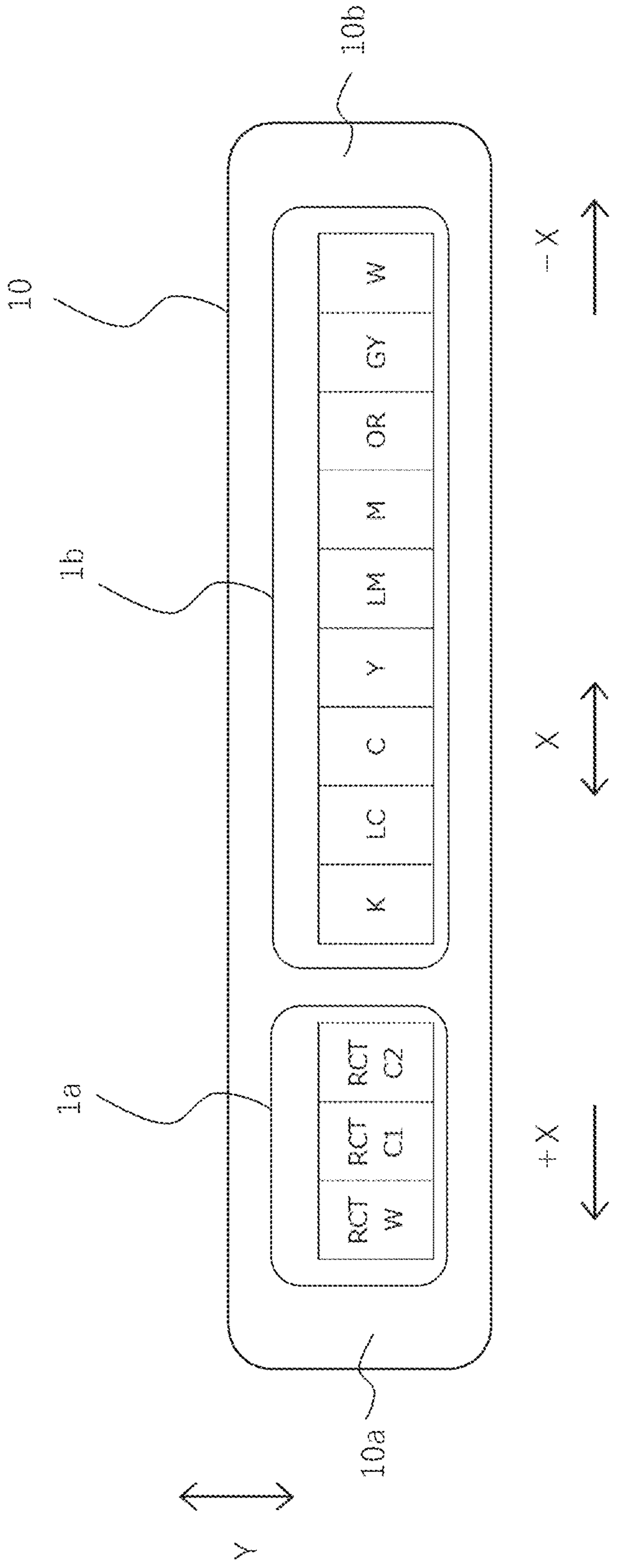
FIG. 3 is a schematic diagram of a head unit in the first embodiment.

Referring to FIG. 3, FIG. 4A to FIG. 4D, and FIG. 5A and FIG. 5B, a description will be given of the first embodiment. FIG. 3 is a schematic diagram obtained by viewing the head unit 10 from above an upper surface (ink ejection side) of the liquid ejection apparatus 50. The head unit 10 includes the first head 1*a* and the second head 1*b* which are disposed to be arranged in the main scanning direction. It is assumed that one end portion (+X-direction-side end portion) of the head unit 10 in the main scanning direction X is a first end portion 10*a*, while another end portion (−X-direction-side end portion) thereof in the main scanning direction X is a second end portion 10*b*. The second head 1*b* is disposed closer to the second end portion 10*b* than the first head 1*a*.

The first head 1*a* is a head formed with the nozzle array 332 for a reaction liquid that reacts with at least one selected from the group consisting of the color inks and the white ink. In other words, the reaction liquid reacts with at least one elected from the group consisting of the color inks, such as a C ink, a M ink, and a Y ink, and the white ink. In the first embodiment, the first head 1*a* is the head exclusively for the reaction liquids which is formed with the nozzle array 332 that ejects a white-ink reaction liquid RCTW and with the nozzle arrays 332 that eject color-ink reaction liquids RCTC1 and RCTC2. The second head 1*b* is the head formed with the nozzle arrays 332 that eject the color inks and the nozzle array 332 that ejects the white ink. In the first embodiment, the second head 1*b* is formed with the nozzle arrays 332 that eject the individual inks in black K, light cyan LC, cyan C, yellow Y, light magenta LM, magenta M, orange OR, gray GY, and white W.

In the first head 1*a*, at a position closest to the first end portion 10*a*, the nozzle array 332 for the white-ink reaction liquid RCTW is formed. In the second head 1*b*, at a position closest to the second end portion 10*b*, the nozzle array 332 for the white ink W is formed.

The first head 1*a* and the second head 1*b* are disposed such that, at the position in the head unit 10 which is closest to the first end portion 10*a*, the nozzle array 332 for reaction liquid RCT is located and, at the position therein which is closest to the second end portion 10*b*, the nozzle array 332 for the white ink W is located. In the first embodiment, when the first head 1*a* and the second head 1*b* are arranged in the main scanning direction, at the both ends of the head unit 10, the respective nozzle arrays 332 for the white-ink reaction liquid RCTW and for the white ink W are disposed, respectively.

Note that the first head 1*a* may have a configuration formed only with the nozzle arrays 332 for the color-ink reaction liquids RCTC or may also have a configuration formed only with the nozzle array 332 for the white-ink reaction liquid RCTW. When the first head 1*a* is formed with the nozzle arrays 332 for the color-ink reaction liquids RCTC and with the nozzle array 332 for the white-ink reaction liquid RCTW, either may be located at the position closest to the first end portion 10*a*. In addition, the types of the color inks and the order in which the color inks are arranged in the second head 1*b* are not limited to those in the example described above.

Since inks of the same type are collectively provided in one head and the first head 1*a* and the second head 1*b* are located at the same position in the sub-scanning direction Y, the carriage 60 can be reduced in size. In addition, since a travel range of the carriage 60 is reduced, the liquid ejection apparatus 50 can be reduced in size. Moreover, the first head 1*a* exclusively for the reaction liquids greatly affects the heat generating resistive elements 36 and has a short lifetime but, since the first head 1*a* is separated from the second head 1*b* for the main color inks, the first head 1*a* has an advantage of easy head replacement.

FIG. 4A to FIG. 4D are schematic diagrams illustrating respective travel ranges of the head unit 10 in individual printing modes. The liquid ejection apparatus 50 in the first embodiment can perform recording in any of the plurality of printing modes. The plurality of printing modes include first to fourth modes. In the first mode, recording is performed using the color inks, the white ink, the color-ink reaction liquids, and the white-ink reaction liquid. In the second mode, recording is performed using only the color inks and the color-ink reaction liquids. In the third mode, recording is performed using only the color inks and the white ink. In the fourth mode, recording is performed using only the color inks. The printing modes using the white ink are used in cases such as where recording is performed on the transparent recording sheet S. The printing modes using the reaction liquids are used in cases such as when high-image-quality recording is to be performed.

Figure 4A:
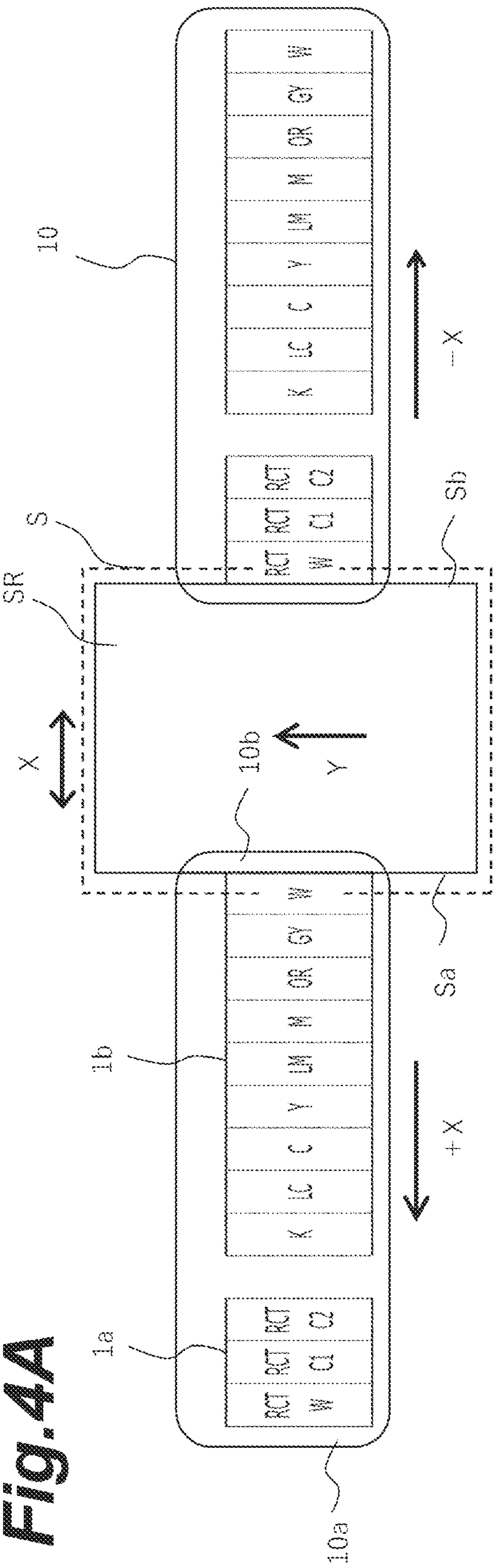
FIG. 4A and FIG. 4B are schematic diagrams illustrating respective travel ranges of the head unit in individual printing modes in the first embodiment.

FIG. 4A, FIG. 4B, FIG. 4C, and FIG. 4D illustrate the travel ranges of the head unit 10 when printing is performed respectively in the first, second, third, and fourth modes. It is assumed that a direction toward the first end portion 10*a* in the main scanning direction is an outward direction (+X-direction), while a direction toward the second end portion 10*b* in the main scanning direction is a return direction (−X-direction). It is assumed that, of a recording range SR in which recording is performed on the recording sheet S, an end portion closer to the first end portion 10*a* in the main scanning direction is a third end portion Sa and an end portion closer to the second end portion 10*b* is a fourth end portion Sb. Note that a broken line indicating the recording sheet S in FIG. 4A is omitted in FIG. 4B to FIG. 4D to avoid complicated illustration.

As illustrated in FIG. 4A, in the first mode, when the carriage 60 is moved in the +X-direction toward the first end portion 10*a*, the carriage 60 is moved to a position where the nozzle array for the white ink W in the second head 1*b* passes through the third end portion Sa. Meanwhile, when the carriage 60 is moved in the −X-direction toward the second end portion 10*b*, the carriage 60 is moved to a position where the nozzle array for the white-ink reaction liquid RCTW in the first head 1*a* passes through the fourth end portion Sb.

Figure 4B:
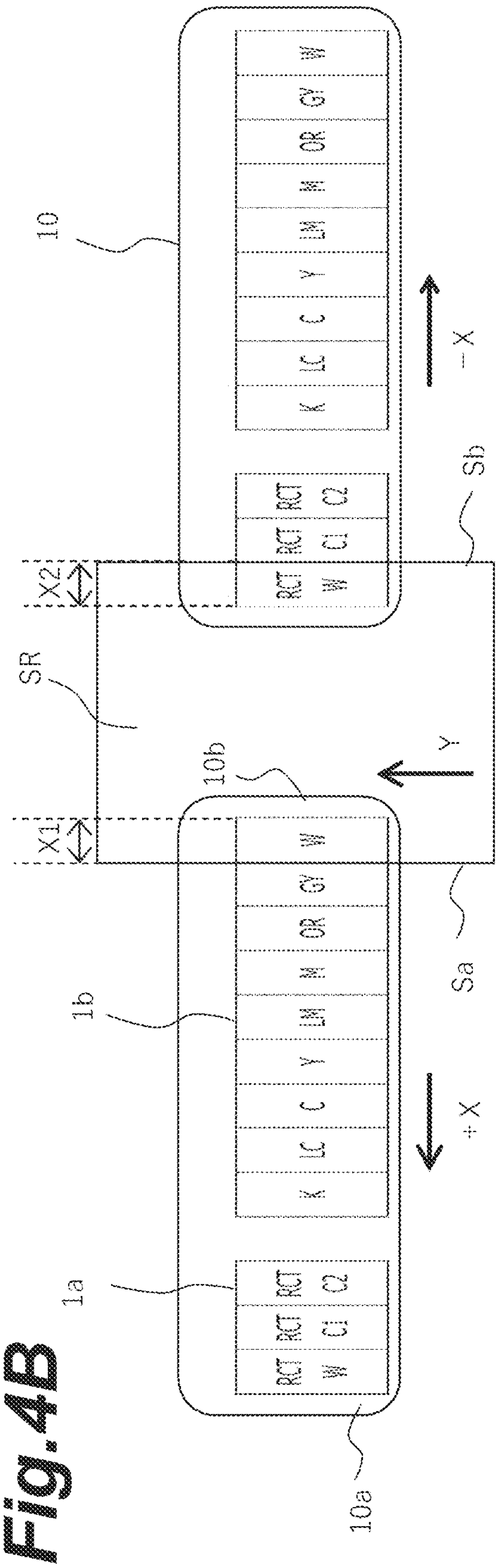

As illustrated in FIG. 4B, in the second mode, when the carriage 60 is moved in the +X-direction toward the first end portion 10*a*, the carriage 60 is moved to a position where the nozzle array for the color ink which is adjacent to the nozzle array for the white ink W in the second head 1*b* passes through the third end portion Sa. In the example in FIG. 4B, the color ink is that in the gray GY. Meanwhile, when the carriage 60 is moved in the −X-direction toward the second end portion 10*b*, the carriage 60 is moved to a position where the nozzle arrays for the color-ink reaction liquids RCTC in the first head 1*a* pass through the fourth end portion Sb.

Figure 4C:
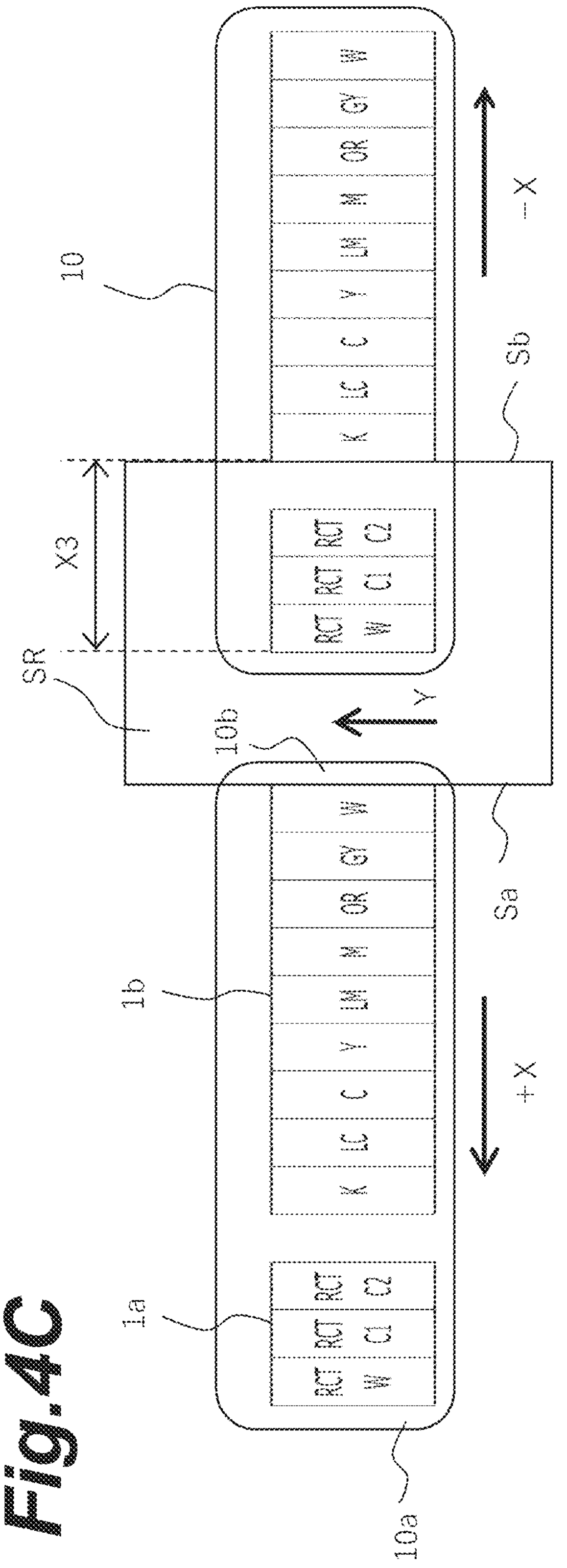
FIG. 4C and FIG. 4D are schematic diagrams illustrating respective travel ranges of the head unit in individual printing modes in the first embodiment.

As illustrated in FIG. 4C, in the third mode, when the carriage 60 is moved in the +X direction toward the first end portion 10*a*, the carriage 60 is moved to a position where the nozzle array for the white ink W in the second head 1*b* passes through the third end portion Sa. Meanwhile, when the carriage 60 is moved in the −X-direction toward the second end portion 10*b*, the carriage 60 is moved to a position where the nozzle array for the color ink (in the black K) which is at a position closest to the first end portion 10*a* in the second head 1*b* passes through the fourth end portion Sb.

Figure 4D:
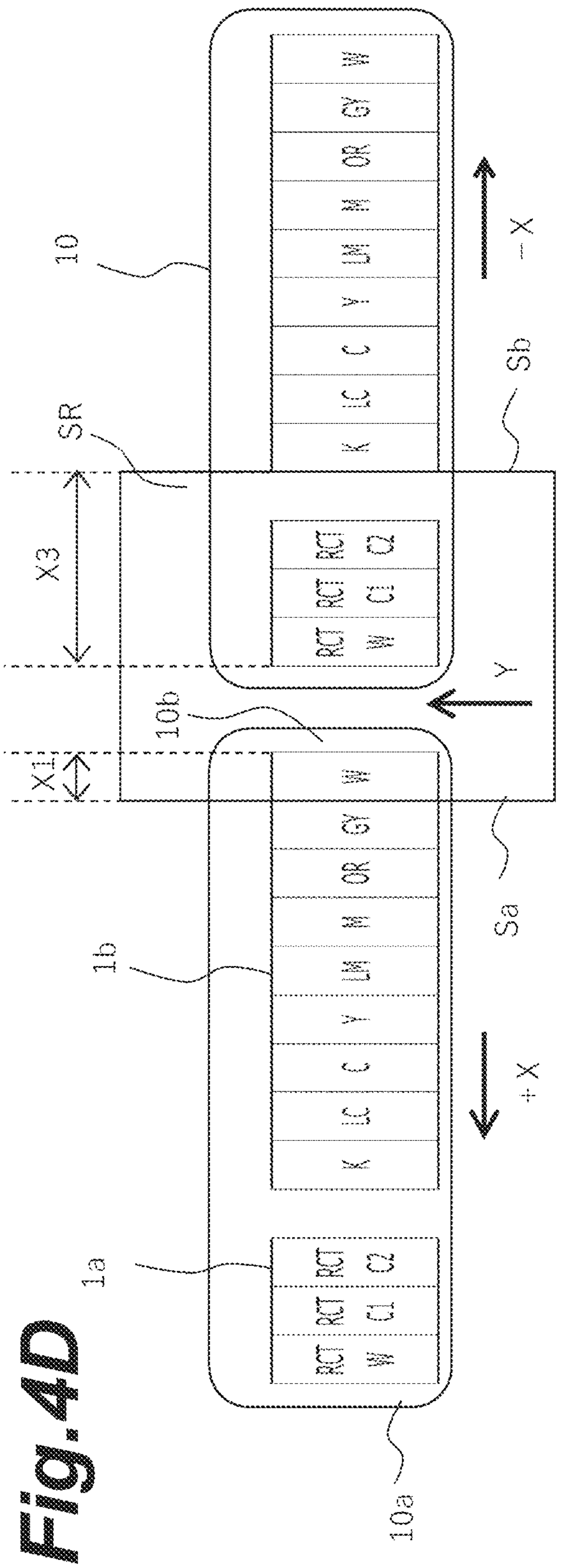

As illustrated in FIG. 4D, in the fourth mode, when the carriage 60 is moved in the +X direction toward the first end portion 10*a*, the carriage 60 is moved to a position where the nozzle array for the color ink which is adjacent to the nozzle array for the white ink W in the second head 1*b* passes through the third end portion Sa. In the example in FIG. 4D, the color ink is that in the gray GY. Meanwhile, when the carriage 60 is moved in the −X-direction toward the second end portion 10*b*, the carriage 60 is moved to a position where the nozzle array for the color ink (in the black K) which is at the position closest to the first end portion 10*a* in the second head 1*b* passes through the fourth end portion Sb.

As illustrated in FIG. 4B, in the second mode, the travel distance of the carriage 60 during the travel in the +X-direction is shorter than that in the first mode by a distance X1 corresponding to a width of the nozzle array for the white ink W. Meanwhile, the travel distance of the carriage 60 during the travel in the −X-direction is shorter by a distance X2 corresponding to a width of the nozzle array for the white-ink reaction liquid RCTW.

As illustrated in FIG. 4C, in the third mode, the travel distance of the carriage 60 during the travel in the −X-direction is shorter than that in the first mode by a distance X3 corresponding to a distance between the nozzle array closest to the first end portion 10*a* in the first head 1*a* and the nozzle array closest to the first end portion 10*a* in the second head 1*b*.

As illustrated in FIG. 4D, in the fourth mode, the travel distance of the carriage 60 during the travel in the +X-direction is shorter than that in the first mode by the distance X1 corresponding to the width of the nozzle array for the white ink W. Meanwhile, the travel distance of the carriage 60 during the travel in the −X-direction is shorter by the distance X3 corresponding to the distance between the nozzle array closest to the first end portion 10*a* in the first head 1*a* and the nozzle array closest to the first end portion 10*a* in the second head 1*b*.

Accordingly, in the second, third, and fourth modes, it is possible to perform printing at an accordingly higher speed than in the first mode due to a reduction in the travel distance of the carriage 60 and improve the throughputs. When ratios between the printing modes used by the user are, e.g., 5% for the first mode and 95% for the fourth mode, the throughput improvement in the fourth mode significantly contributes to an improvement in convenience to the user.

Figure 5A:
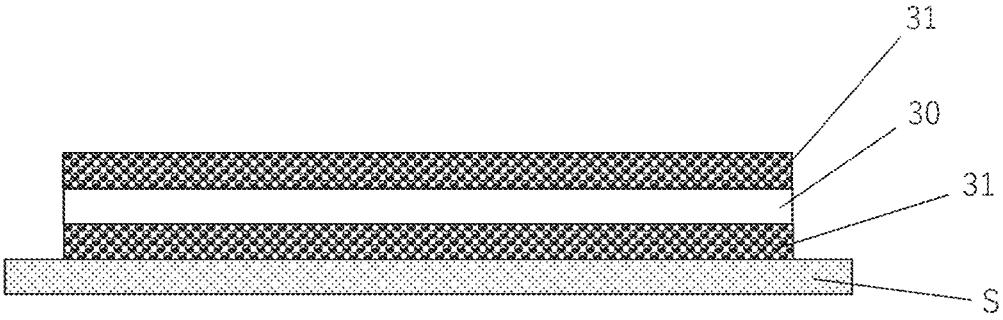
FIG. 5A and FIG. 5B are schematic diagrams illustrating a layer configuration of a printed material in the first embodiment.
Figure 5B:

FIG. 5A and FIG. 5B are schematic diagrams illustrating layer configurations when double-sided printing is performed on the transparent recording sheet S. As described above, when printing is performed on the transparent recording sheet S, the white ink W is used to make a base. FIG. 5A illustrates the layer configuration when, on the transparent recording sheet S, printing is performed in a three-layer printing mode in the order of a color ink 31, a white ink 30, and the color ink 31. FIG. 5B illustrates the layer configuration in which, on the transparent recording sheet S, printing is performed in a five-layer printing mode in the order of the color ink 31, the white ink 30, a black ink 32, the white ink 30, and the color ink 31. The three-layer printing mode is used when the same image is to be printed on both surfaces, while the five-layer printing mode is performed when different images are to be printed on the both surfaces.

To reliably eject a special ink such as the reaction liquid, preparatory ejection may be performed immediately before printing is performed on the recording sheet S. It is assumed that the liquid ejection apparatus 50 in the first embodiment is configured to perform the preparatory ejection at a position on the −X-direction side beyond an −X-direction-side end portion of a pass range of the recording sheet S. In the head unit 10 in the first embodiment, there is the nozzle array 332 for the white-ink reaction liquid RCTW at an +X-direction-side end portion and accordingly, in the three-layer printing mode and the five-layer printing mode in which the double-sided printing is performed on the transparent recording sheet S, unidirectional printing in which recording is performed only at the time of travel in the +X-direction is performed. When the white ink W is used or when higher-image-quality printing is performed using the color inks, the reaction liquid is preferably ejected first. Consequently, when the position at which the preparatory ejection is performed is at the −X-direction-side end portion as in the first embodiment, a layout in which the nozzle array 332 for the reaction liquid is located at the +X-direction-side end portion of the head unit 10, such as that in the first embodiment, is appropriate. Conversely, when the position at which the preparatory ejection is performed is at the +X-direction-side end portion, a layout in which the nozzle array 332 for the reaction liquid is located at the −X-direction-side end portion of the head unit 10 is appropriate. By appropriately using an ink circulation configuration, the first embodiment achieves a larger effect, and is applicable also to a piezo-head circulation configuration.

Second Embodiment

Figure 6:
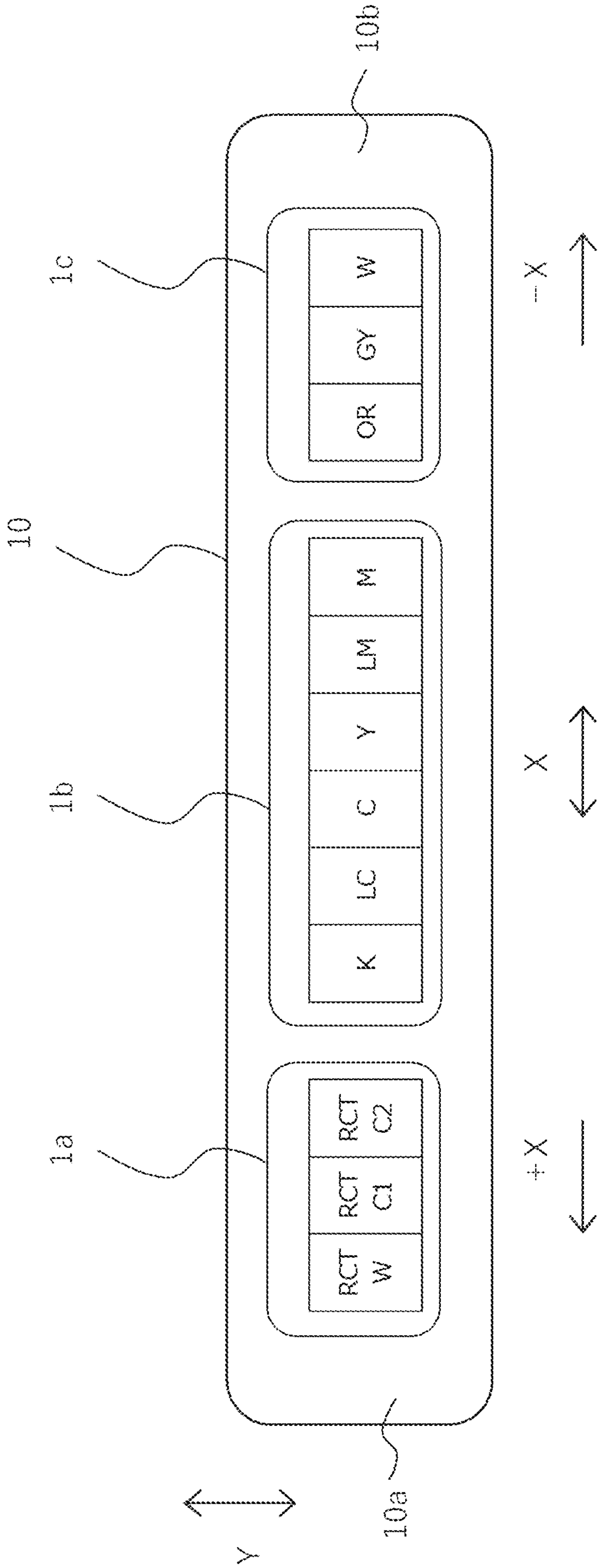
FIG. 6 is a schematic diagram of a head unit in the second embodiment.

Referring to FIG. 6, a description will be given of the second embodiment. FIG. 6 is a schematic diagram obtained by viewing the head unit 10 from above the upper surface (ink ejection side) of the liquid ejection apparatus 50. The head unit 10 includes the first head 1*a*, the second head 1*b*, and the third head 1*c*, and these plurality of heads are disposed to be arranged in the main scanning direction X. The second head 1*b* is disposed closer to the second end portion 10*b* than the first head 1*a*. The third head 1*c* is disposed closer to the second end portion 10*b* than the second head 1*b*.

The first head 1*a* is the head formed with the nozzle array 332 that ejects the reaction liquid which reacts with at least one selected from the group consisting of the color inks and the white ink. In the second embodiment, the first head 1*a* is the head exclusively for the reaction liquids which is formed with the nozzle arrays 332 that eject the white-ink reaction liquid RCTW and the color-ink reaction liquids RCTC1 and RCTC2. The second head 1*b* is the head formed with the nozzle arrays 332 that eject the color inks. In the second embodiment, the second head 1*b* is formed with the nozzle arrays 332 that eject the individual inks in the black K, the light cyan LC, the cyan C, the yellow Y, the light magenta LM, and the magenta M. The third head 1*c* is the head formed with the white ink nozzle array 332 and with the color ink nozzle arrays 332. In the second embodiment, the third head 1*c* is formed with the nozzle arrays 332 that eject the individual inks which are the color inks in the orange OR and the gray GY and the white ink W.

The first head 1*a*, the second head 1*b*, and the third head 1*c* are disposed such that, at the position closest to the first end portion 10*a* of the head unit 10, the nozzle array 332 for the reaction liquid RCT is located and, at the position closest to the second end portion 10*b*, the nozzle array 332 for the white ink W is located. In the second embodiment, in the first head 1*a*, at the position closest to the first end portion 10*a*, the nozzle array 332 for the white-ink reaction liquid RCTW is formed. In the third head 1*c*, at the position closest to the second end portion 10*b*, the nozzle array 332 for the white ink W is formed. Additionally, in the third head 1*c*, the nozzle array 332 for the gray GY is formed to be adjacent to the nozzle array 332 for the white ink W and closer to the first end portion 10*a* than the nozzle array 332 for the white ink W. As a result, when the first head 1*a*, the second head 1*b*, and the third head 1*c* are arranged along the main scanning direction X, in the head unit 10, the nozzle arrays 332 for the white-ink reaction liquid RCTW and for the white ink W are disposed at both ends in the main scanning direction X.

Note that the first head 1*a* may have a configuration formed only with the nozzle arrays 332 for the color-ink reaction liquids RCTC or may also have a configuration formed only with the nozzle array 332 for the white-ink reaction liquid RCTW. When the first head 1*a* is formed with the nozzle arrays 332 for the color-ink reaction liquids RCTC and with the nozzle array 332 for the white-ink reaction liquid RCTW, either may be located at the position closest to the first end portion 10*a*. In addition, the types of the color inks and the order in which the color inks are arranged in each of the second head 1*b* and the third head 1*c* are not limited to those in the example described above. The third head 1*c* may also have a configuration formed only with the nozzle array 332 that ejects the white ink W.

The inks of the same type are collectively provided in one head and the first head 1*a*, the second head 1*b*, and the third head 1*c* are located at the same position in the sub-scanning direction Y. This allows the carriage 60 to be reduced in size, and the travel range of the carriage 60 is reduced in size to allow the liquid ejection apparatus 50 to be reduced in size.

The white ink W and the reaction liquids RCT more greatly affect the heat generating resistive elements 36 than the other color inks, and the heads in which the white ink W and the reaction liquids RCT are mounted have shorter lifetimes. However, the first head 1*a* in which only the reaction liquids RCT are collectively mounted and the third head 1*c* in which the white ink W is mounted are independent of the second head 1*b* in which the other color inks are mounted, and therefore have an advantage of easy head replacement. In terms of an image quality change, the color inks to be combined with the white ink W in the third head 1*c* are preferably in special colors (e.g., the orange OR and the gray GY) which are less frequently used for image formation. Even when color mixture has occurred between the nozzle arrays 332, by disposing the gray GY adjacent to the white ink W, it is possible to suppress a change in a color taste of the white ink W, which is preferable in terms of reliability. In addition, since the first head 1*a* and the third head 1*c*, which are high in head replacement frequency, can be commonalized, it is also possible to reduce cost. By appropriately using the ink circulation configuration, the second embodiment achieves the larger effect, and is applicable even to the piezo-head circulation configuration.

Additionally, in the same manner as in the first embodiment, by controlling the travel range of the carriage 60 such that the nozzle arrays 332 for the inks not used in each of the printing modes do not pass through the recording range SR, the throughputs can be improved in the second to fourth modes.

In the first mode, when the carriage 60 is moved in the +X-direction toward the first end portion 10*a*, the carriage 60 is moved to a position where the nozzle array for the white ink W in the third head 1*c* passes through the third end portion Sa. Meanwhile, when the carriage 60 is moved in the −X-direction toward the second end portion 10*b*, the carriage 60 is moved to a position where the nozzle array for the white-ink reaction liquid RCTW in the first head 1*a* passes through the fourth end portion Sb.

In the second mode, when the carriage 60 is moved in the +X-direction toward the first end portion 10*a*, the carriage 60 is moved to a position where the nozzle array for the color ink (in the gray GY) which is adjacent to the nozzle array for the white ink W in the third head 1*c* passes through the third end portion Sa. Meanwhile, when the carriage 60 is moved in the −X-direction toward the second end portion 10*b*, the carriage 60 is moved to a position where the nozzle arrays for the color-ink reaction liquids RCTC1 and RCTC2 of the first head 1*a* pass through the fourth end portion Sb.

In the third mode, when the carriage 60 is moved in the +X direction toward the first end portion 10*a*, the carriage 60 is moved to a position where the nozzle array for the white ink W in the third head 1*c* passes through the third end portion Sa. Meanwhile, when the carriage 60 is moved in the −X-direction toward the second end portion 10*b*, the carriage 60 is moved to a position where the nozzle array for the color ink (in the black K) which is at the position closest to the first end portion 10*a* in the second head 1*b* passes through the fourth end portion Sb.

In the fourth mode, when the carriage 60 is moved in the +X direction toward the first end portion 10*a*, the carriage 60 is moved to a position where the nozzle array for the color ink (in the gray GY) which is adjacent to the nozzle array for the white ink W in the third head 1*c* passes through the third end portion Sa. Meanwhile, when the carriage 60 is moved in the −X-direction toward the second end portion 10*b*, the carriage 60 is moved to a position where the nozzle array for the color ink (in the black K) which is at the position closest to the first end portion 10*a* in the second head 1*b* passes through the fourth end portion Sb.

Third Embodiment

Figure 7:
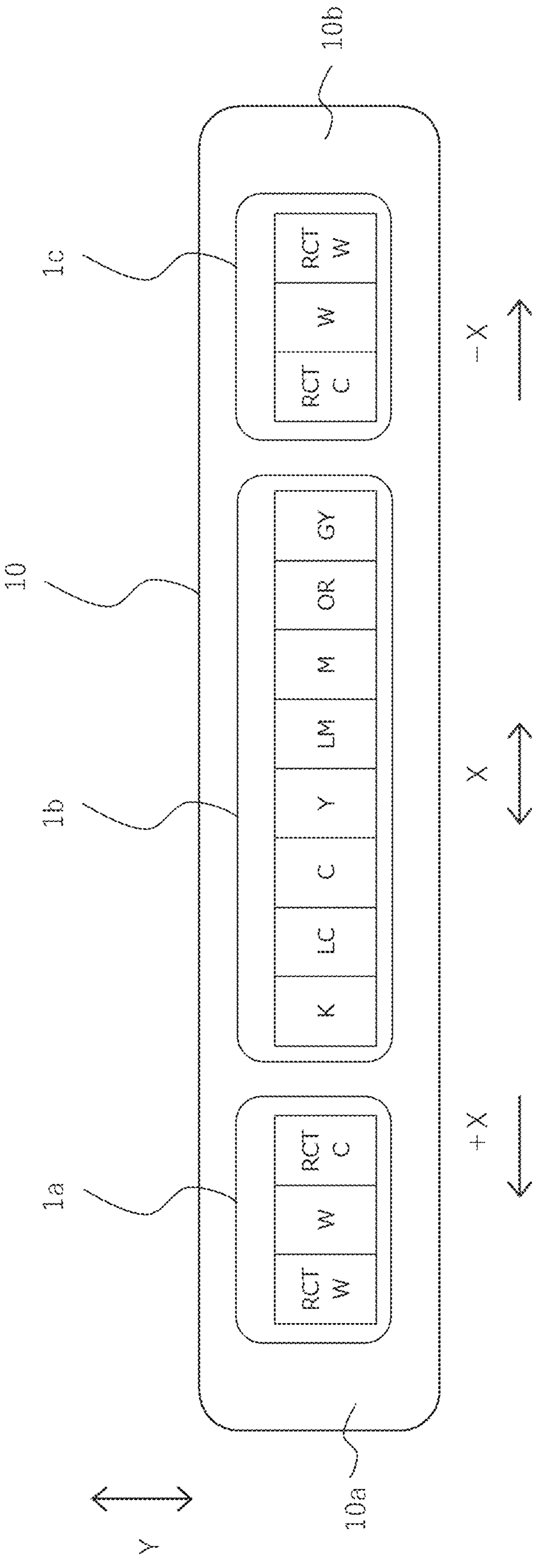
FIG. 7 is a schematic diagram of a head unit in the third embodiment.

Referring to FIG. 7, FIG. 8A, FIG. 8B, FIG. 9A, and FIG. 9B, a description will be given of the third embodiment. FIG. 7 is a schematic diagram obtained by viewing the head unit 10 from above the upper surface (ink ejection side) of the liquid ejection apparatus 50. The head unit 10 includes the first head 1*a*, the second head 1*b*, and the third head 1*c*, and these plurality of heads are disposed to be arranged in the main scanning direction X. The second head 1*b* is disposed closer to the second end portion 10*b* than the first head 1*a*. The third head 1*c* is disposed closer to the second end portion 10*b* than the second head 1*b*.

The first head 1*a* is the head formed with the nozzle array 332 that ejects the reaction liquid which reacts with at least one selected from the group consisting of the color inks and the white ink and with the nozzle array 332 that ejects the white ink. In the third embodiment, the first head 1*a* is formed with the respective nozzle arrays 332 that eject the white-ink reaction liquid RCTW, the white ink W, and the color-ink reaction liquids RCTC. The second head 1*b* is the head formed with the nozzle arrays 332 that eject the color inks. In the third embodiment, the second head 1*b* is formed with the nozzle arrays 332 that eject the individual inks in the black K, the light cyan LC, the cyan C, the yellow Y, the light magenta LM, the magenta M, the orange OR, and the gray GY. The third head 1*c* is the head formed with the nozzle array 332 that ejects the reaction liquid which reacts with at least one selected from the group consisting of the color inks and the white ink and with the nozzle array 332 that ejects the white ink. In the third embodiment, similarly to the first head 1*a*, the third head 1*c* is formed with the nozzle arrays 332 that eject the white-ink reaction liquid RCTW, the white ink W, and the color-ink reaction liquids RCTC.

The first head 1*a*, the second head 1*b*, and the third head 1*c* are disposed such that, at the position closest to the first end portion 10*a* of the head unit 10, the nozzle array 332 for the reaction liquid RCT is located and, at the position closest to the second end portion 10*b*, the nozzle array 332 for the reaction liquid RCT is located. In the third embodiment, in the first head 1*a*, the nozzle array 332 for the white-ink reaction liquid RCTW, the nozzle array 332 for the white ink W, and the nozzle array 332 for the color-ink reaction liquid RCTC are formed in this order from a side closest to the first end portion 10*a*. Meanwhile, in the third head 1*c*, the nozzle array 332 for the white-ink reaction liquid RCTW, the nozzle array 332 for the white ink W, and the nozzle array 332 for the color-ink reaction liquid RCTC are formed in this order from a side closest to the second end portion 10*b*. Thus, the color arrangement order in each of the first head 1*a* and the third head 1*c* is such that the white-ink reaction liquid RCTW and the color-ink reaction liquid RCTC are respectively disposed at the both ends in the main scanning direction X. When the first head 1*a*, the second head 1*b*, and the third head 1*c* are arranged along the main scanning direction X, the nozzle arrays 332 in the first head 1*a* and the third head 1*c* are arranged to be symmetrical to each other with respect to a color ink group in the second head 1*b* interposed therebetween. In other words, the nozzle arrays 332 for the white-ink reaction liquid RCTW are disposed at the both ends in the main scanning direction X, the white ink W is disposed internally thereof, and the color-ink reaction liquids RCTC are disposed internally thereof.

Note that the orders in which the white ink W, the white-ink reaction liquid RCTW, and the color-ink reaction liquids RCTC are arranged in the first head 1*a* and the third head 1*c* are not limited to those in the example described above as long as the nozzle arrays 332 for the reaction liquids are located at positions close to the both end portions of the head unit 10 in the main scanning direction.

Figure 8B:
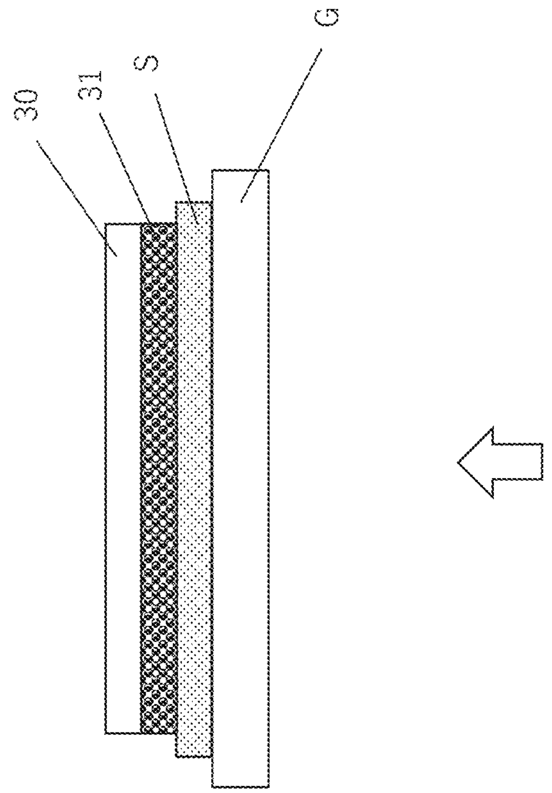
FIG. 8A and FIG. 8B are schematic diagrams illustrating directions in which the printed material is viewed in the third embodiment.
Figure 8A:
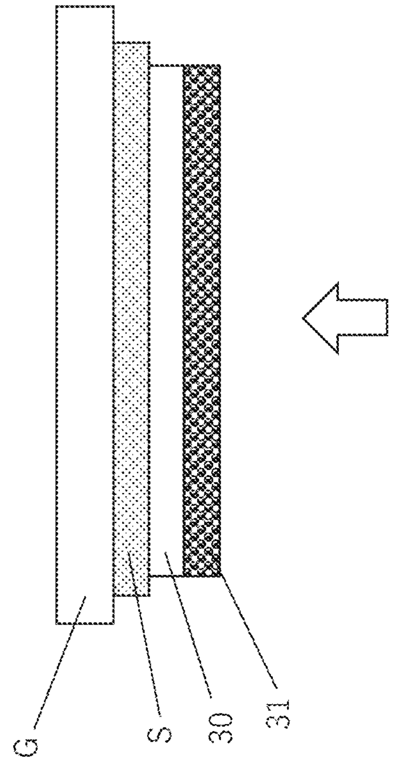

FIG. 8A and FIG. 8B are schematic diagrams illustrating cases where a printed material obtained by forming an image on the transparent recording sheet S is attached to a glass plate G (e.g., a window or showcase) and viewed in directions of arrows. FIG. 8A illustrates the case where the printed material is attached to a front side of the glass plate G when viewed from an observer, while FIG. 8B illustrates the case where the printed material is attached to another side of the glass plate G when viewed from the observer, which is, e.g., a case where the printed material is attached to an inner side of the showcase.

Figure 9A:
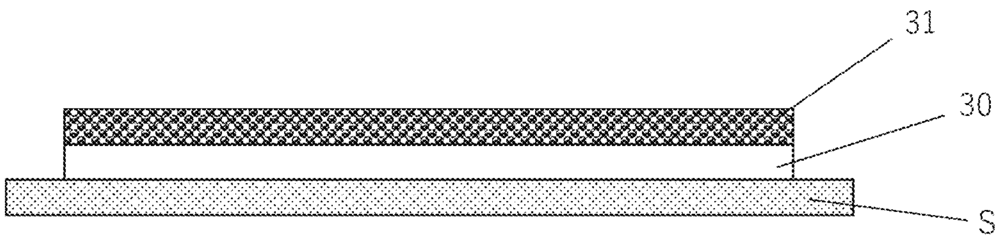
FIG. 9A and FIG. 9B are schematic diagrams illustrating a layer configuration of the printed material in the third embodiment.
Figure 9B:
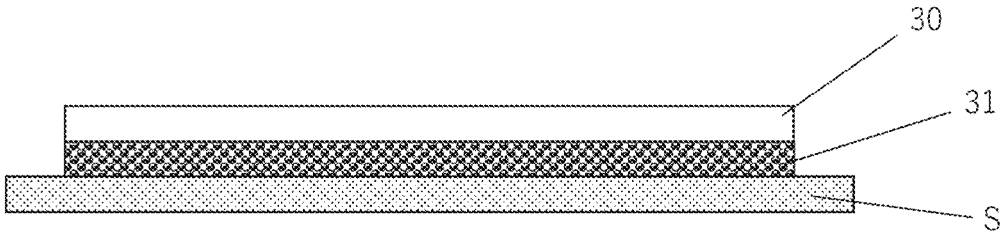

FIG. 9A and FIG. 9B are schematic diagrams illustrating a layer configuration of the printed material illustrated in each of FIG. 8A and FIG. 8B. As described above, when printing is performed on the transparent recording sheet S, the white ink is used to make the base. FIG. 9A illustrates the printed material in FIG. 8A, and printing is performed on the transparent recording sheet S in the order of the white ink 30 and the color ink 31. FIG. 9B illustrates the printed material in FIG. 8B, and printing is performed on the transparent recording sheet S in the order of the color ink 31 and the white ink 30. In the case of obtaining the printed material in FIG. 9A by printing using the head unit 10 in the third embodiment, the printing is performed in the outward direction (+X-direction) in the order of the first head 1*a* and the second head 1*b*. In the return direction (−X-direction), the printing is performed in the order of the third head 1*c* and the second head 1*b*. This allows bidirectional and high-speed printing to be performed. In the case of obtaining the printed material in FIG. 9B by printing, in the outward direction (+X-direction), the printing is performed in the order of the color-ink reaction liquid RCTC in the first head 1*a*, the second head 1*b*, and the white-ink reaction liquid RCTW in the third head 1*c*. In the return direction (−X-direction), printing is performed using the white ink W in the third head 1*c*. As a result, a printing speed is slightly reduced, but the printing can be performed. In the case of performing printing on the non-transparent recording sheet S, the white ink need not be ejected, and the printing can be performed by using the head unit 10 and ejecting the color-ink reaction liquids RCTC first in both directions, which allows high-speed printing to be performed. By appropriately using the ink circulation configuration, the third embodiment achieves the larger effect, and is applicable even to the piezo-head circulation configuration.

Additionally, in the same manner as in the first embodiment, by controlling the travel range of the carriage 60 such that the nozzle arrays 332 for the inks not used in each of the printing modes do not pass through the recording range SR, the throughputs can be improved in the second to fourth modes.

In the first mode, when the carriage 60 is moved in the +X-direction toward the first end portion 10*a*, the carriage 60 is moved to a position where the nozzle array for the white-ink reaction liquid RCTW in the third head 1*c* passes through the third end portion Sa. Meanwhile, when the carriage 60 is moved in the −X-direction toward the second end portion 10*b*, the carriage 60 is moved to a position where the nozzle array for white-ink reaction liquid RCTW in the first head 1*a* passes through the fourth end portion Sb.

In the second mode, when the carriage 60 is moved in the +X-direction toward the first end portion 10*a*, the carriage 60 is moved to a position where the nozzle array for the color-ink reaction liquid RCTC in the third head 1*c* passes through the third end portion Sa. Meanwhile, when the carriage 60 is moved in the −X-direction toward the second end portion 10*b*, the carriage 60 is moved to a position where the nozzle array for the color-ink reaction liquid RCTC in the first head 1*a* passes through the fourth end portion Sb.

In the third mode, when the carriage 60 is moved in the +X direction toward the first end portion 10*a*, the carriage 60 is moved to a position where the nozzle array for the white ink W in the third head 1*c* passes through the third end portion Sa. Meanwhile, when the carriage 60 is moved in the −X-direction toward the second end portion 10*b*, the carriage 60 is moved to a position where the nozzle array for the white ink W in the first head 1*a* passes through the fourth end portion Sb.

In the fourth mode, when the carriage 60 is moved in the +X direction toward the first end portion 10*a*, the carriage 60 is moved to a position where the nozzle array for the color ink (in the gray GY) which is at the position closest to the second end portion 10*b* in the second head 1*b* passes through the third end portion Sa. Meanwhile, when the carriage 60 is moved in the −X-direction toward the second end portion 10*b*, the carriage 60 is moved to a position where the nozzle array for the color ink (in the black K) which is at the position closest to the first end portion 10*a* in the second head 1*b* passes through the fourth end portion Sb.

According to the foregoing embodiments, the positions in the sub-scanning direction of the plurality of liquid ejection heads 1 in the head unit 10 are not displaced from each other, and accordingly it is possible to suppress a size increase of the head unit 10 in the sub-scanning direction. In addition, since the liquid ejection heads formed with the nozzle arrays 332 for the reaction liquids and the liquid ejection head formed with the nozzle arrays 332 for the color inks are independent of each other, even when the both liquid ejection heads have different replacement cycles (lifetimes), it is possible to efficiently replace the liquid ejection heads. In particular, in the third embodiment, the liquid ejection heads formed with the nozzle arrays 332 for the reaction liquids and the white ink and the liquid ejection head formed with the nozzle arrays 332 for the color inks are independent of each other, and therefore more efficient replacement can be performed. Additionally, in the printing mode not using the white ink and the reaction liquids, it is possible to reduce an amount of travel of the carriage 60 and improve the throughput. Moreover, in the three-layer printing and the five-layer printing in the case of performing the double-sided printing on the transparent sheet, by ejecting the reaction liquids first, high-image-quality printing can be performed. Furthermore, it is possible to perform the bidirectional printing, while selectively ejecting the white ink first or afterwards, thereby enabling high-speed printing.

Liquid Ejection Apparatus

FIG. 1 is a diagram for illustrating the liquid ejection apparatus to which the present invention is applicable, which is an enlarged view of the liquid ejection and the periphery thereof in the liquid ejection apparatus. First, referring to FIG. 1, a schematic configuration of the liquid ejection apparatus 50 in the present embodiment will be described. FIG. 1 is a perspective view schematically illustrating the liquid ejection apparatus using the liquid ejection head 1. The liquid ejection apparatus 50 in the present embodiment forms a serial-type inkjet recording apparatus that ejects the inks each as the liquid, while performing scanning with the liquid ejection head 1, to perform recording onto the recording sheet S.

The liquid ejection head 1 is mounted on the carriage 60. The carriage 60 reciprocates along the guide shaft 51 and along the main scanning direction (X-direction). The recording sheet S is conveyed in the sub-scanning direction (Y-direction) crossing (in the case of the present embodiment, perpendicular to) the main scanning direction by the conveying rollers 55, 56, 57, and 58. Note that, in each of the drawings referenced in the following, a Z-direction indicates a vertical direction crossing (in the case of the present embodiment, perpendicular to) an X-Y plane defined by the X-direction and the Y-direction. The liquid ejection head 1 is configured to be detachable and attachable from and to the carriage 60 by the user.

The liquid ejection head 1 is configured to include the circulation units 54 and an ejection unit 3 (see FIG. 13) (described later). In the ejection unit 3, a plurality of ejection ports and an energy generation element (hereinafter referred to as the ejection element) that generates ejection energy for ejection of a liquid from each of the ejection ports are provided, though a specific configuration thereof will be described later.

In addition, in the liquid ejection apparatus 50, the ink tanks 2 each serving as the ink supply source and the external pumps 21 are provided, and the inks stored in the ink tanks 2 are supplied by the drive forces of the external pumps 21 to the circulation units 54 via the ink supply tubes 59.

The liquid ejection apparatus 50 repeats recording scanning in which the liquid ejection heads 1 mounted on the carriage 60 eject the inks, while moving in the main scanning direction, to perform recording and a conveying operation of conveying the recording sheet S in the sub-scanning direction. Thus, a predetermined image is formed on the recording sheet S. Note that the liquid ejection heads 1 in the present embodiment are capable of ejecting the reaction liquids, the white ink, and the plurality of color inks and recording a full-color image by using these liquids. Note that, in the following description, the reaction liquids, the white ink, and the color inks may be generally referred to simply as the inks. The color inks may include those in the black (K), the yellow (Y), the magenta (M), the cyan (C), the light cyan (LC), the light magenta (LM), the orange (OR), the gray (GY), and the like. However, the color inks that can be ejected from the liquid ejection heads 1 are not limited to the inks shown herein by way of example, and need not include all the inks listed herein. The present disclosure is also applicable to the liquid ejection head for ejecting another type of ink. In other words, the types and number of the inks to be ejected from the liquid ejection heads are not limited.

Additionally, in the liquid ejection apparatus 50, at a position away from a conveyance path for the recording sheet S in the X-direction, a cap member (not shown) capable of covering an ejection port surface of each of the liquid ejection heads formed with the ejection ports is provided. The cap member covers the ejection port surface of the liquid ejection head 1 during a non-recording operation to be used for prevention of drying out of the ejection ports, protection thereof, an operation of sucking in the ink from the ejection ports, and the like.

Note that the head unit 10 illustrated in FIG. 1 includes the three liquid ejection heads 1, which are the first head 1*a*, the second head 1*b*, and the third head 1*c*. An example is shown in which the four circulation units 54 corresponding to the four types of liquids (the reaction liquids, the white ink, and the color inks) are provided in each one of the liquid ejection heads 1. However, a configuration of the head unit 10 is not limited thereto, and the circulation units 54 corresponding to the types of liquids to be ejected need only to be provided. Alternatively, the plurality of circulation units 54 may also be provided for the same type of liquid. In other words, the liquid ejection head 1 can be configured to include the one or more circulation units. It may also be possible to use a configuration that does not circulate all the four types of inks, but circulates at least one ink only.

Figure 12:
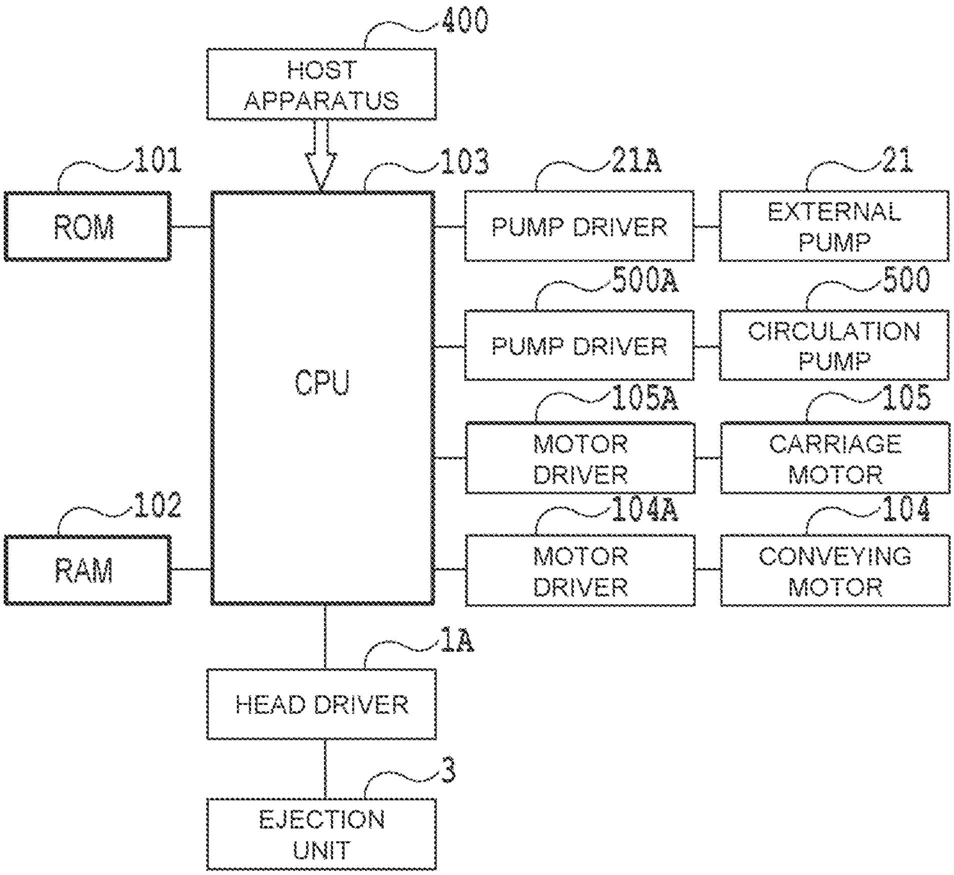
FIG. 12 is a diagram illustrating the liquid ejection apparatus.

FIG. 12 is a block diagram illustrating a control system of the liquid ejection apparatus 50. A CPU 103 performs a function of a control unit that controls an operation of each of the units of the liquid ejection apparatus 50 on the basis of a program for a processing procedure or the like stored in a ROM 101. A RAM 102 is used as a work area when the CPU 103 performs processing or the like. The CPU 103 receives image data from a host apparatus 400 outside the liquid ejection apparatus 50 to control a head driver 1A and control driving of ejection elements provided in the ejection unit 3. The CPU 103 also controls drivers for various actuators provided in the liquid ejection apparatus. For example, the CPU 103 controls a motor driver 105A for the carriage motor 105 for moving the carriage 60, a motor driver 104A for a conveyance motor 104 for conveying the recording sheet S, and the like. The CPU 103 further controls a pump driver 500A for driving a circulation pump 500 (described later), pump drivers 21A for the external pumps 21, and the like. Note that FIG. 12 illustrates a mode in which processing of having received the image data from the host apparatus 400 is performed, but the processing may also be performed in the liquid ejection apparatus 50 without depending on the data from the host apparatus 400.

Basic Configuration of Liquid Ejection Head

Figure 13:
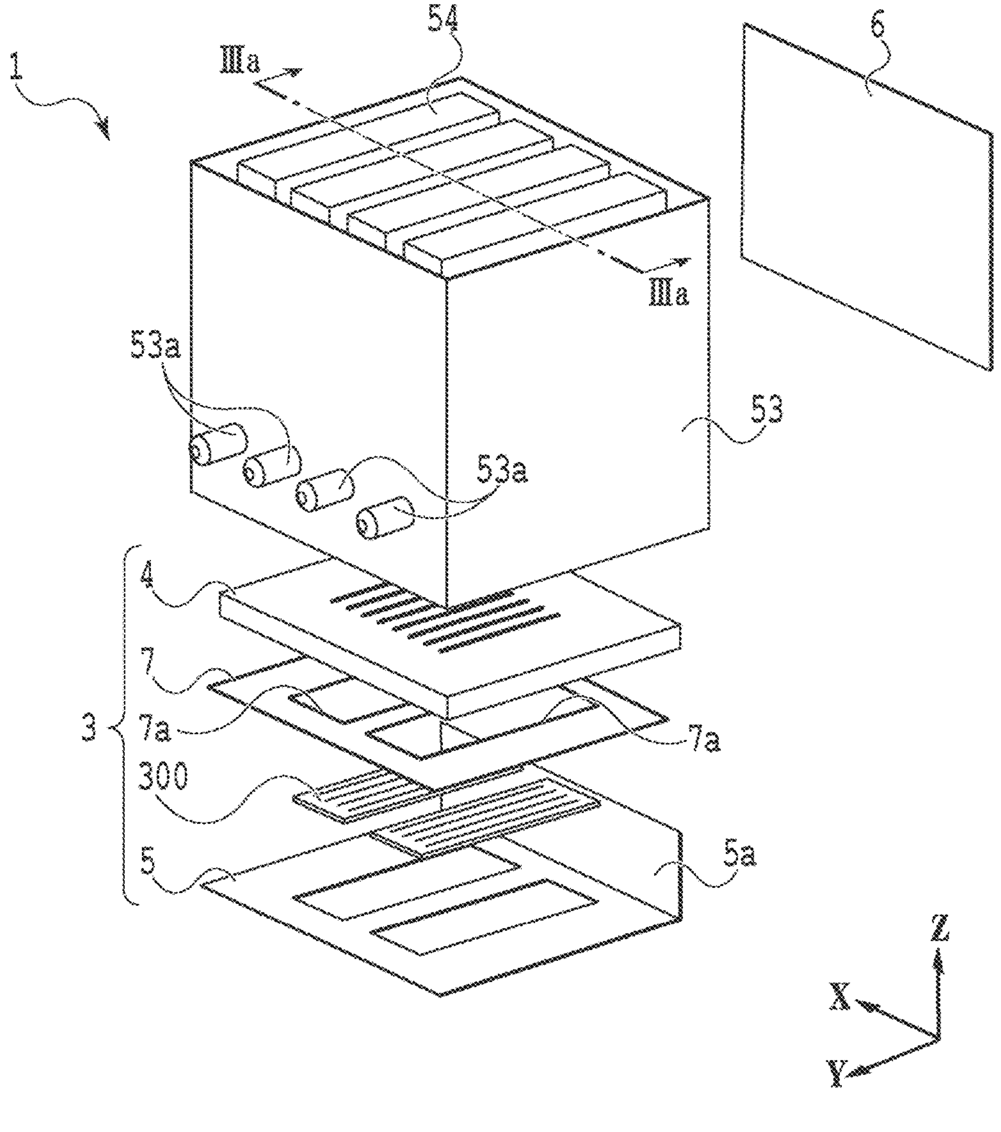
FIG. 13 is an exploded perspective view of the liquid ejection head.
Figure 14A:
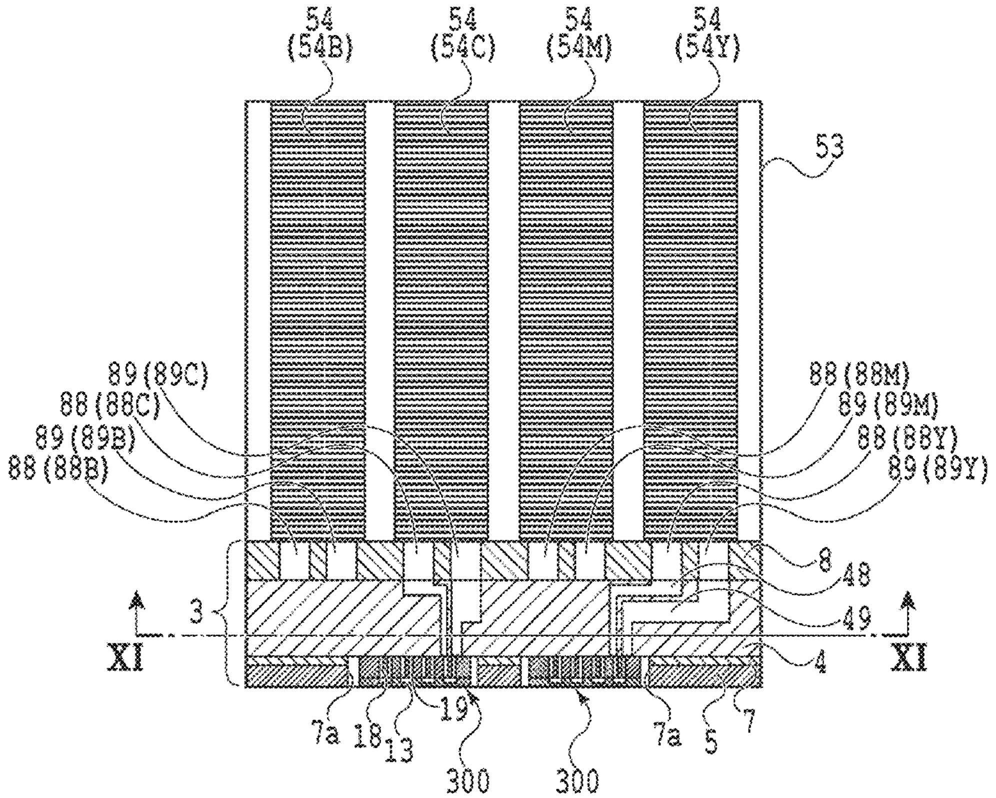
FIG. 14A and FIG. 14B are a vertical cross section of the liquid ejection head and an enlarged cross-sectional view of an ejection module.
Figure 14B:
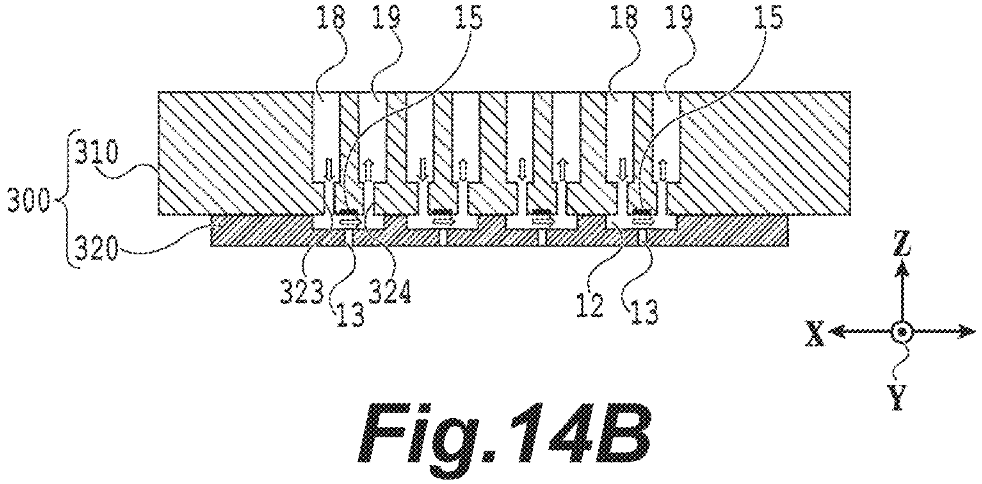

FIG. 13 is an exploded perspective view of each of the liquid ejection heads 1 in the present embodiment. FIG. 14A and FIG. 14B are cross-sectional views of the liquid ejection head 1 illustrated in FIG. 13 along a line IIIa-IIIa. FIG. 14A is an overall vertical cross-sectional view of the liquid ejection head 1, while FIG. 14B is an enlarged view of an ejection module illustrated in FIG. 14A. The following will describe a basic configuration of the liquid ejection head 1 in the present embodiment, while mainly referring to FIG. 13, FIG. 14A, and FIG. 14B and referring to FIG. 1 as appropriate.

As illustrated in FIG. 13, the liquid ejection head 1 is configured to include the circulation units 54 and the ejection unit 3 for ejecting the inks supplied from the circulation units 54 to the recording sheet S. The liquid ejection head 1 in the present embodiment is fixed to and supported by the carriage 60 via a positioning unit and an electric contact which are provided in the carriage 60 of the liquid ejection apparatus 50 and not shown. The liquid ejection head 1 ejects the ink, while moving together with the carriage 60 in the main scanning direction (X-direction) illustrated in FIG. 1, to perform recording on the recording sheet S.

In the external pumps 21 connected to the ink tanks 2 each serving as the ink supply source, the ink supply tubes 59 are provided (see FIG. 1). A leading end of each of the ink supply tubes 59 is provided with a liquid connector (not shown). When the liquid ejection head 1 is mounted in the liquid ejection apparatus 50, to a liquid connector insertion port 53*a* provided in the head housing 53 of the liquid ejection head 1 to serve as an inlet port for the liquid, the liquid connector provided in the leading end of the ink supply tube 59 is hermetically connected. Thus, ink supply paths extending from the ink tanks 2 to reach the liquid ejection head 1 via the external pumps 21 are formed. In the present embodiment, the four types of inks are used, and accordingly four sets of the ink tanks 2, the external pumps 21, the ink supply tubes 59, and the circulation units 54 are provided to correspond to the individual inks, and the four ink supply paths corresponding to the individual inks are independently formed. Thus, in the liquid ejection apparatus 50 in the present embodiment, an ink supply system in which the inks are supplied from the ink tanks 2 provided outside the liquid ejection head 1 is included. Note that, in the liquid ejection apparatus 50 in the present embodiment, such an ink collection system as to collect the inks in the liquid ejection head 1 into the ink tanks 2 is not included. Consequently, in the liquid ejection head 1, the liquid connector insertion port 53*a* for connecting the ink supply tube 59 of each of the ink tanks 2 is provided, but a connection insertion port to which a tube for collecting the ink in the liquid ejection head 1 into the ink tank 2 is to be connected is not provided. Note that the liquid connector insertion port 53*a* is provided for each of the inks.

As illustrated in FIG. 14A and FIG. 14B, each of the circulation units 54 includes a circulation unit 54B for the black ink, a circulation unit 54C for the cyan ink, a circulation unit 54M for the magenta ink, and a circulation unit 54Y for the yellow ink. The circulation units 54 that circulate the reaction liquids, the white ink, and the other color inks have substantially the same configurations and, when the individual circulation units 54 are not particularly distinguished from each other in the present embodiment, signs indicating the colors or the like may be omitted.

In FIG. 13 and FIG. 14A, the ejection unit 3 includes the two ejection modules 300, a first support member 4, a second support member 7, an electric wiring member (electric wiring tape) 5, and an electric contact substrate 6. As illustrated in FIG. 14B, each of the ejection modules 300 includes a silicon substrate 310 having a thickness of 0.5 to 1 mm and a plurality of ejection elements 15 provided in one surface of the silicon substrate 310. Each of the ejection elements 15 in the present embodiment is formed of a thermoelectric conversion element (heater) that generates thermal energy as the ejection energy for ejecting a liquid. To each of the ejection elements 15, electric power is supplied via electric wiring formed on the silicon substrate 310 by a deposition technique.

On a surface (lower surface in FIG. 14B) of the silicon substrate 310, a nozzle plate 320 is formed. In the nozzle plate 320, a plurality of pressure chambers 12 corresponding to the plurality of ejection elements 15 and a plurality of ejection ports 13 through which the inks are to be ejected are each formed by a photolithographic technique. Additionally, in the silicon substrate 310, common supply flow paths 18 and common collection flow paths 19 are formed. Moreover, in the silicon substrate 310, supply connection flow paths 323 providing communication between the common supply flow paths 18 and the individual pressure chambers 12 and collection connection flow paths 324 providing communication between the common collection flow paths 19 and the individual pressure chambers 12 are formed. In the present embodiment, each one of the ejection modules 300 is configured to eject the two types of inks. In other words, of the two ejection modules 300 illustrated in FIG. 14A, the ejection module 300 located on the left side of the drawing ejects the black ink and the cyan ink, and the ejection module 300 located on the right side of the drawing ejects the magenta ink and the yellow ink. Note that this combination is an example, and any combination of the inks is allowed. It may be possible that each one of the ejection modules is configured to eject one type of ink or configured to eject three or more types of inks. Each one of the two ejection modules 300 need not eject the same number of types of inks. It may be possible to use a configuration in which the one ejection module 300 is included or a configuration in which the three or more ejection modules 300 are included. In the example illustrated in FIG. 14A and FIG. 14B, two ejection port trains extending in the Y-direction are formed for one color ink. For each of the plurality of ejection ports 13 included in each of the ejection port trains, the pressure chamber 12, the supply connection flow path 323, and the collection connection flow path 324 are formed.

On a back surface (upper surface in FIG. 14B) side of the silicon substrate 310, the plate supply ports 311 and the plate collection ports 312, which will be described later, are formed (see FIG. 22A, FIG. 22B, and FIG. 23). The plate supply ports 311 supply the inks from ink supply flow paths 48 to the plurality of common supply flow paths 18, while the plate collection ports 312 collect the inks from the plurality of common collection flow paths 19 into ink collection flow paths 49.

Note that the plate supply ports 311 and the plate collection ports 312 each mentioned herein indicate openings through which the inks are supplied and collected during ink circulation in a forward direction, which will be described later. In other words, during the ink circulation in the forward direction, the inks are supplied from the plate supply ports 311 to the individual common supply flow paths 18, while the inks are collected from the individual common collection flow paths 19 to the plate collection ports 312. Meanwhile, ink circulation in which the inks are caused to flow in a reverse direction may also be performed. In this case, the inks are supplied from the plate collection ports 312 to the common collection flow paths 19, while the inks are collected from the common supply flow paths 18 to the plate supply ports 311.

As illustrated in FIG. 14A, each of the ejection modules 300 has the back surface (upper surface in FIG. 14A) thereof which is adhesively fixed to one surface (lower surface in FIG. 14A) of the first support member 4. In the first support member 4, the ink supply flow paths 48 and the ink collection flow paths 49 are formed to extend therethrough from one surface thereof to another surface (upper surface in FIG. 14A) thereof. One opening of each of the ink supply flow paths 48 communicates with the plate supply port 311 described above in the silicon substrate 310, while one opening of each of the ink collection flow paths 49 communicates with the plate collection port 312 described above in the silicon substrate 310. Note that the ink supply flow paths 48 and the ink collection flow paths 49 are provided independently on a per ink type basis.

To one surface (upper surface in FIG. 14A) of the first support member 4, the second support member 7 having openings 7*a* (see FIG. 13) through which the ejection modules 300 are to be inserted is adhesively fixed. The second support member 7 holds the electric wiring member 5 to be electrically connected to the ejection modules 300. The electric wiring member 5 is a member for applying an electric signal for ejecting the inks to the ejection modules 300. An electrical connection portion between each of the ejection modules 300 and the electric wiring member 5 is sealed with a sealing material (not shown) to be protected from corrosion due to the inks or an external impact.

To an end portion 5*a* (see FIG. 13) of the electric wiring member 5, the electric contact substrate 6 is thermally compressed by using an anisotropic conductive film (not shown) to be electrically connected to the electric wiring member 5. The electric contact substrate 6 has an external signal input terminal (not shown) for receiving the electric signal from the liquid ejection apparatus 50.

In addition, between the first support member 4 and the circulation units 54, joint members 8 (FIG. 14A) are provided. In the joint members 8, supply ports 88 and collection ports 89 are formed on a per ink type basis. The supply ports 88 and the collection ports 89 provide communication between the ink supply flow paths 48 and the ink collection flow paths 49 of the first support member 4 and flow paths formed in the circulation units 54. Note that, in FIG. 14A, a supply port 88B and a collection port 89B correspond to the black ink, while a supply port 88C and a collection port 89C correspond to the cyan ink. A supply port 88M and a collection port 89M correspond to the magenta ink, while a supply port 88Y and a collection port 89Y correspond to the yellow ink.

Note that an opening in one end portion of each of the ink supply flow paths 48 and the ink collection flow paths 49 of the first support member 4 has a small aperture area corresponding to each of the plate supply ports 311 and the plate collection ports 312 in the silicon substrate 310. Meanwhile, an opening in another end portion of each of the ink supply flow paths 48 and the ink collection flow paths 49 of the first support member 4 has a shape obtained as a result of enlargement to the same aperture area as a large aperture area of each of the joint members 8 formed to correspond to the flow paths in the circulation units 54. By using such a configuration, it is possible to suppress an increase in a flow path resistance to the ink collected from each of the collection flow paths. Note that the shapes of the openings in the one end portion and the other end portion of each of the ink supply flow paths 48 and the ink collection flow paths 49 are not limited to those in the example described above.

In the liquid ejection head 1 having the configuration described above, the inks supplied to the circulation units 54 flow from the plate supply ports 311 of the ejection modules 300 into the common supply flow paths 18 through the supply ports 88 of the joint members 8 and the ink supply flow paths 48 in the first support member 4. Subsequently, the inks flow from the common supply flow paths 18 into the pressure chambers 12 via the supply connection flow paths 323, and portions of the inks having flown into the pressure chambers 12 are ejected from the ejection ports 13 by the driving of the ejection elements 15. The remaining inks that have not been ejected flow from the pressure chambers 12 through the collection connection flow paths 324 and the common collection flow paths 19 to flow into the ink collection flow paths 49 of the first support member 4 from the plate collection ports 312. Then, the inks that have flown into the ink collection flow paths 49 flow into the circulation units 54 through the collection ports 89 of the joint members 8 to be collected.

Components of Circulation Unit

Figure 15:
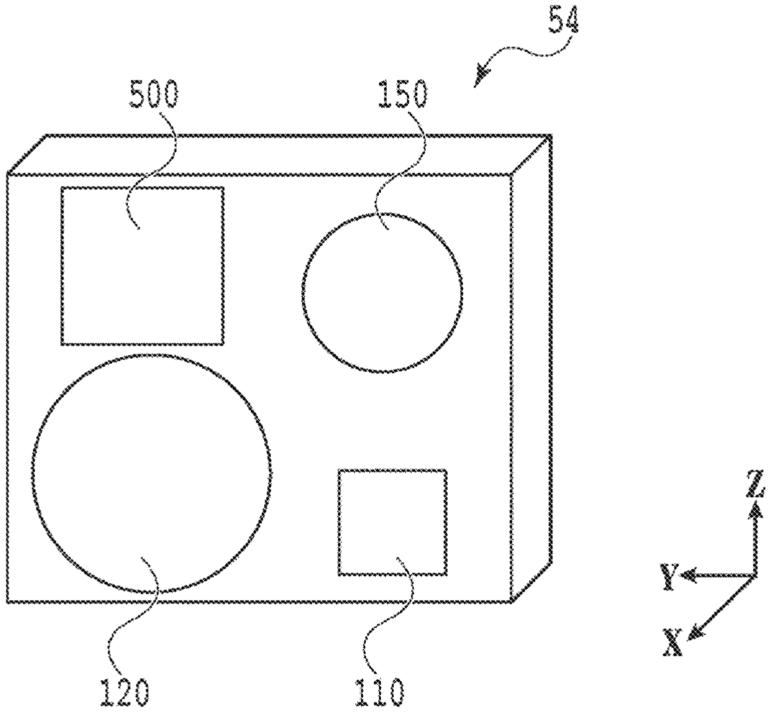
FIG. 15 is an external schematic diagram of a circulation unit.

FIG. 15 is a schematic external view of one of the circulation units 54 corresponding to one type of ink, which is applied to the liquid ejection apparatus in the present embodiment. Preferably, each of the circulation units 54 has, in addition to the circulation pump 500, a filter 110, a first pressure adjustment unit 120, and a second pressure adjustment unit 150. These components are connected by the individual flow paths as illustrated in FIG. 16 and FIG. 17 to form a circulation route that supplies and collects the ink to and from the ejection module 300 in the liquid ejection head 1.

Circulation Route in Liquid Ejection Head

Figure 16:
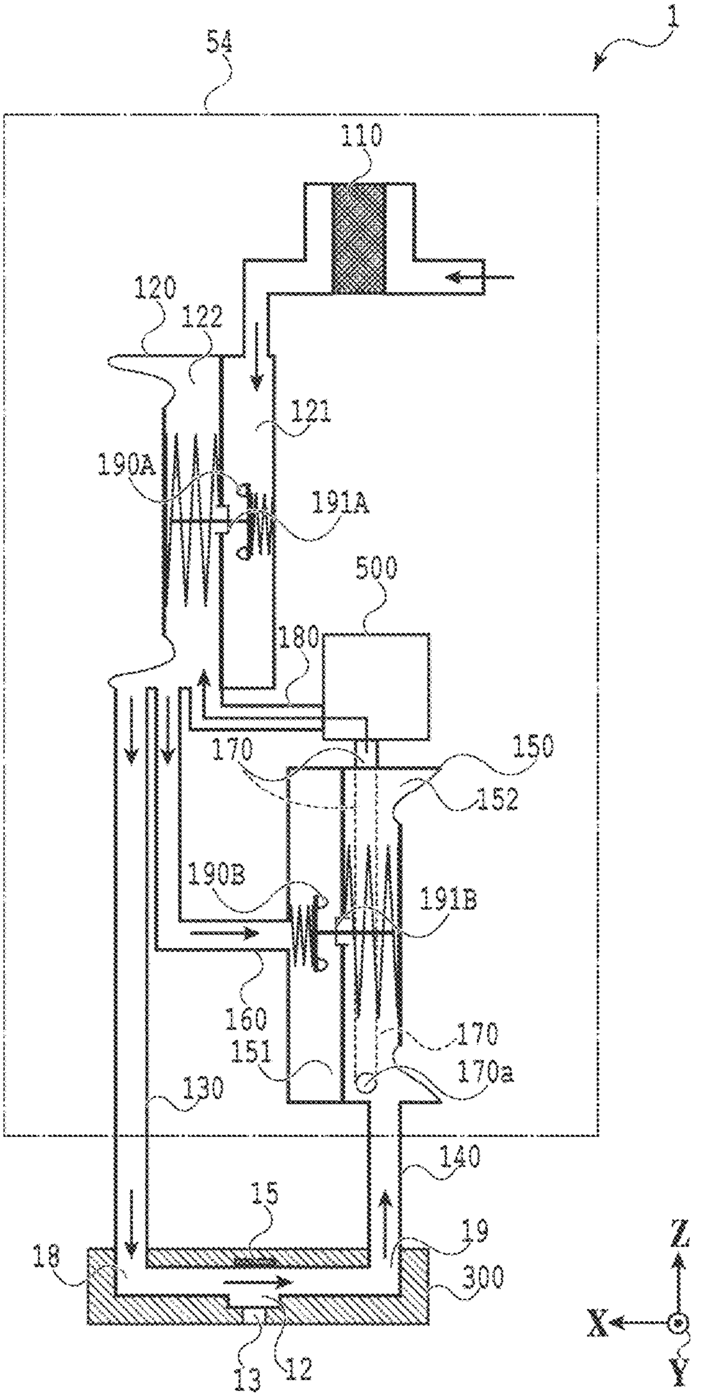
FIG. 16 is a vertical cross-sectional view illustrating a circulation route.
Figure 17:
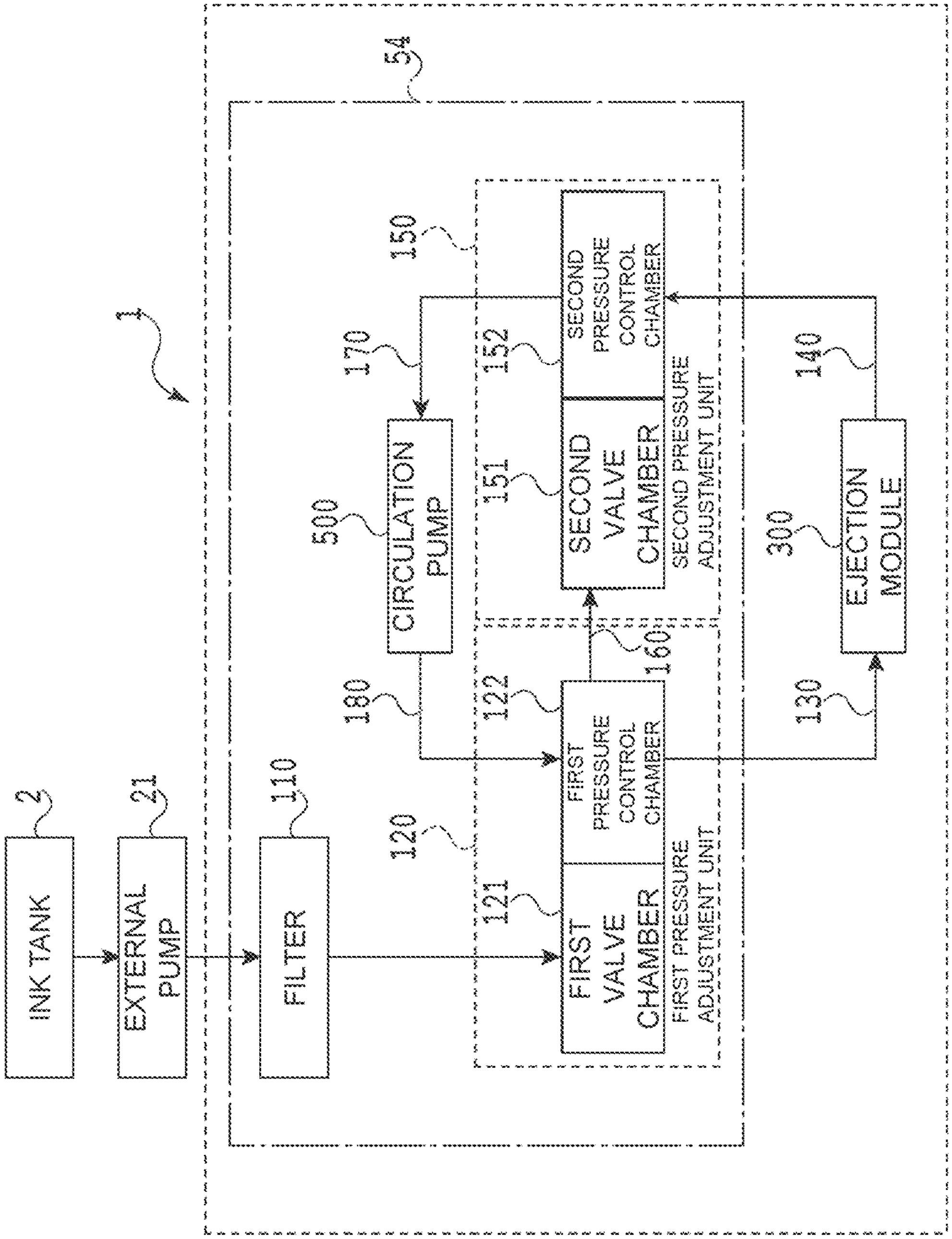
FIG. 17 is a block diagram schematically illustrating the circulation route.

FIG. 16 is a vertical cross-sectional view schematically illustrating the circulation route of one type of ink (one color ink) formed in the liquid ejection head 1. For clearer illustration of the circulation route, relative positions of the individual components (such as the first pressure adjustment unit 120, the second pressure adjustment unit 150, and the circulation pump 500) in FIG. 16 are simplified. Accordingly, the relative positions of the individual components are different from those in a configuration in FIG. 30 described later. FIG. 17 is a block diagram schematically illustrating the circulation route illustrated in FIG. 16. As illustrated in FIG. 16 and FIG. 17, the first pressure adjustment unit 120 includes a first valve chamber 121 and a first pressure control chamber 122. The second pressure adjustment unit 150 includes a second valve chamber 151 and a second pressure control chamber 152. The first pressure adjustment unit 120 is configured to have a control pressure relatively higher than that of the second pressure adjustment unit 150. In the present embodiment, by using the two pressure adjustment units which are the first pressure adjustment unit 120 and the second pressure adjustment unit 150, circulation within a given pressure range is provided in the circulation route. Each of the pressure chambers 12 (ejection elements 15) is configured such that the ink flows therein at a flow rate corresponding to a pressure difference between the first pressure adjustment unit 120 and the second pressure adjustment unit 150. Referring to FIG. 16 and FIG. 17, the following will describe the circulation route and an ink flow in the circulation route in the liquid ejection head 1. Note that arrows in the individual drawings indicate directions in which the ink flows.

First, a state of connection between the individual components in the liquid ejection head 1 will be described. Each of the external pumps 21 that send the inks contained in the ink tanks 2 (FIG. 17) provided outside the liquid ejection head 1 to the liquid ejection head 1 is connected to the circulation unit 54 via the ink supply tube 59 (FIG. 1). In an ink flow path (inlet flow path) located on an upstream side of the circulation units 54, the filter 110 is provided. An ink supply path (inlet flow path) located on a downstream side of the filter 110 is connected to the first valve chamber 121 of the first pressure adjustment unit 120. The first valve chamber 121 communicates with the first pressure control chamber 122 via a communication port 191A openable/closable by a valve 190A illustrated in FIG. 16. Note that the inlet flow path is a flow path that allows the liquid inside the ink tank 2 provided outside the liquid ejection head 1 to flow into the liquid ejection head 1 and be supplied to the pressure chamber 12.

The first pressure control chamber 122 is connected to each of a supply flow path 130, a bypass flow path 160, and a pump outlet flow path 180 of the circulation pump 500. The supply flow path 130 is connected to the common supply flow path 18 via the plate supply port 311 described above, which is provided in the ejection module 300. Meanwhile, the bypass flow path 160 is connected to the second valve chamber 151 provided in the second pressure adjustment unit 150. The second valve chamber 151 communicates with the second pressure control chamber 152 via a communication port 191B opened/closed by a valve 190B illustrated in FIG. 16. In FIG. 16 and FIG. 17, an example is shown in which one end of the bypass flow path 160 is connected to the first pressure control chamber 122 of the first pressure adjustment unit 120, while another end of the bypass flow path 160 is connected to the second valve chamber 151 of the second pressure adjustment unit 150. By contrast, it may also be possible to connect the one end of the bypass flow path 160 to the supply flow path 130 and connect the other end of the bypass flow path to the second valve chamber 151.

The second pressure control chamber 152 is connected to a collection flow path 140. The collection flow path 140 is connected to the common collection flow path 19 via the plate collection port 312 described above, which is provided in the ejection module 300. The second pressure control chamber 152 is further connected to the circulation pump 500 via a pump inlet flow path 170. Note that the pump inlet flow path 170 is connected to the second pressure control chamber via an inlet port 170*a*.

Next, a description will be given of the ink flow in the liquid ejection head 1 having the configuration described above. As illustrated in FIG. 17, each of the inks contained in the ink tanks 2 is pressurized by the external pump 21 provided in the liquid ejection apparatus 50 to form a positive-pressure ink flow, which is supplied to the circulation unit 54 of the liquid ejection head 1.

The ink supplied to the circulation unit 54 passes through the filter 110 to have a foreign substance, such as dust, and air bubbles removed therefrom, and then flows into the first valve chamber 121 provided in the first pressure adjustment unit 120. A pressure loss at the time of the passage through the filter 110 reduces a pressure of the ink but, at this stage, the pressure of the ink is under a positive pressure. Then, when the valve 190A is in an open state, the ink that has flown in the first valve chamber 121 passes through the communication port 191A to flow into the first pressure control chamber 122. Due to a pressure loss at the time of the passage through the communication port 191A, the ink that has flown in the first pressure control chamber 122 changes from under the positive pressure to under a negative pressure.

Next, the ink flow in the circulation route will be described. The circulation pump 500 operates so as to feed out the ink sucked in from the pump inlet flow path 170 corresponding to an upstream side thereof into the pump outlet flow path 180 corresponding to a downstream side thereof. Accordingly, as a result of driving of the circulation pump 500, the ink supplied to the first pressure control chamber 122 flows together with the ink pumped out of the pump outlet flow path 180 into the supply flow path 130 and into the bypass flow path 160. Note that, in the present embodiment, as the circulation pump 500 capable of pumping, a piezoelectric diaphragm pump using a piezoelectric element bonded to a diaphragm as a drive source, which will be described later in detail, is used. The piezoelectric diaphragm pump is a pump that performs pumping by inputting a drive voltage to the piezoelectric element to change an inner cubic volume of a pump chamber and alternately move two check valves by using a pressure fluctuation.

The ink that has flown in the supply flow path 130 flows from the plate supply ports 311 of the ejection module 300 into the pressure chamber 12 via the common supply flow path 18, and a portion of the ink is ejected from the ejection port 13 by the driving of the ejection element 15 (heat generation). The remaining ink that has not been used for the ejection flows in the pressure chamber 12 and passes through the common collection flow path 19 to flow into the collection flow path 140 connected to the ejection module 300. The ink that has flown into the collection flow path 140 flows into the second pressure control chamber 152 of the second pressure adjustment unit 150.

Meanwhile, the ink that has flown from the first pressure control chamber 122 into the bypass flow path 160 flows into the second valve chamber 151, and then passes through the communication port 191B to flow into the second pressure control chamber 152. The ink that has flown into the second pressure control chamber 152 via the bypass flow path 160 and the ink collected from the collection flow path 140 are sucked into the circulation pump 500 through the pump inlet flow path 170 by the driving of the circulation pump 500. Then, the inks sucked into the circulation pump 500 are sent to the pump outlet flow path 180 to flow into the first pressure control chamber 122 again. Subsequently, the ink that has flown from the first pressure control chamber 122 into the second pressure control chamber 152 via the supply flow path 130 through the ejection module 300 and the ink that has flown into the second pressure control chamber 152 via the bypass flow path 160 flow into the circulation pump 500. Then, from the circulation pump 500, the inks are sent to the first pressure control chamber 122. Thus, the ink circulation is performed in the circulation route.

As described above, in the present embodiment, it is possible to use the circulation pump 500 to circulate a liquid along the circulation route formed in the liquid ejection head 1. As a result, it is possible to suppress an increased viscosity of the ink and deposition of a precipitating component of the ink corresponding to a color material in the ejection module 300 and maintain a flowability of the ink in the ejection module 300 and an ejection property thereof in the ejection port 13 in an excellent state.

Since the circulation route in the present embodiment is configured to be completed inside the liquid ejection head 1, a circulation route length can significantly be reduced compared to that in a case where the ink circulation is performed between the ink tank 2 provided outside the liquid ejection head and the liquid ejection head 1. As a result, the ink circulation can be performed in the small-size circulation pump 500.

In addition, the circulation route is configured to include, as a connection flow path between the liquid ejection head 1 and the ink tank 2, only a flow path that supplies the ink. In other words, the circulation route has a configuration which does not need a flow path for collecting the ink from the liquid ejection head 1 to the ink tank 2. Accordingly, only the ink supply tube 59 needs to be provided to connect the ink tank 2 and the liquid ejection head 1, and a tube for ink collection need not be provided. This can provide the liquid ejection apparatus 50 with a simple inner configuration in which the number of tubes is reduced and achieve a size reduction of the entire liquid ejection apparatus 50. Moreover, the reduced number of the tubes can reduce a pressure fluctuation of the ink due to swing of the ink supply tubes 59 resulting from main scanning with the liquid ejection head 1. Additionally, the swing of the ink supply tubes 59 during the main scanning with the liquid ejection head 1 results in a drive load for the carriage motor 105 that drives the carriage 60. Accordingly, the reduced number of the tubes reduces the drive load for the carriage motor 105 to allow a main scanning mechanism including the carriage motor 105 and the like to be simplified. In addition, since collection of the ink from the liquid ejection head to the ink tank is unnecessary, the size of the external pump 21 can also be reduced. Thus, according to the present embodiment, it is possible to reduce the size and cost of the liquid ejection apparatus 50.

Pressure Adjustment Unit

Figure 18C:
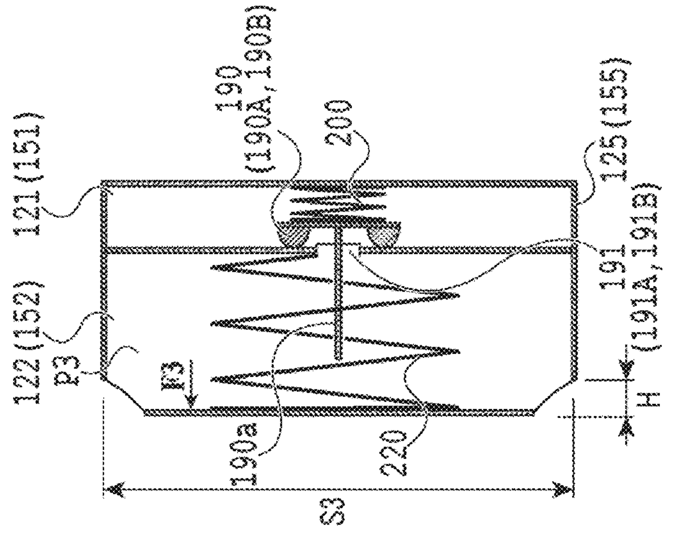
FIG. 18A to FIG. 18C are cross-sectional views each illustrating an example of a pressure adjustment unit.
Figure 18B:
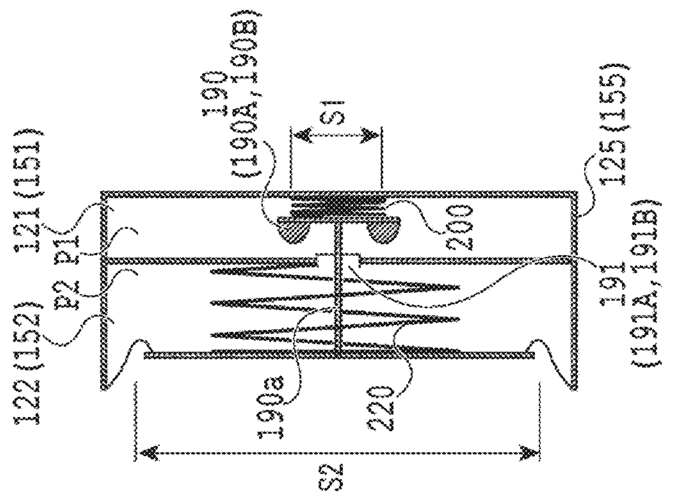
Figure 18A:
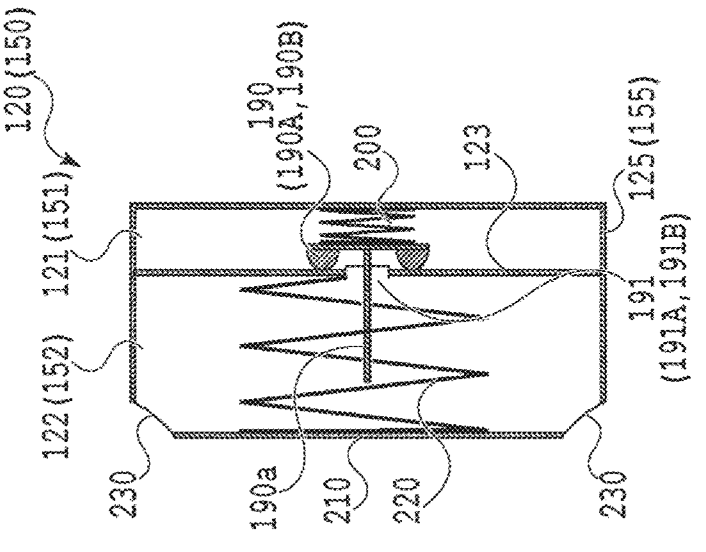

FIG. 18A to FIG. 18C are diagrams illustrating an example of a pressure adjustment unit. Referring to FIG. 18A to FIG. 18C, a configuration and an operation of the pressure adjustment unit (the first pressure adjustment unit 120 and the second pressure adjustment unit 150) embedded in the liquid ejection head 1 described above will be described in greater detail. Note that the first pressure adjustment unit 120 and the second pressure adjustment unit 150 have substantially the same configuration. Accordingly, the following description will be given by using the first pressure adjustment unit 120 as an example and, for the second pressure adjustment unit 150, reference signs are merely given to portions thereof corresponding to those of the first adjustment unit in FIG. 18A to FIG. 18C. In a case of the second pressure adjustment unit 150, it is assumed that the first valve chamber 121 described below is read as a second valve chamber 151, and the first pressure control chamber 122 is read as the second pressure control chamber 152.

The first pressure adjustment unit 120 has the first valve chamber 121 and the first pressure control chamber 122 which are formed in a cylindrical housing 125. The first valve chamber 121 and the first pressure control chamber 122 are separated by a partition wall 123 provided in the cylindrical housing 125. However, the first valve chamber 121 communicates with the first pressure control chamber 122 via a communication port 191 formed in the partition wall 123. In the first valve chamber 121, a valve 190 that switches the first valve chamber 121 and the first pressure control chamber 122 between communication and disconnection in the communication port 191 is provided. The valve 190 is held at a position facing the communication port 191 by a valve spring 200 and configured to be able to be brought into close contact with the partition wall 123 by a biasing force of the valve spring 200. The valve 190 is brought into close contact with the partition wall 123 to disconnect an ink flow in the communication port 191. Note that, to increase closeness of the contact with the partition wall 123, a portion of the valve 190 which is in contact with the partition wall 123 is preferably formed of an elastic member. Additionally, at a center portion of the valve 190, a valve shaft 190*a* is provided to protrude and be inserted through the communication port 191. By pressing the valve shaft 190*a* against the biasing force of the valve spring 200, the valve 190 is brought away from the partition wall 123 to allow the ink flow in the communication port 191. Hereinbelow, a state where the ink flow in the communication port 191 is disconnected by the valve 190 is referred to as a "closed state", while a state where the ink flow in the communication port 191 is allowed is referred to as an "open state".

An opening portion in the cylindrical housing 125 is closed by flexible members 230 and a pressure plate 210. The flexible members 230, the pressure plate 210, a peripheral wall of the housing 125, and the partition wall 123 form the first pressure control chamber 122. The pressure plate 210 is configured to be displaceable with displacement of the flexible members 230. Materials of the pressure plate 210 and the flexible members 230 are not particularly limited, and the pressure plate 210 can be formed of, e.g., a resin molded part, while the flexible members 230 can be formed of, e.g., a resin film. In this case, the pressure plate 210 can be fixed to the flexible members 230 by heat sealing.

Between the pressure plate 210 and the partition wall 123, a pressure adjustment spring 220 (biasing member) is provided. By a biasing force of the pressure adjustment spring 220, the pressure plate 210 and the flexible members 230 are biased in a direction in which an inner cubic volume of the first pressure control chamber 122 is increased, as illustrated in FIG. 18A. When a pressure in the first pressure control chamber 122 decreases, the pressure plate 210 and the flexible members 230 are displaced against the pressure of the pressure adjustment spring 220 in such a direction as to reduce the inner cubic volume of the first pressure control chamber 122. Then, when the inner cubic volume of the first pressure control chamber 122 decreases to a given amount, the pressure plate 210 comes into contact with the valve shaft 190*a* of the valve 190. Thereafter, when the inner cubic volume of the first pressure control chamber 122 further decreases, the valve 190 moves together with the valve shaft 190*a* against the biasing force of the valve spring 200 to move away from the partition wall 123. This brings the communication port 191 into the open state (state in FIG. 18B).

In the present embodiment, connections in the circulation route are set such that a pressure in the first valve chamber 121 when the communication port 191 is brought into the open state is higher than the pressure in the first pressure control chamber 122. As a result, when the communication port 191 is brought into the open state, the ink flows from the first valve chamber 121 into the first pressure control chamber 122. The inflow of the ink displaces the flexible members 230 and the pressure plate 210 in such a direction as to increase the inner cubic volume of the first pressure control chamber 122. As a result, the pressure plate 210 moves away from the valve shaft 190*a* of the valve 190, and the valve 190 is brought into close contact with the partition wall 123 by the biasing force of the valve spring 200 to bring the communication port 191 into the closed state (state in FIG. 18C).

Thus, in the first pressure adjustment unit 120 in the present embodiment, when the pressure in the first pressure control chamber 122 decreases to a given pressure or less (e.g., when a negative pressure increases), the ink flows in from the first valve chamber 121 via the communication port 191. Thus, the first pressure control chamber 122 is configured so as to prevent the pressure therein from further decreasing. Therefore, the first pressure control chamber 122 is controlled so as to be held under a pressure within a given range.

Next, a more detailed description will be given of the pressure in the first pressure control chamber 122. A consideration will be given to a state (state in FIG. 18B) where, as described above, the flexible members 230 and the pressure plate 210 are displaced according to the pressure in the first pressure control chamber 122, and the pressure plate 210 has come into contact with the valve shaft 190*a* to bring the communication port 191 into the open state. At this time, a relationship between forces acting on the pressure plate 210 is represented by Expression 1 shown below:

$$P2 \times S2 + F2 + (P1 - P2) \times S1 + F1 = 0 \qquad \text{Expression 1.}$$

When Expression 1 is rearranged with respect to P2, Expression 2 is obtained:

$$P2 = -(F1 + F2 + P1 \times S1)/(S2 - S1) \qquad \text{Expression 2}$$

where P1 is a pressure (gauge pressure) in the first valve chamber 121, P2 is a pressure (gauge pressure) in the first pressure control chamber 122, F1 is a spring force of the valve spring 200, F2 is a spring force of the pressure adjustment spring 220, S1 is a pressure receiving area of the valve 190, and S2 is a pressure receiving area of the pressure plate 210.

It is assumed herein that a direction in which the valve 190 and the pressure plate 210 are pressed is a positive direction (leftward direction in FIG. 18A to FIG. 18C) of each of the spring force F1 of the valve spring 200 and the spring force F2 of the pressure adjustment spring 220. In addition, with regard to the pressure P1 in the first valve chamber 121 and the pressure P2 in the first pressure control chamber 122, P1 is configured to satisfy a relationship given by P1≥P2.

The pressure P2 in the first pressure control chamber 122 when the communication port 191 is in the open state is determined by Expression 2 and, when the communication port 191 is brought into the open state, due to a configuration where the relationship given by P1≥P2 is satisfied, the ink flows from the first valve chamber 121 into the first pressure control chamber 122. As a result, the pressure P2 in the first pressure control chamber 122 is prevented from further decreasing, and P2 is held at a pressure within a given range.

Meanwhile, as illustrated in FIG. 18C, a relationship between forces acting on the pressure plate 210 when the pressure plate 210 is brought into non-contact with the valve shaft 190*a* and the communication port 191 is brought into the closed state is given by Expression 3:

$$P3 \times S3 + F3 = 0 \qquad \text{Expression 3.}$$

When Expression 3 is rearranged with respect to P3, Expression 4 is obtained.

$$P3 = -F3/S3 \qquad \text{Expression 4}$$

wherein F3 is a spring force of the pressure adjustment spring 220 when the pressure plate 210 and the valve shafts 190*a* are in a non-contact state, P3 is a pressure (gauge pressure) in the first pressure control chamber 122 when the pressure plate 210 and the valve shaft 190*a* are in the non-contact state, and S3 is a pressure receiving area of the pressure plate 210 when the pressure plate 210 and the valve 190 are in the non-contact state.

It is to be noted herein that FIG. 18C illustrates a state where the pressure plate 210 and the flexible members 230 are displaced in the leftward direction in the drawing up to a limit which allows the pressure plate 210 and the flexible members 230 to be displaced. Depending on a displacement amount during the displacement of the pressure plate 210 and the flexible members 230 into a state in FIG. 18C, the pressure P3 in the first pressure control chamber 122, the spring force F3 of the pressure adjustment spring 220, and the pressure receiving area S3 of the pressure plate 210 change. Specifically, when the pressure plate 210 and the flexible members 230 in FIG. 18B are more rightward than those in FIG. 18C, the pressure receiving area S3 of the pressure plate 210 is smaller, while the spring force F3 of the pressure adjustment spring 220 is larger. As a result, according to the relationship given by Expression 4, the pressure P3 in the first pressure control chamber 122 is reduced. Accordingly, according to Expression 2 and Expression 4, the pressure in the first pressure control chamber 122 gradually increases (i.e., the negative pressure decreases to have a value closer to a positive pressure side) during a period during which the state in FIG. 18B shifts to the state in FIG. 18C. In other words, from a state where the communication port 191 is in the open state, the pressure plate 210 and the flexible members 230 are gradually displaced leftward and, before the inner cubic volume of the first pressure control chamber 122 eventually reaches the limit which allows the pressure plate 210 and the flexible members 230 to be displaced, the pressure in the first pressure control chamber gradually increases. In other words, the negative pressure decreases.

Circulation Pump

Next, referring to FIG. 19A, FIG. 19B, and FIG. 20, a configuration and an operation of each of the circulation pumps 500 embedded in the liquid ejection head 1 described above will be described in detail.

Figure 19B:
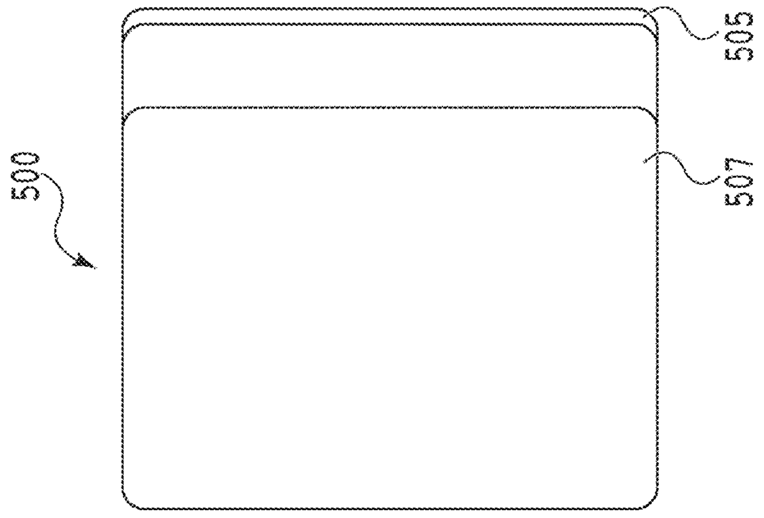
FIG. 19A and FIG. 19B are external perspective views of a circulation pump.
Figure 19A:
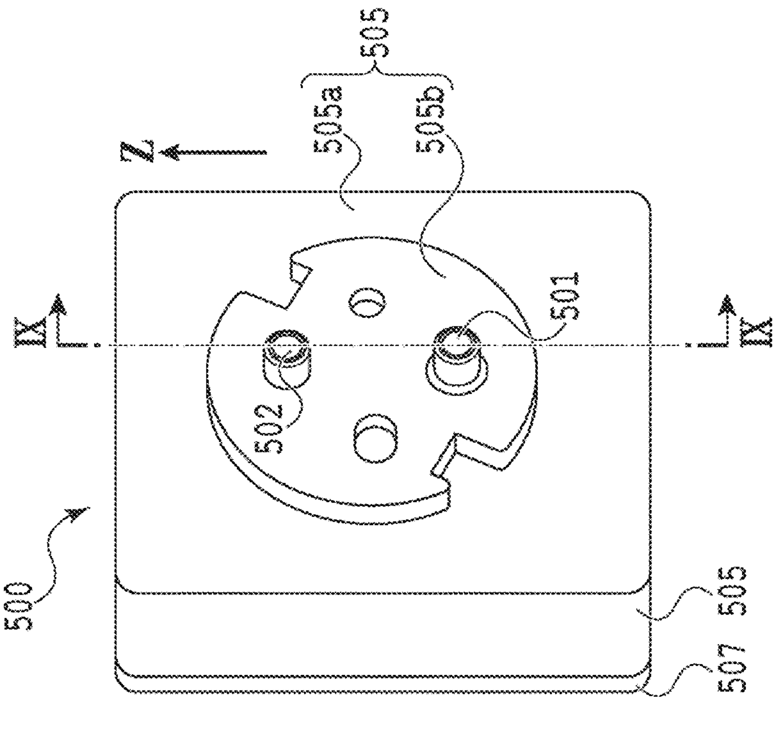

FIG. 19A and FIG. 19B are external perspective views of the circulation pump 500. FIG. 19A is an external perspective view of the circulation pump 500 illustrating a front side thereof, while FIG. 19B is an external perspective view of the circulation pump 500 illustrating a rear side thereof. An outer body of the circulation pump 500 includes a pump housing 505 and a cover 507 fixed to the pump housing 505. The pump housing 505 includes a housing portion main body 505*a* and a flow path connection member 505*b* adhesively fixed to an outer surface of the housing portion main body 505*a*. In each of the housing portion main body 505*a* and the flow path connection member 505*b*, a pair of through holes communicating with each other are provided at each of two different positions. The pair of through holes provided at one of the positions form a pump supply hole 501, while the pair of through holes provided at another of the positions form a pump discharge hole 502. The pump supply hole 501 is connected to the pump inlet flow path 170 connected to the second pressure control chamber 152, while the pump discharge hole 502 is connected to the pump outlet flow path 180 connected to the first pressure control chamber 122. The ink supplied from the pump supply hole 501 passes through a pump chamber 503 (see FIG. 20) (described later) to be discharged from the pump discharge hole 502.

Figure 20:
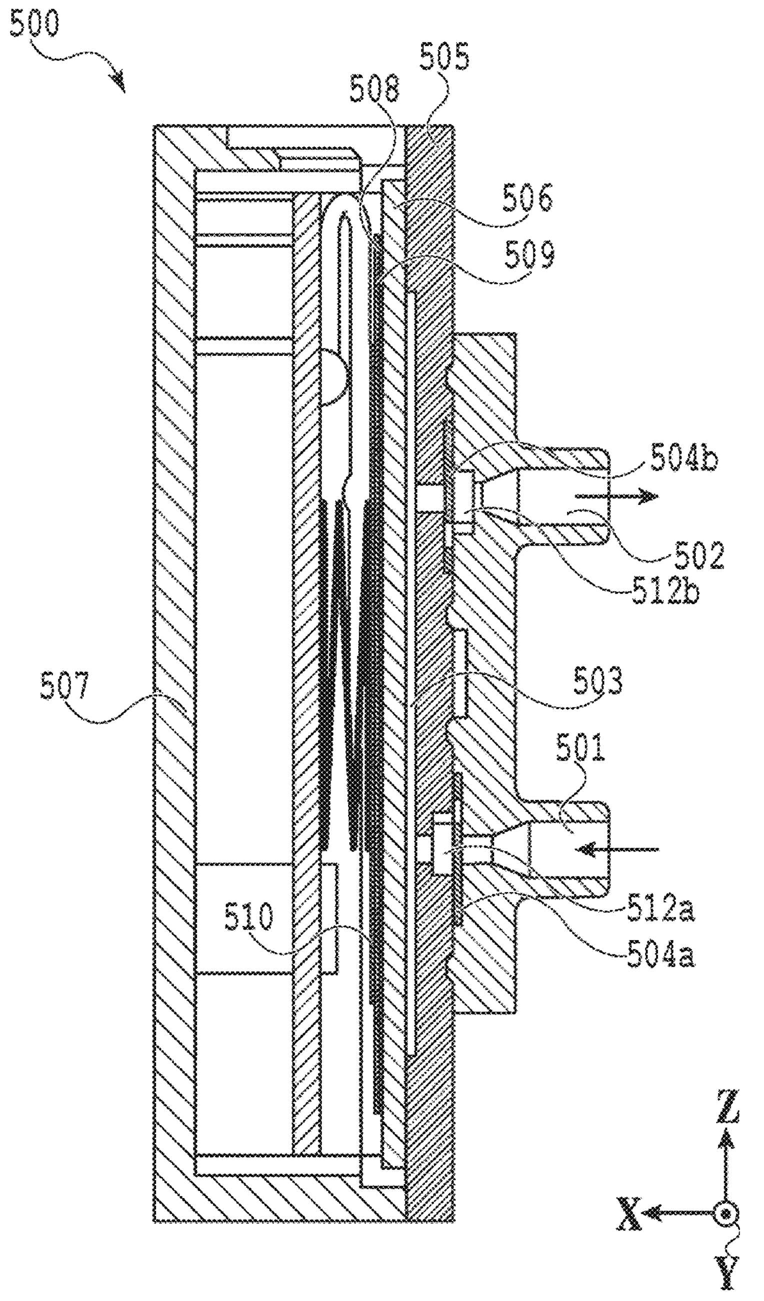
FIG. 20 is a cross-sectional view of the circulation pump illustrated in FIG. 19A along a line IX-IX.

FIG. 20 is a cross-sectional view of the circulation pump 500 illustrated in FIG. 19A along a line IX-IX. To an inner surface of the pump housing 505, a diaphragm 506 is bonded and, between the diaphragm 506 and a depressed portion formed in the inner surface of the pump housing 505, the pump chamber 503 is formed. The pump chamber 503 communicates with each of the pump supply hole 501 and the pump discharge hole 502 which are formed in the pump housing 505. In addition, in a middle portion of the pump supply hole 501, a check valve 504*a* is provided while, in a middle portion of the pump discharge hole 502, a check valve 504*b* is provided. Specifically, the check valve 504*a* is disposed such that a portion thereof can move leftward in the drawing in a space 512*a* formed in the middle portion of the pump supply hole 501. Meanwhile, the check valve 504*b* is disposed such that a portion thereof can move rightward in the drawing in a space 512*b* formed in the middle portion of the pump discharge hole 502.

When the diaphragm 506 is displaced to increase a cubic volume of the pump chamber 503 and depressurize the pump chamber 503, the check valve 504*a* moves away from an opening of the pump supply hole 501 in the space 512*a* (i.e., moves leftward in the drawing). As a result of the moving away of the check valve 504*a* from the opening of the pump supply hole 501 in the space 512*a*, the open state which allows an ink flow in the pump supply hole 501 is established. Meanwhile, when the diaphragm 506 is displaced to reduce the cubic volume of the pump chamber 503 and pressurize the pump chamber 503, the check valve 504*a* comes into close contact with a wall surface of the pump supply hole 501 around the opening thereof. As a result, the closed state which cuts off an ink flow in the pump supply hole 501 is established.

Meanwhile, when the pump chamber 503 is depressurized, the check valve 504*b* comes into close contact with a wall surface of the pump housing 505 around an opening thereof to provide the closed state which cuts off the ink flow in the pump discharge hole 502. When the pump chamber 503 is pressurized, the check valve 504*b* moves away from the opening of the pump housing 505 toward the space 512*b* side (i.e., moves rightward in the drawing) to allow the ink flow in the pump discharge hole 502.

Note that a material of each of the check valves 504*a* and 504*b* needs only to be deformable according to a pressure in the pump chamber 503, and each of the check valves 504*a* and 504*b* can be formed of, e.g., an elastic member made of EPDM, elastomer, or the like or a film or a thin plate made of polypropylene or the like. However, the material of each of the check valves 504*a* and 504*b* is not limited thereto.

As described above, the pump chamber 503 is formed by bonding together of the pump housing 505 and the diaphragm 506. As a result, deformation of the diaphragm 506 changes a pressure in the pump chamber 503. For example, when the diaphragm 506 is displaced toward the pump housing 505 side (displaced rightward in the drawing) to reduce the cubic volume of the pump chamber 503, the pressure in the pump chamber 503 increases. This brings the check valve 504*b* disposed to face the pump discharge hole 502 into the open state, and the ink in the pump chamber 503 is discharged. At this time, the check valve 504*a* disposed to face the pump supply hole 501 comes into close contact with the peripheral wall surface of the pump supply hole 501, and consequently a reverse flow of the ink from the pump chamber 503 into the pump supply hole 501 is suppressed.

Conversely, when the diaphragm 506 is displaced in a direction which expands the pump chamber 503, the pressure in the pump chamber 503 decreases. This brings the check valve 504*a* disposed to face the pump supply hole 501 into the open state, and the ink is supplied to the pump chamber 503. At this time, the check valve 504*b* disposed in the pump discharge hole 502 comes into close contact with the peripheral wall surface of the opening formed in the pump housing 505 to close the opening. Consequently, a reverse flow of the ink from the pump discharge hole 502 into the pump chamber 503 is suppressed.

Thus, in the circulation pump 500, the diaphragm 506 is deformed to change the pressure in the pump chamber 503 and thereby suck in and discharge the ink. At this time, when bubbles enter the pump chamber 503 in mixed relation, even though the diaphragm 506 is displaced, expansion/contraction of the bubbles reduces a pressure change in the pump chamber 503 to reduce an amount of pumping. Accordingly, the pump chamber 503 is disposed in parallel to a gravity force to allow the bubbles that have entered the pump chamber 503 in mixed relation to easily collect in an upper portion of the pump chamber 503, while the pump discharge hole 502 is disposed above a center of the pump chamber 503. Thus, it is possible to improve performance of discharging the bubbles in the pump and stabilize a flow rate.

Ink Flow in Liquid Ejection Head

Figure 21A:
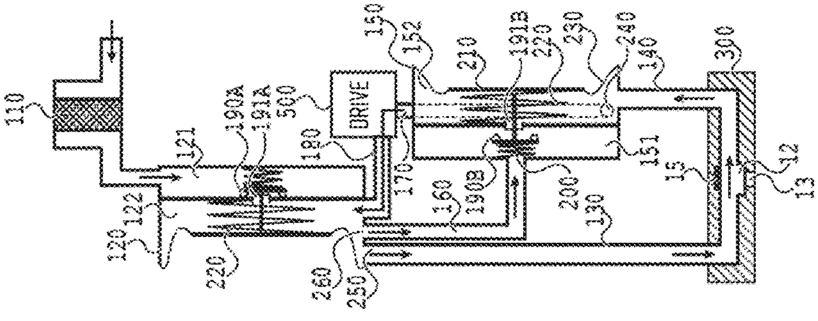
FIG. 21A to FIG. 21E are diagrams each illustrating ink flows in the liquid ejection head.

FIG. 21A to FIG. 21E are diagrams illustrating ink flows in the liquid ejection head. Referring to FIG. 21A to FIG. 21E, a description will be given of the ink circulation performed in the liquid ejection head 1. For clearer illustration of an ink circulation route, relative positions of the individual components (such as the first pressure adjustment unit 120, the second pressure adjustment unit 150, and the circulation pump 500) in FIG. 21A to FIG. 21E are simplified. Accordingly, the relative positions of the individual components are different from those in a configuration in FIG. 30, which will be described later. FIG. 21A schematically illustrates the ink flow when a recording operation of ejecting the ink from the ejection port 13 to perform recording is performed. Note that arrows in the drawings indicate the ink flows. In the present embodiment, when the recording operation is performed, both the external pump 21 and the circulation pump 500 start to be driven. It may also be possible that, irrespective of the recording operation, the external pump 21 and the circulation pump 500 are driven. The driving of the external pump 21 and the driving of the circulation pump 500 need not be performed in conjunction with each other, and the external pump 21 and the circulation pump 500 may also be driven independently and separately.

During the recording operation, the circulation pump 500 is in an ON state (driven state), and the ink that has flown in from the first pressure control chamber 122 flows into the supply flow path 130 and into the bypass flow path 160. The ink that has flown into the supply flow path 130 passes through the ejection module 300, and then flows into the collection flow path 140 to be subsequently supplied to the second pressure control chamber 152. Note that the supply flow path 130 is connected to the first pressure control chamber 122 via an opening portion 250, the bypass flow path 160 is connected to the first pressure control chamber 122 via an opening portion 260, and the collection flow path 140 is connected to the second pressure control chamber 152 via an opening portion 240.

Meanwhile, the ink that has flown from the first pressure control chamber 122 into the bypass flow path 160 flows into the second pressure control chamber 152 through the second valve chamber 151. The ink that has flown into the second pressure control chamber 152 passes through the pump inlet flow path 170, the circulation pump 500, and the pump outlet flow path 180 to subsequently flow into the first pressure control chamber 122 again. At this time, a control pressure due to the first valve chamber 121 is set higher than a control pressure in the first pressure control chamber 122 on the basis of the relationship given by Expression 2 described above. Consequently, the ink in the first pressure control chamber 122 is supplied again to the ejection module 300 via the supply flow path 130 instead of flowing into the first valve chamber 121. The ink that has flown into the ejection module 300 flows again into the first pressure control chamber 122 through the collection flow path 140, the second pressure control chamber 152, the pump inlet flow path 170, the circulation pump 500, and the pump outlet flow path 180. Thus, the ink circulation completed in the liquid ejection head 1 is performed.

In the foregoing ink circulation, an amount of the circulation (flow rate) of the ink in the ejection module 300 is determined by a pressure difference between the control pressures in the first pressure control chamber 122 and the second pressure control chamber 152. This pressure difference is set so as to provide an amount of circulation that can suppress an increased viscosity of the ink in the vicinity of the ejection ports in the ejection module 300. In addition, the ink corresponding to the ink consumed by recording is supplied from the ink tank 2 to the first pressure control chamber 122 via the filter 110 and the first valve chamber 121. A mechanism by which the ink corresponding to the consumed ink is supplied will be described in detail. In the circulation route, the ink decreases by the ink consumed by the recording to reduce the pressure in the first pressure control chamber and consequently reduce the ink in the first pressure control chamber 122. With the decrease of the ink in the first pressure control chamber 122, the inner cubic volume of the first pressure control chamber 122 also decreases. The decrease of the inner cubic volume of the first pressure control chamber 122 brings the communication port 191A into the open state, and the ink is supplied from the first valve chamber 121 into the first pressure control chamber 122. When the supplied ink passes from the first valve chamber 121 through the communication port 191A, a pressure loss occurs therein and, as a result of the inflow of the ink into the first pressure control chamber 122, the positive-pressure ink shifts to a negative-pressure state. Then, the ink flows from the first valve chamber 121 into the first pressure control chamber 122 to increase the pressure in the first pressure control chamber 122 and thereby increase the inner capacity of the first pressure control chamber 122 and bring the communication port 191A into the closed state. Thus, according to the consumption of the ink, the communication port 191A is repeatedly brought into the open state and the closed state. When the ink is not consumed, the communication port 191A is maintained in the closed state.

Figure 21B:
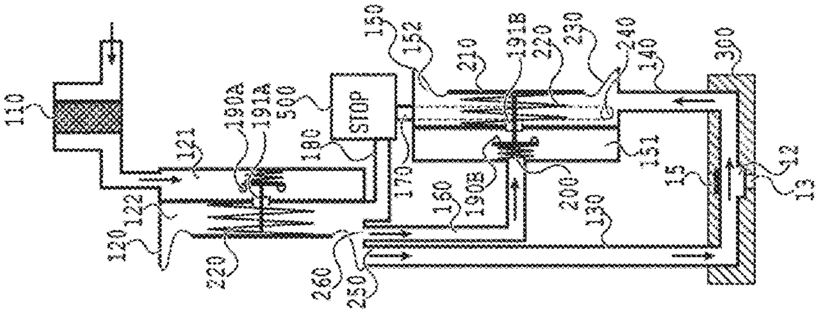

FIG. 21B schematically illustrates the ink flow immediately after the recording operation ended and the circulation pump 500 was brought into an OFF state (halt state). At a time point when the recording operation ended and the circulation pump 500 was turned OFF, each of the pressure in the first pressure control chamber 122 and the pressure in the second pressure control chamber 152 corresponds to the control pressure during the recording operation. Consequently, according to the pressure difference between the pressure in the first pressure control chamber 122 and the pressure in the second pressure control chamber 152, movement of the ink as illustrated in FIG. 2B occurs. Specifically, the ink is supplied from the first pressure control chamber 122 to the ejection module 300 via the supply flow path 130, and then an ink flow reaching the second pressure control chamber 152 through the collection flow path 140 is continuously generated. Additionally, an ink flow reaching the second pressure control chamber 152 from the first pressure control chamber 122 through the bypass flow path 160 and the second valve chamber 151 is also continuously generated.

The amount of the ink that has moved in these ink flows from the first pressure control chamber 122 to the second pressure control chamber 152 is supplied from the ink tank 2 to the first pressure control chamber 122 through the filter 110 and the first valve chamber 121. As a result, an inner volume of the first pressure control chamber 122 is held constant. According to the relationship given by Expression 2 described above, when the inner volume of the first pressure control chamber 122 is constant, the spring force F1 of the valve spring 200, the spring force F2 of the pressure adjustment spring 220, the pressure receiving area S1 of the valve 190, and the pressure receiving area S2 of the pressure plate 210 are held constant. Consequently, the pressure in the first pressure control chamber 122 is determined according to a change in the pressure (gauge pressure) P1 in the first valve chamber 121. As a result, when there is no change in the pressure P1 in the first valve chamber 121, the pressure P2 in the first pressure control chamber 122 is held at the same pressure as the control pressure during the recording operation.

Figure 21C:
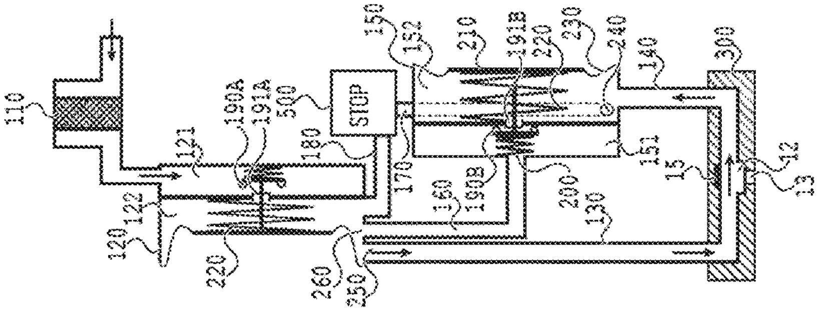
Figure 21D:
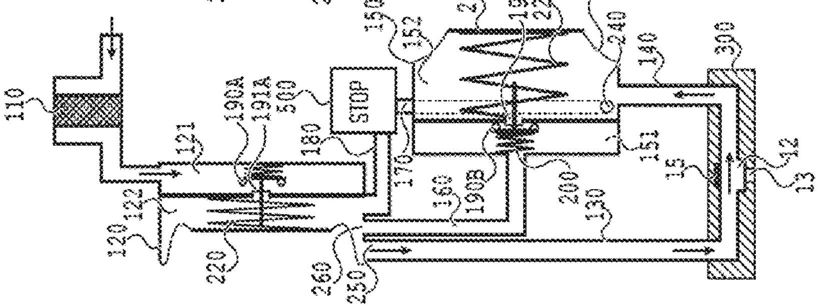

Meanwhile, the pressure in the second pressure control chamber 152 changes with time according to a change in the amount of the content resulting from the inflow of the ink from the first pressure control chamber 122. Specifically, during a period before the communication port 191B in the state in FIG. 21B shifts to the closed state to bring the second valve chamber 151 and the second pressure control chamber 152 into a non-communicative state as illustrated in FIG. 21C, the pressure in the second pressure control chamber 152 changes according to Expression 2. Then, the pressure plate 210 and the valve shaft 190*a* are brought into a non-contact state to bring the communication port 191B into the closed state. Then, as illustrated in FIG. 21D, the ink flows from the collection flow path 140 into the second pressure control chamber 152. This ink inflow displaces the pressure plate 210 and the flexible members 230 and, during a period before the inner volume of the second pressure control chamber 152 reaches a maximum, the pressure in the second pressure control chamber 152 changes, i.e., increases, according to Expression 4.

Note that, when the state in FIG. 21C is reached, an ink flow extending from the first pressure control chamber 122 to reach the second pressure control chamber 152 through the bypass flow path 160 and the second valve chamber 151 is not generated. Consequently, after the ink in the first pressure control chamber 122 is supplied to the ejection module 300 via the supply flow path 130, only a flow reaching the second pressure control chamber 152 through the collection flow path 140 is formed. As described above, the movement of the ink from the first pressure control chamber 122 to the second pressure control chamber 152 occurs according to the pressure difference between the pressure in the first pressure control chamber 122 and the pressure in the second pressure control chamber 152. Accordingly, when the pressure in the second pressure control chamber 152 becomes equal to the pressure in the first pressure control chamber 122, the movement of the ink stops.

Figure 21E:
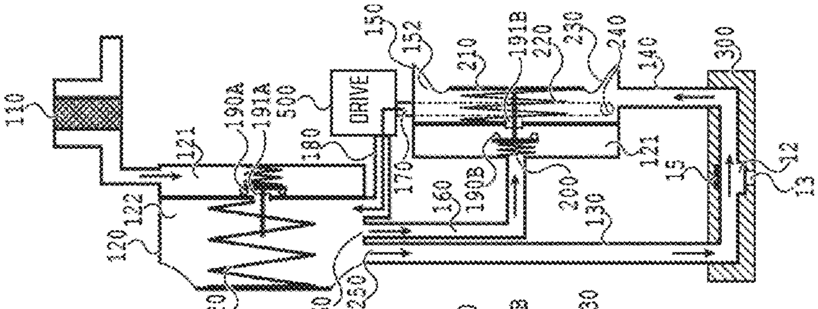

Additionally, in a state where the pressure in the second pressure control chamber 152 is equal to the pressure in the first pressure control chamber 122, the second pressure control chamber 152 expands to a state illustrated in FIG. 21D. When the second pressure control chamber 152 has expanded as illustrated in FIG. 21D, in the second pressure control chamber 152, a reservoir portion in which the ink can be reserved is formed. Note that a shift from the stop of the circulation pump 500 to the state in FIG. 21D takes a time of approximately 1 to 2 minutes, though the time may vary depending on the shape and size of the flow path and on a property of the ink. When the circulation pump 500 is driven in the state illustrated in FIG. 21D where the ink is reserved in the reservoir portion, the ink in the reservoir portion is supplied by the circulation pump 500 to the first pressure control chamber 122. This increases the amount of the ink in the first pressure control chamber 122 as illustrated in FIG. 21E, and the flexible members 230 and the pressure plate 210 are displaced in an expansion direction. Then, when the driving of the circulation pump 500 is continuously performed, as illustrated in FIG. 21A, a state in the circulation route changes.

Note that the foregoing description has been given as an example during the recording operation in FIG. 21A, the ink may also be circulated without involving the recording operation, as described above. In this case also, in response to the driving and stopping of the circulation pump 500, ink flows as illustrated in FIG. 21A to FIG. 21E are formed.

As also described above, in the present embodiment, the example is used in which the communication port 191B in the second pressure adjustment unit 150 is brought into the open state when the circulation pump 500 is driven to circulate the ink, and is brought into the closed state when the circulation of the ink stops, but the communication port 191B is not limited thereto. The control pressure may also be set such that the communication port 191B in the second pressure adjustment unit 150 stays in the closed state even when the circulation pump 500 is driven to circulate the ink. The following will give a specific description thereof in conjunction with that of a role of the bypass flow path 160.

The bypass flow path 160 connecting the first pressure adjustment unit 120 and the second pressure adjustment unit 150 is provided so as to prevent, when, e.g., a negative pressure formed in the circulation route increases to be higher than a prescribed value, the ejection module 300 from being affected thereby. The bypass flow path 160 is also provided so as to supply the ink to the pressure chamber 12 from both sides, i.e., from the supply flow path 130 and the collection flow path 140.

First, a description will be given of an example in which, when the negative pressure increases to be higher than the prescribed value, by providing the bypass flow path 160, the ejection module 300 is prevented from being affected thereby. For example, due to an ambient temperature change, a property (e.g., viscosity) of the ink may change. When the viscosity of the ink changes, the pressure loss in the circulation route also changes. For example, when the viscosity of the ink decreases, the pressure loss in the circulation route decreases. As a result, the flow rate in the circulation pump 500 driven in a given amount of driving increases to increase the flow rate of the ink flowing in the ejection module 300. Meanwhile, since the ejection module 300 is held at a given temperature by a temperature adjustment mechanism (not shown), the viscosity of the ink in the ejection module 300 is maintained constant even when the ambient temperature changes. Since the flow rate of the ink flowing in the ejection module 300 increases while the viscosity of the ink in the ejection module 300 remains unchanged, a flow resistance accordingly increases the negative pressure in the ejection module 300. When the negative pressure in the ejection module 300 thus increases to be higher than the prescribed value, there is a risk that a meniscus of the ejection port 13 is destroyed, external air is drawn into the circulation route, and normal ejection cannot be performed. Even when the meniscus is not destroyed, the negative pressure in the pressure chamber 12 may increase to be higher than a predetermined value to affect the ejection.

To prevent this, in the present embodiment, the bypass flow path 160 is formed in the circulation route. By providing the bypass flow path 160, the ink flows also in the bypass flow path 160 when the negative pressure increases to be higher than the prescribed value, and accordingly it is possible to hold the pressure in the ejection module 300 constant. Therefore, e.g., the communication port 191B in the second pressure adjustment unit 150 may also be configured to have a control pressure which allows the closed state to be maintained even when the circulation pump 500 is being driven. Then, when the negative pressure increases to be higher than the prescribed value, the control pressure in the second pressure adjustment unit may also be set so as to bring the communication port 191 in the second pressure adjustment unit 150 into the open state. In other words, as long as the meniscus is not destroyed even by a flow rate change in the pump due to a viscosity change resulting from an ambient change or the like or the predetermined negative pressure is maintained, when the circulation pump 500 is driven, the communication port 191B may be in the closed state.

Next, an example will be described in which the bypass flow path 160 is provided so as to supply the ink to the pressure chamber 12 from both sides, i.e., from the supply flow path 130 and the collection flow path 140. A pressure change in the circulation route may be caused even by an ejecting operation by the ejection element 15. This is because, with the ejecting operation, a force to draw the ink into the pressure chamber 12 is generated.

The following will describe why the ink to be supplied to the pressure chamber 12 is supplied from both sides, i.e., from the supply flow path 130 side and the collection flow path 140 side when high-duty recording is to be continued. Note that a definition of a duty may vary depending on various conditions, but it is assumed herein that a state where one-shot recording is performed on a 1200 dpi grid using 4 pl of ink droplets corresponds to 100%. It is assumed that the high-duty recording is recording performed with, e.g., a 100% duty.

When the high-duty recording is continued, an amount of the ink that flows from the pressure chamber 12 into the second pressure control chamber 152 through the collection flow path 140 decreases. Meanwhile, since the circulation pump 500 performs outflow of the ink in a given amount, a balance between inflow and outflow in the second pressure control chamber 152 is lost, and the ink in the second pressure control chamber 152 decreases to increase the negative pressure in the second pressure control chamber 152 and reduce a size of the second pressure control chamber 152. The increased negative pressure in the second pressure control chamber 152 increases an inflow amount of the ink that flows into the second pressure control chamber 152 via the bypass flow path 160 to stabilize the second pressure control chamber 152 in a state where the inflow and the outflow are balanced. Thus, the negative pressure in the second pressure control chamber 152 resultantly increases according to the duty. Additionally, as described above, in a configuration in which the communication port 191B is in the closed state when the circulation pump 500 is driven, the communication port 191B is brought into the open state according to the duty, and the ink flows from the bypass flow path 160 into the second pressure control chamber 152.

Then, when the high-duty recording is further continued, the amount of the ink that flows from the pressure chamber 12 into the second pressure control chamber 152 through the collection flow path 140 decreases, while the amount of the ink that flows from the communication port 191B into the second pressure control chamber 152 via the bypass flow path 160 increases. When this state further proceeds, the amount of the ink that flows from the pressure chamber 12 into the second pressure control chamber 152 through the collection flow path 140 becomes zero, and all the ink that flows out into the circulation pump 500 becomes the ink that flows in from the communication port 191B. When this state further proceeds, the ink reversely flows from the second pressure control chamber 152 into the pressure chamber 12 through the collection flow path 140. In this state, the ink that flows out from the second pressure control chamber 152 into the circulation pump 500 and the ink that flows out into the pressure chamber 12 flow from the communication port 191B into the second pressure control chamber 152 through the bypass flow path 160. In this case, the pressure chamber 12 is filled with the ink in the supply flow path 130 and with the ink in the collection flow path 140, which are then ejected.

Note that the reverse flow of the ink observed when the recording duty is high is a phenomenon caused by the provision of the bypass flow path 160. While the example in which the communication port 191B in the second pressure adjustment unit 150 is brought into the open state as a result of the reverse flow of the ink has been described above, the ink may reversely flow in a state where the communication port 191B in the second pressure adjustment unit 150 is in the open state. Moreover, in a configuration in which the second pressure adjustment unit 150 is not provided also, the provision of the bypass flow path 160 may cause the reverse flow of the ink described above.

Configuration of Ejection Unit

Figure 22A:
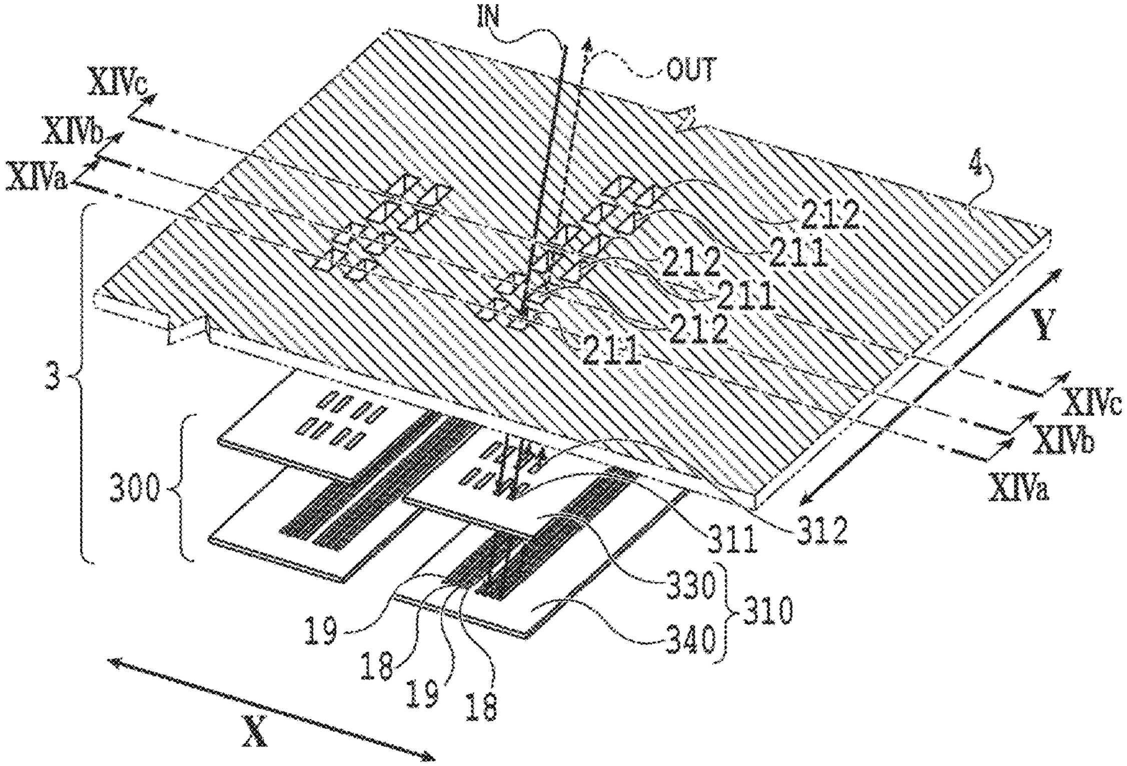
FIG. 22A is a schematic diagram illustrating the circulation routes in the ejection unit.
Figure 22B:
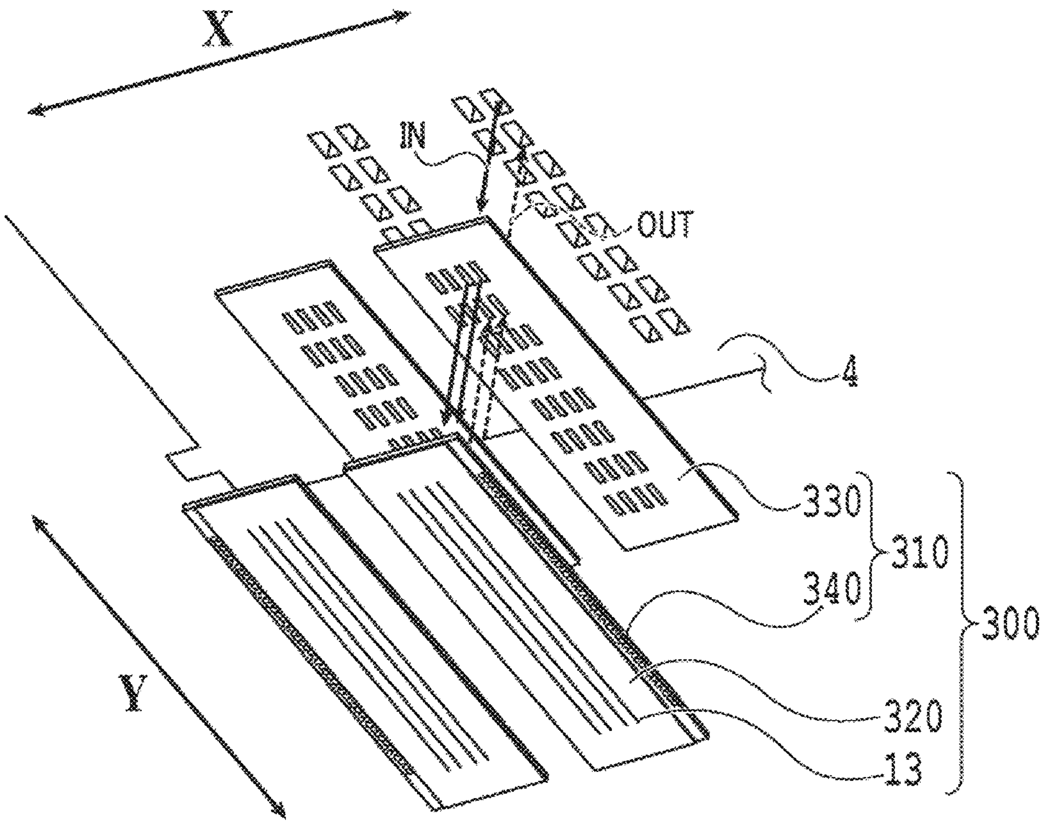
FIG. 22B is a schematic diagram illustrating the circulation routes in the ejection unit.

FIG. 22A and FIG. 22B are schematic diagrams illustrating the circulation route corresponding to one ink color in the ejection unit 3 in the present embodiment. FIG. 22A is an exploded perspective view obtained by viewing the ejection unit 3 from the first support member 4 side, while FIG. 22B is an exploded perspective view obtained by viewing the ejection unit 3 from the ejection module 300 side. Note that arrows denoted by IN and OUT in the drawings indicate ink flows, and a description will be given only of the ink flows corresponding to one color, but the flows are the same for another color. In addition, in FIG. 22A and FIG. 22B, illustration of the second support member 7 and the electric wiring member 5 is omitted, and a description thereof is also omitted in the following description of a configuration of the ejection unit 3. For the first support member 4 in FIG. 22A, a cross section thereof along a line XI-XI in FIG. 14A is illustrated. The ejection module 300 includes the recording element substrate 340 and the aperture plate 330. FIG. 23 is a diagram illustrating the aperture plate 330, while FIG. 24 is a diagram illustrating the recording element substrate 340.

To the ejection unit 3, the ink is supplied from the circulation unit 54 via the joint member 8 (see FIG. 14A and FIG. 14B). A description will be given of a route of the ink after passage of the ink through the joint member 8 till return of the ink to the joint member 8. Note that, in the following drawings, illustration of the joint member 8 is omitted.

The ejection module 300 includes the recording element substrate 340 and the aperture plate 330, each of which is the silicon substrate 310, and further includes the nozzle plate 320. The recording element substrate 340, the aperture plate 330, and the nozzle plate 320 are stacked and joined together so as to provide communication between the flow paths for the individual inks to result in the ejection module 300, which is supported by the first support member 4. The ejection module 300 is supported by the first support member 4 to form the ejection unit 3. The recording element substrate 340 includes the nozzle plate 320, the nozzle plate 320 includes a plurality of ejection port trains including the ejection ports 13 arranged in rows, and a portion of the ink supplied via the ink flow paths in the ejection module 300 is ejected from the ejection ports 13. The ink that has not been ejected is collected via the ink flow paths in the ejection module 300.

Figure 23:
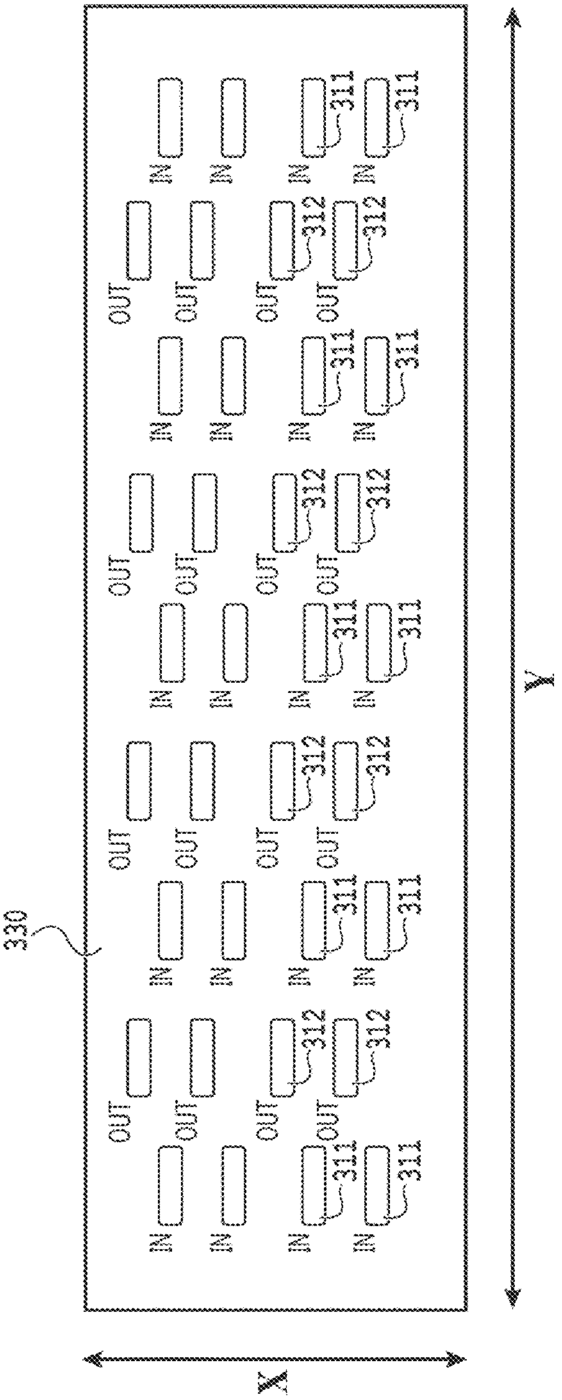
FIG. 23 is a diagram illustrating an aperture plate 330.
Figure 24:
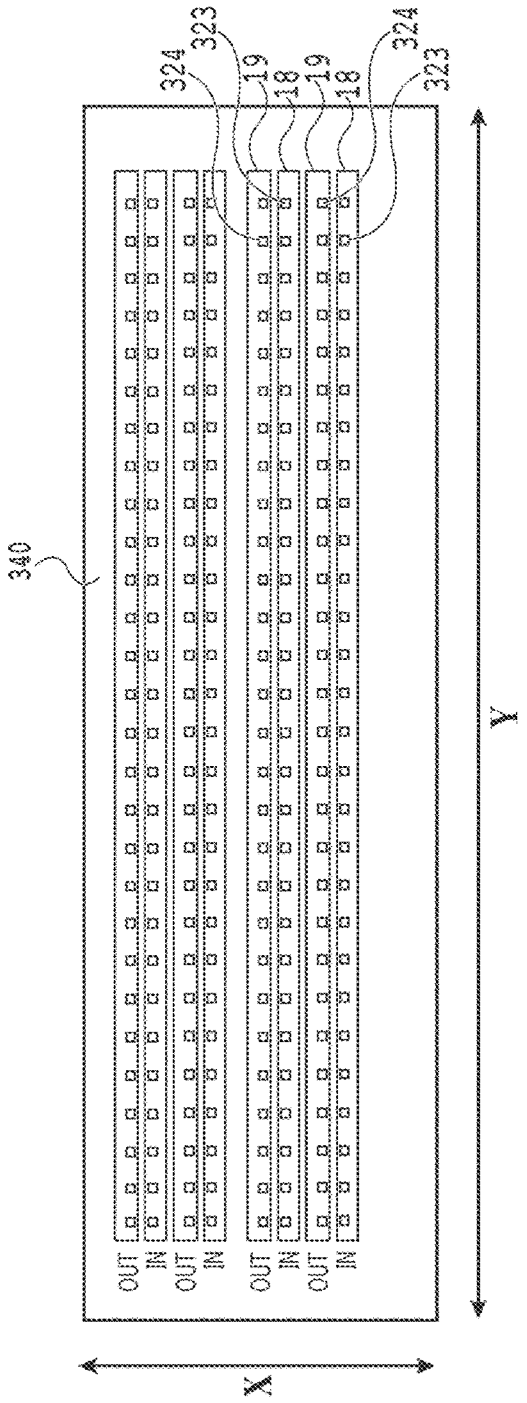
FIG. 24 is a diagram illustrating an ejection element substrate.

As illustrated in FIG. 22A, FIG. 22B, and FIG. 23, the aperture plate 330 includes the plurality of arranged plate supply ports 311 and the plurality of arranged plate collection ports 312. As illustrated in FIG. 24 and FIG. 25A to FIG. 25C, the recording element substrate 340 includes the plurality of arranged supply connection flow paths 323 and the plurality of arranged collection connection flow paths 324. The recording element substrate 340 further includes the common supply flow paths 18 communicating with the plurality of supply connection flow paths 323 and the common collection flow paths 19 communicating with the plurality of collection connection flow paths 324. The ink flow paths in the ejection unit 3 are formed by providing communication between the ink supply flow paths 48 and the ink collection flow paths 49 (see FIG. 14A and FIG. 14B), which are provided in the first support member 4, and the flow paths provided in the ejection module 300. The support member supply ports 211 are cross-sectional openings forming the ink supply flow paths 48, while the support member collection ports 212 are cross-sectional openings forming the ink collection flow paths 49.

The ink to be supplied to the ejection unit 3 is supplied from the circulation unit 54 (see FIG. 14A) side to the ink supply flow paths 48 (see FIG. 14A) of the first support member 4. The ink that has flown through the support member supply ports 211 in the ink supply flow paths 48 is supplied to the common supply flow paths 18 of the recording element substrate 340 via the ink supply flow paths 48 (see FIG. 14A) and the plate supply ports 311 of the aperture plate 330 to enter the supply connection flow paths 323. The flow paths described heretofore serve as supply-side flow paths. Then, the ink flows to the collection connection flow paths 324 serving as collection-side flow paths through the pressure chambers 12 (see FIG. 14B) of the nozzle plate 320. Details of the ink flows in the pressure chambers 12 will be described later.

In the collection-side flow paths, the ink that has entered the collection connection flow paths 324 flows into the common collection flow paths 19. Then, the ink flows from the common collection flow paths 19 into the ink collection flow paths 49 of the first support member 4 via the plate collection ports 312 in the aperture plate 330 to be collected by the circulation unit 54 through the support member collection ports 212.

A region of the aperture plate 330 where the plate supply ports 311 and the plate collection ports 312 are not present corresponds to a region of the first support member 4 for separating the support member supply ports 211 and the support member collection ports 212 from each other. The region of the first support member 4 also has no opening. Such a region is used as an adhesive region when the ejection module 300 and the first support member 4 are bonded together.

In the aperture plate 330 in FIG. 23, the plurality of rows of openings arranged in the X-direction are provided in a plurality of rows in the Y-direction, and the supply (IN) openings and the collection (OUT) openings are alternately arranged in the Y-direction so as to displaced in the X-direction from each other by a half pitch. In FIG. 24, in the recording element substrate 340, the common supply flow paths 18 communicating with the plurality of supply connection flow paths 323 arranged in the Y-direction and the common collection flow paths 19 communicating with the plurality of collection connection flow paths 324 arranged in the Y-direction are alternately arranged in the X-direction. The common supply flow paths 18 and the common collection flow paths 19 are divided on a per ink type basis, and the numbers of the common supply flow paths 18 and the common collection flow paths 19 to be arranged is determined according to the number of the ejection port trains for each color. The numbers of the supply connection flow paths 323 and the collection connection flow paths 324 to be arranged also correspond to the number of the ejection ports 13. Note that a one-to-one correspondence need not necessarily be provided, and it may also be possible that the one supply connection flow path 323 and the one collection connection flow path 324 correspond to the plurality of ejection ports 13.

The aperture plate 330 and the recording element substrate 340 which have been described above are stacked and joined together so as to provide communication between the individual ink flow paths to result in the ejection module 300, which is supported by the first support member 4 to form the ink flow paths including supply flow paths and collection flow paths as described above.

Figure 25A:
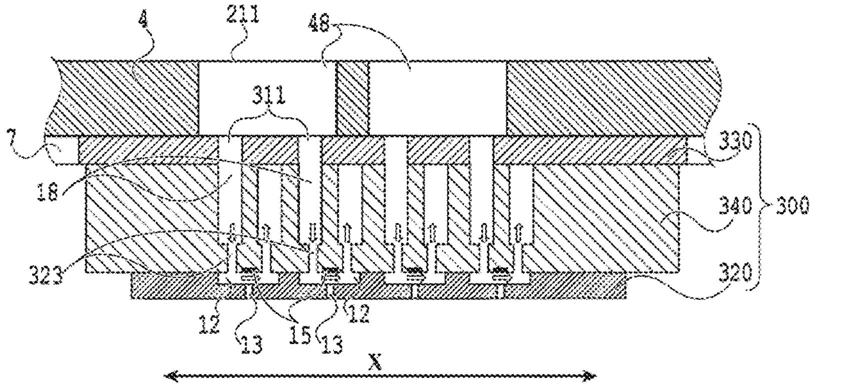
FIG. 25A to FIG. 25C are cross-sectional views each illustrating ink flows in the ejection unit.
Figure 25B:
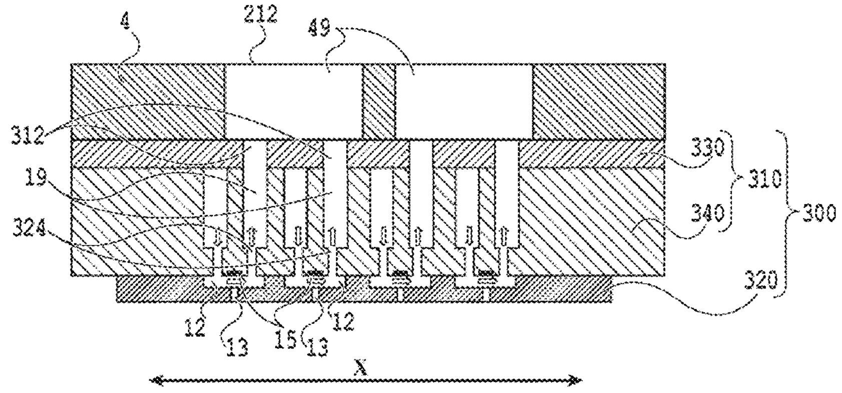
Figure 25C:
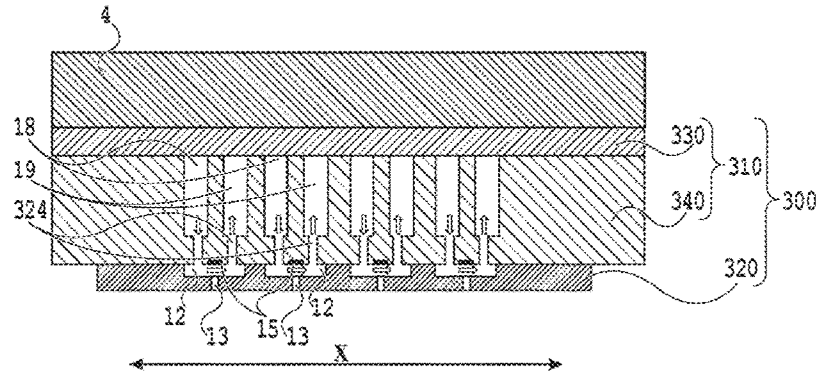

FIG. 25A to FIG. 25C are cross-sectional views illustrating ink flows in different portions of the ejection unit 3. FIG. 25A illustrates a cross section along a line XIVa-XIVa in FIG. 22A, which is a cross section of a portion of the ejection unit 3 in which the ink supply flow paths 48 and the plate supply ports 311 communicate with each other. FIG. 25B illustrates a cross section along a line XIVb-XIVb in FIG. 22A, which is a cross section of a portion of the ejection unit 3 in which the ink collection flow paths 49 and the plate collection ports 312 communicate with each other. FIG. 25C illustrates a cross section along a line XIVc-XIVc in FIG. 22A, which is a cross section of a portion in which the plate supply ports 311 and the plate collection ports 312 do not communicate with the flow paths in the first support member 4.

In the supply flow paths that supply the ink, as illustrated in FIG. 25A, the ink is supplied from portions in which the ink supply flow paths 48 of the first support member 4 and the plate supply ports 311 of the aperture plate 330 overlap and communicate with each other. Meanwhile, in the collection flow paths that collect the ink, as illustrated in FIG. 25B, the ink is collected from portions in which the ink collection flow paths 49 of the first support member 4 and the plate collection ports 312 of the aperture plate 330 overlap and communicate with each other. As illustrated in FIG. 25C, in the ejection unit 3, the aperture plate 330 also locally has a region where no opening is provided. In such a region, the ink is neither supplied nor collected between the recording element substrate 340 and the first support member 4. As illustrated in FIG. 25A, the ink is supplied in regions where the plate supply ports 311 are provided while, as illustrated in FIG. 25B, the ink is collected in regions where the plate collection ports 312 are provided. Note that, in the present embodiment, a configuration using the aperture plate 330 has been described as an example, but it may also be possible to use a mode in which the aperture plate 330 is not used. For example, it may also be possible to use a configuration in which flow paths corresponding to the ink supply flow paths 48 and the ink collection flow paths 49 are formed in the first support member 4, and the recording element substrate 340 is bonded to the first support member 4.

Figure 26A:
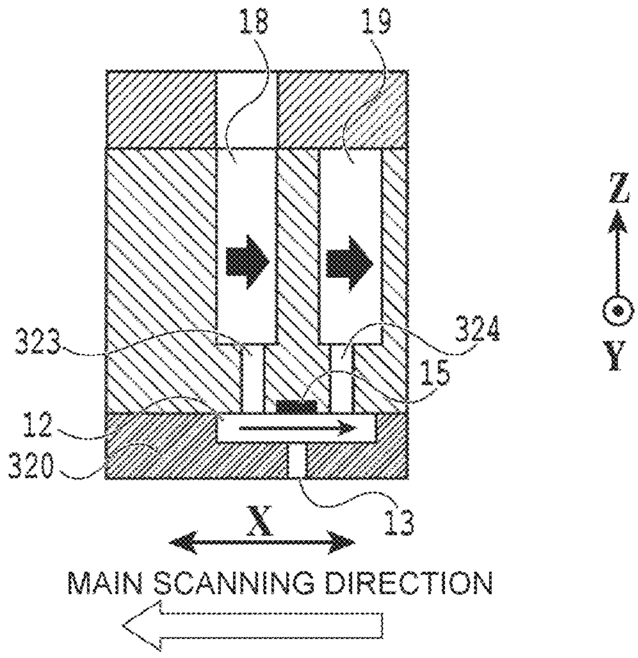
FIG. 26A and FIG. 26B are cross-sectional views each illustrating the vicinity of ejection ports.
Figure 26B:
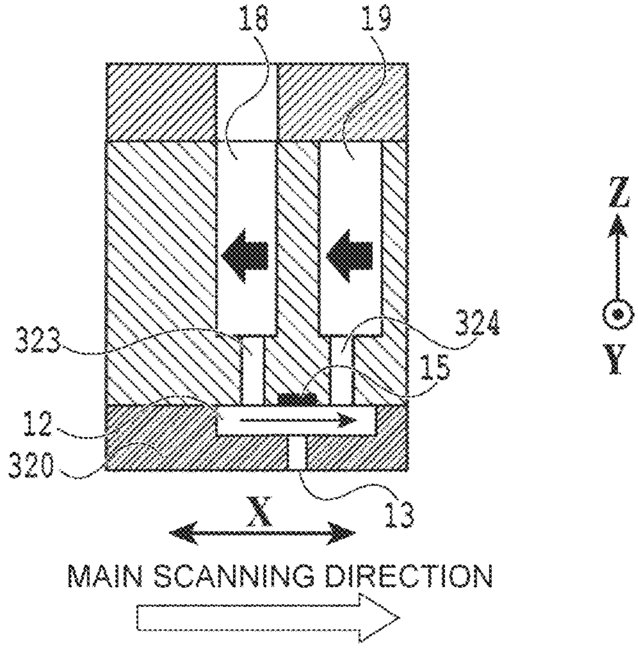
Figure 27A:
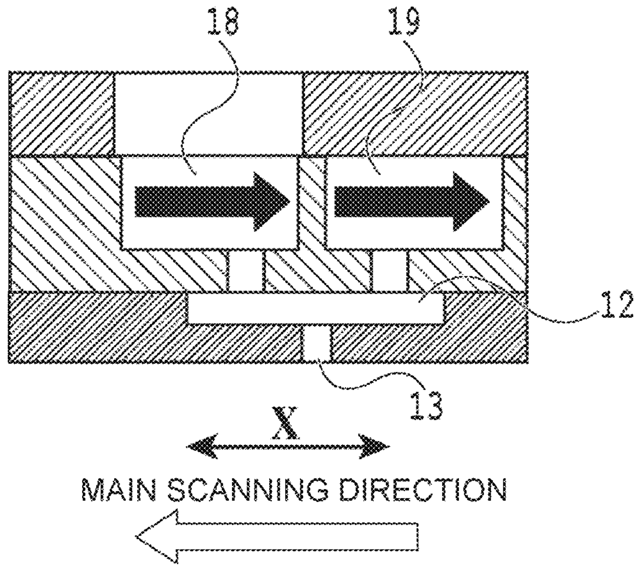
FIG. 27A and FIG. 27B are cross-sectional views each illustrating a comparative example of the vicinity of the ejection port.
Figure 27B:
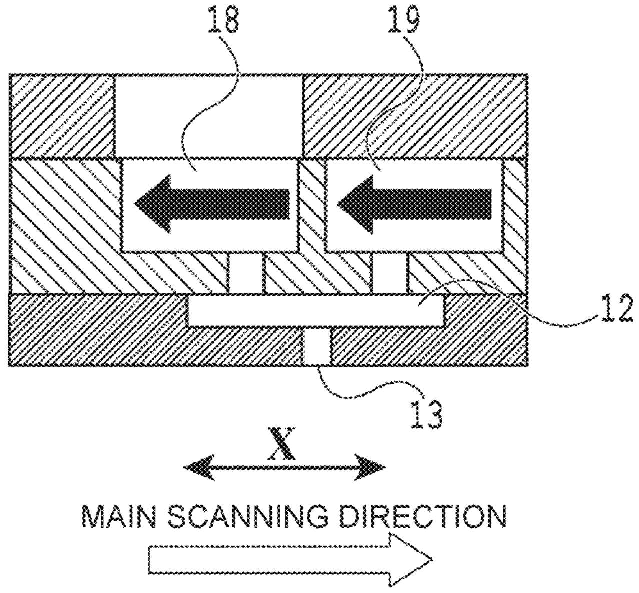

FIG. 26A and FIG. 26B are cross-sectional views illustrating the vicinity of the ejection ports 13 in the ejection module 300. FIG. 27A and FIG. 27B are cross-sectional views illustrating, as a comparative example, an ejection module having a configuration in which each of the common supply flow paths 18 and the common collection flow paths 19 is expanded in the X-direction. Note that each of thick arrows illustrated in the common supply flow path 18 and the common collection flow path 19 in FIG. 26A, FIG. 26B, FIG. 27A, and FIG. 27B indicates a swaying motion of the ink in a mode using the serial-type liquid ejection apparatus 50. The ink supplied to the pressure chamber 12 through the common supply flow path 18 and the supply connection flow path 323 is ejected from the ejection port 13 as a result of the driving of the ejection element 15. When the ejection element 15 is not driven, the ink is collected from the pressure chamber 12 into the common collection flow path 19 through the collection connection flow path 324 serving as the collection flow path.

In the mode using the serial-type liquid ejection apparatus 50, when the ink thus circulating is ejected, the ejection of the ink is rather affected by the swaying motion of the ink in the ink flow paths caused by the main scanning with the liquid ejection head 1. Specifically, an effect of the swaying motion of the ink in the ink flow paths may appear as different amounts of ink ejection or displacement between ejection directions. As illustrated in FIG. 27A and FIG. 27B, when the common supply flow path 18 and the common collection flow path 19 have cross-sectional shapes which are wide in the X-direction corresponding to the main scanning direction, the ink in each of the common supply flow path 18 and the common collection flow path 19 is susceptible to an inertial force in the main scanning direction to undergo a large swaying motion. As a result, the swaying motion of the ink may affect the ejection of the ink from the ejection port 13. In addition, when the common supply flow path 18 and the common collection flow path 19 are expanded in the X-direction, distances between the colors are enlarged to possibly reduce a printing efficiency.

Accordingly, in each of cross sections illustrated in FIG. 26A and FIG. 26B, each of the common supply flow path 18 and the common collection flow path 19 in the present embodiment is configured to extend in the Y-direction, and also extend in the Z-direction perpendicular to the X-direction corresponding to the main scanning direction. Such a configuration can reduce each of flow path widths of the common supply flow path 18 and the common collection flow path 19 in the main scanning direction. By reducing each of the flow path widths of the common supply flow path 18 and the common collection flow path 19 in the main scanning direction, the swaying motion of the ink caused by the inertial forces (thick black arrows in the drawings) which are exerted, during the main scanning, on the ink in the common supply flow path 18 and the common collection flow path 19 on a side opposite to the main scanning direction is reduced. Thus, the effect exerted by the swaying motion of the ink on the ejection of the ink can be reduced. In addition, by extending the common supply flow path 18 and the common collection flow path 19 in the Z-direction, cross-sectional areas are increased, and pressure losses in the flow paths are reduced.

As described above, the configuration is provided in which each of the flow path widths of the common supply flow path 18 and the common collection flow path 19 in the main scanning direction is reduced so as to reduce the swaying motion of the ink in each of the common supply flow path 18 and the common collection flow path 19 during the main scanning, but the swaying motion is not completely eliminated. Accordingly, in order to reduce an ejection difference on a per ink type basis, which is still caused by the reduced swaying motion, in the present embodiment, the common supply flow path 18 and the common collection flow path 19 are configured to be disposed at positions overlapping each other in the Y-direction.

As described above, in the present embodiment, the supply connection flow path 323 and the collection connection flow path 324 are provided to correspond to the ejection port 13 and have a correspondence relationship therebetween such that the supply connection flow path 323 and the collection connection flow path 324 are disposed to be arranged in the X-direction with the ejection port 13 being interposed therebetween. If there are portions in which the common supply flow path 18 and the common collection flow path 19 do not overlap in the Y-direction, the correspondence relationship between the supply connection flow path 323 and the collection connection flow path 324 in the X-direction is no longer established. In that case, the ink flows and ink ejection in the X-direction in the pressure chamber 12 may be affected thereby. In addition, the effect of the swaying motion of the ink may further affect the ejection of the ink from each of the ejection ports 13.

Accordingly, in the embodiment, the common supply flow path 18 and the common collection flow path 19 are disposed at positions overlapping each other in the Y-direction. Consequently, at any position in the Y-direction in which the ejection ports 13 are arranged, the ink swaying motion during the main scanning is substantially equal in each of the common supply flow path 18 and the common collection flow path 19. As a result, there is no significant fluctuation in the pressure difference between the common supply flow path 18 side and the common collection flow path 19 side which is produced in the pressure chamber 12, and therefore stable ejection can be performed.

In a liquid ejection head in which ink is circulated, a flow path that supplies the ink to the liquid ejection head and a flow path that collects the ink may be formed of the same flow path but, in the present embodiment, the common supply flow path 18 and the common collection flow path 19 are provided as separate flow paths. In addition, the supply connection flow path 323 and the pressure chamber 12 communicate with each other, the pressure chamber 12 and the collection connection flow path 324 communicate with each other, and the ink is ejected from the ejection port 13 of the pressure chamber 12. In other words, the pressure chamber 12 serving as a route connecting the supply connection flow path 323 and the collection connection flow path 324 is configured to include the ejection port 13. Accordingly, in the pressure chamber 12, ink flows of the ink flowing from the supply connection flow path 323 side to the collection connection flow path 324 side are generated, and the ink in the pressure chamber 12 is efficiently circulated. The efficient circulation of the ink in the pressure chamber 12 allows the ink in the pressure chamber 12 susceptible to an effect of ink evaporation from the ejection port 13 to be held in a fresh state.

If it becomes necessary to perform the ejection at a high flow rate due to the communication of the two flow paths, which are the common supply flow path 18 and the common collection flow path 19, with the pressure chamber 12, it is also possible to supply the ink from the both flow paths. In other words, the configuration in the present embodiment is advantageous over a configuration in which the supply and collection of the ink is implemented by only one flow path in that not only the circulation can efficiently be performed, but also the high-flow-rate ejection can also be performed.

The common supply flow path 18 and the common collection flow path 19, which are disposed at positions closer to each other in the X-direction, are less likely to be affected by the swaying motion of the ink. Preferably, the flow paths are configured to have an interval of 75 μm to 100 μm therebetween.

Figure 28:
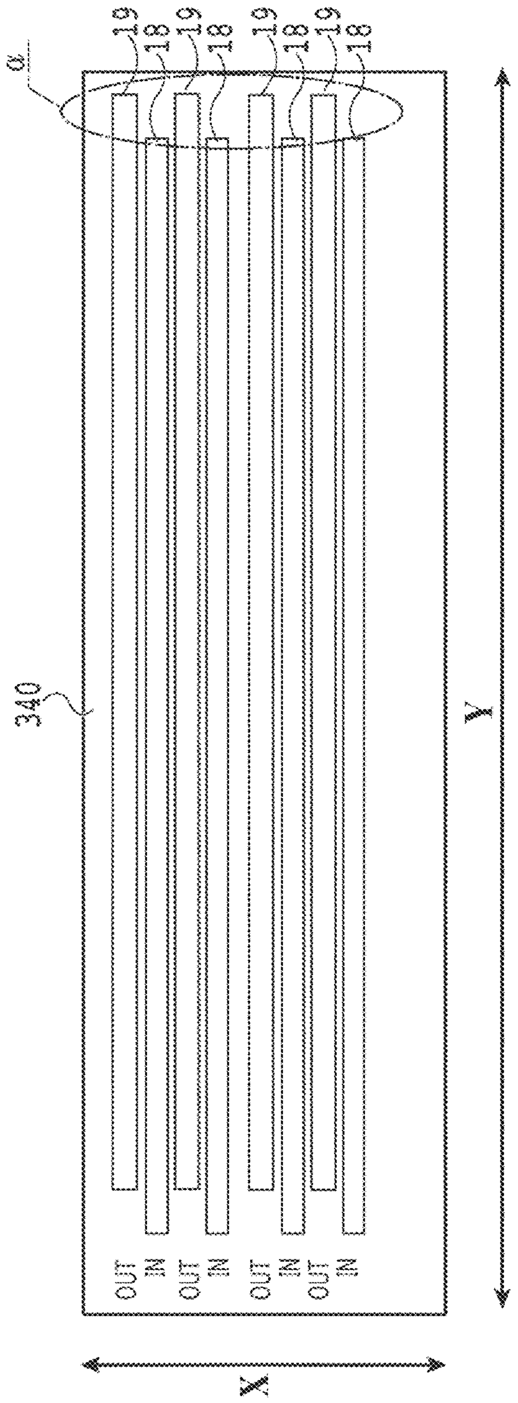
FIG. 28 is a diagram illustrating a comparative example of the ejection element substrate.

FIG. 28 is a diagram illustrating the recording element substrate 340 as a comparative example. Note that, in FIG. 28, illustration of the supply connection flow paths 323 and the collection connection flow paths 324 is omitted. Into the common collection flow paths 19, the inks that have received thermal energy resulting from the ejection elements 15 in the pressure chambers 12 flow, and accordingly the inks at relatively high temperatures compared to temperatures of the inks in the common supply flow paths 18 flow. At this time, in the comparative example, the recording element substrate 340 partly has a portion in the Y-direction in which only the common collection flow paths 19 are present, such as a portion a enclosed by a dot-dash line in FIG. 28. In other words, the common supply flow paths 18 and the common collection flow paths 19 do not overlap each other in at least one portion in the Y-direction. In this case, the temperature locally increases in that portion to result an uneven temperature in the ejection module 300, which may affect the ejection.

In the common supply flow paths 18, the inks at temperatures relatively lower than those in the common collection flow paths 19 flow. Accordingly, when the common supply flow paths 18 and the common collection flow paths 19 are adjacent to each other, the temperatures in the respective portions of the common supply flow paths 18 and the common collection flow paths 19 cancel out each other in the vicinities thereof, and consequently a temperature increase is suppressed. Therefore, the common supply flow paths 18 and the common collection flow paths 19 preferably have approximately equal lengths in the Y-direction, are located at positions overlapping each other in a substantially entire region in the Y-direction, and are adjacent to each other.

Figure 29A:
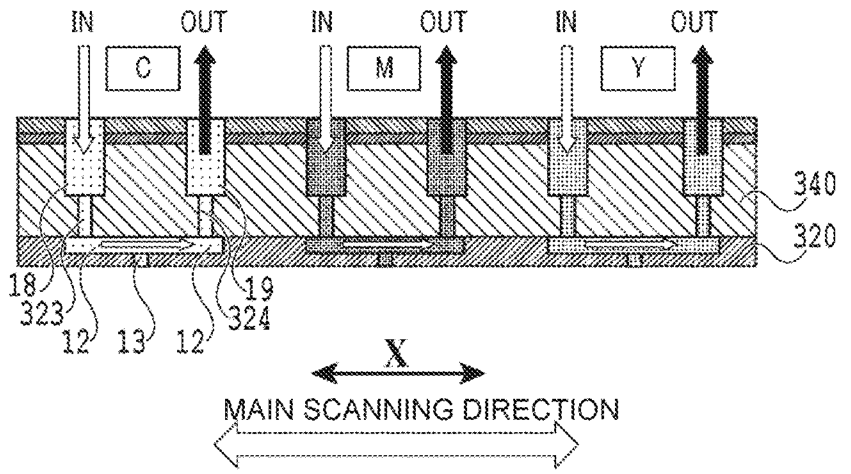
FIG. 29A and FIG. 29B are diagrams each illustrating a flow path configuration of the liquid ejection head.
Figure 29B:
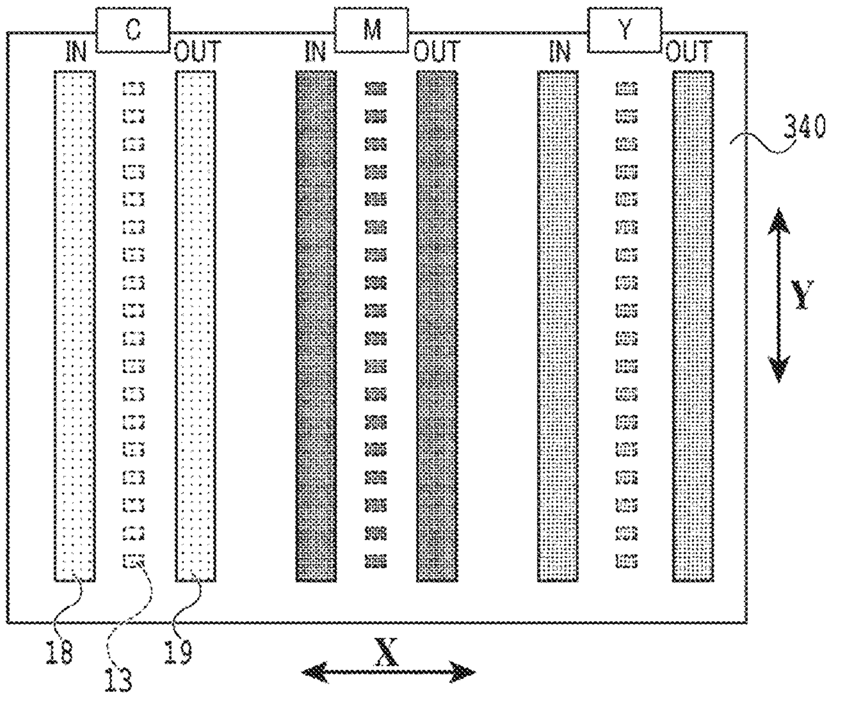

FIG. 29A and FIG. 29B are diagrams illustrating a flow path configuration of the liquid ejection head 1 corresponding to the inks in three colors, which are cyan (C), magenta (M), and yellow (Y). In the liquid ejection head 1, as illustrated in FIG. 29A, the circulation flow paths are provided for the individual types of the inks. The pressure chambers 12 are provided along the X-direction serving as the main scanning direction of the liquid ejection head 1. In addition, as illustrated in FIG. 29B, the common supply flow path 18 and the common collection flow path 19 are provided along the ejection port train in which the ejection ports 13 are arranged so as to extend in the Y-direction such that the ejection port train is interposed between the common supply flow path 18 and the common collection flow path 19.

Connection Between Main Body Portion and Liquid Ejection Head

Figure 30:
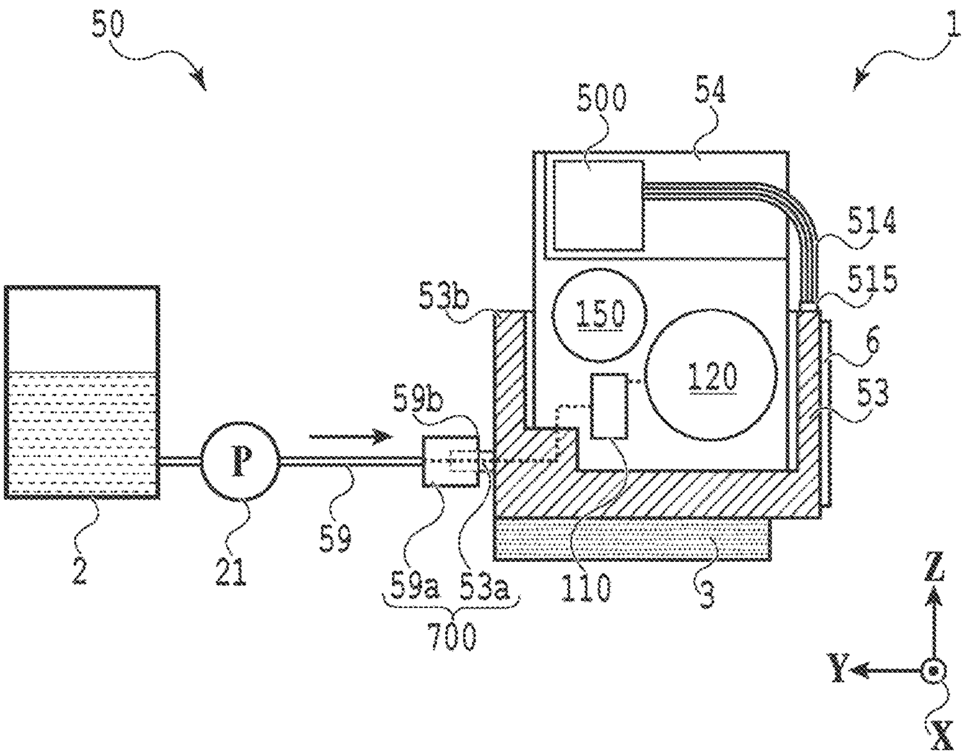
FIG. 30 is a diagram illustrating a state of connection between a main body portion of the liquid ejection apparatus and the liquid ejection head.

FIG. 30 is a schematic configuration diagram illustrating states of connection between the ink tank 2 and the external pump 21 which are provided in the main body portion of the liquid ejection apparatus 50 and the liquid ejection head 1 in the present embodiment and a location of the circulation pump 500 or the like in greater detail. The liquid ejection apparatus 50 in the present embodiment has a configuration which allows easy replacement of only the liquid ejection head 1 when a problem occurs in the liquid ejection head 1. Specifically, the liquid ejection apparatus 50 has a liquid connection portion 700 which allows easy connection and separation between the ink supply tube 59 connected to the external pump 21 and the liquid ejection head 1. This allows only the liquid ejection head 1 to be attached and detached to and from the liquid ejection apparatus 50.

As illustrated in FIG. 30, the liquid connection portion 700 has a liquid connector insertion port **53*a* provided in the head housing 53 of the liquid ejection head 1 to protrude therefrom and a cylindrical liquid connector 59*a* which can be inserted into the liquid connector insertion port 53*a*. The liquid connector insertion port 53*a* is fluidly connected to the ink supply flow path (inlet flow path) formed in the liquid ejection head 1 to be connected to the first pressure adjustment unit 120 via the filter 110 described previously. The liquid connector 59*a* is provided at a leading end of the ink supply tube 59 connected to the external pump 21 that supplies the ink in the ink tank 2 to the liquid ejection head 1** under a pressure.

As described above, the liquid ejection head 1 illustrated in FIG. 30 uses the liquid connection portion 700 to allow an operation of attaching/detaching and replacing the liquid ejection head 1 to be easily performed. However, when a sealing property between the liquid connector insertion port **53*a* and the liquid connector 59*a* deteriorates, the ink supplied by the external pump 21 under the pressure may leak out of the liquid connection portion 700. When the ink that has leaked out adheres to the circulation pump 500** or the like, a problem may occur in an electric system. To prevent this, in the present embodiment, the circulation pump and the like are placed as follows.

Placement of Circulation Pump, Etc.

As illustrated in FIG. 30, in the present embodiment, to avoid adhesion of the ink that has leaked out of the liquid connection portion 700 to the circulation pump 500, the circulation pump 500 is placed above the liquid connection portion 700 in a gravity force direction. In other words, the circulation pump 500 is placed above the liquid connector insertion port **53*a* serving as a liquid inlet port of the liquid ejection head 1 in the gravity force direction. Additionally, the circulation pump 500 is placed at a position at which the circulation pump 500 is in non-contact with the members forming the liquid connection portion 700. As a result, even when the ink leaks out of the liquid connection portion 700, the ink flows in a horizontal direction corresponding to a direction in which the liquid connector 59*a* is open or downward in the gravity force direction, and accordingly it is possible to inhibit the ink from reaching the circulation pump 500 located thereabove in the gravity force direction. In addition, since the circulation pump 500 is placed at a position away from the liquid connection portion 700, a possibility that the ink follows the members to reach the circulation pump 500** is also reduced.

Moreover, an electrical connection portion 515 that electrically connects the circulation pump 500 and the electric contact substrate 6 via a flexible wiring member 514 is provided above the liquid connection portion 700 in the gravity force direction. This can reduce a possibility that electric trouble is caused by the ink from the liquid connection portion 700.

In addition, in the present embodiment, the wall portion **53*b* of the head housing 53 is provided and accordingly, even when the ink is emitted from an opening 59*b* of the liquid connection portion 700, it is possible to block the ink and reduce a possibility that the ink reaches the circulation pump 500 or the electrical connection portion 515**.

According to the present disclosure, in a head unit of an inkjet recording apparatus capable of recording using color inks, a white ink, and reaction liquids, it is possible to allow both a size reduction of the head unit and easy replacement of a head.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-078544, filed on May 11, 2023, which is hereby incorporated by reference herein in its entirety.

What is claimed is:

1. A head unit of an inkjet recording apparatus, the head unit comprising a plurality of heads formed with nozzle arrays each including a plurality of nozzles that eject a liquid and performing recording by ejecting the liquid onto a recording medium, while reciprocating in a main scanning direction, wherein the plurality of heads includes:

a first head formed with (i) a nozzle array for a reaction liquid for a white ink, the reaction liquid for the white ink reacting with the white ink, and (ii) a nozzle array for a reaction liquid for a color ink, the reaction liquid for the color ink reacting with the color ink; and a second head formed with a nozzle array that ejects the color ink and with a nozzle array that ejects the white ink, the first head and the second head are disposed to be arranged along the main scanning direction, the head unit has a first end portion which is one end portion of the head unit in the main scanning direction and a second end portion which is another end portion of the head unit in the main scanning direction, the second head is disposed closer to the second end portion than the first head, in the first head, the nozzle array for the reaction liquid for the white ink is formed at a position closest to the first end portion, and in the second head, the nozzle array for the white ink is formed at a position closest to the second end portion.

2. A head unit of an inkjet recording apparatus, the head unit comprising a plurality of heads formed with nozzle arrays each including a plurality of nozzles that eject a liquid and performing recording by ejecting the liquid onto a recording medium, while reciprocating in a main scanning direction, wherein the plurality of heads includes:

a first head formed with (i) a nozzle array for a reaction liquid for a white ink, the reaction liquid for the white ink reacting with the white ink, and (ii) a nozzle array for a reaction liquid for a color ink, the reaction liquid for the color ink reacting with the color ink;

a second head formed with a nozzle array that ejects the color ink; and a third head formed with a nozzle array that ejects the white ink, the first head, the second head, and the third head are disposed to be arranged along the main scanning direction, the head unit has a first end portion which is one end portion of the head unit in the main scanning direction and a second end portion which is another end portion of the head unit in the main scanning direction, the third head is disposed closer to the second end portion than the first head, in the first head, the nozzle array for the reaction liquid for the white ink is formed at a position closest to the first end portion, and in the third head, the nozzle array for the white ink is formed at a position closest to the second end portion.

3. The head unit according to claim 2, wherein the third head is formed with the nozzle array for the white ink and with a nozzle array for the color ink, and in the third head, the nozzle array for the white ink is formed at a position closest to the second end portion.

4. The head unit according to claim 3, wherein the third head is further formed with a nozzle array for a gray ink, and in the third head, the nozzle array for the gray ink is formed to be adjacent to the nozzle array for the white ink and closer to the first end portion than the nozzle array for the white ink.

5. The head unit according to claim 3, wherein the second head is disposed closer to the second end portion than the first head, and the third head is disposed closer to the second end portion than the second head.

6. A head unit of an inkjet recording apparatus, the head unit comprising a plurality of heads formed with nozzle arrays each including a plurality of nozzles that eject a liquid and performing recording by ejecting the liquid onto a recording medium, while reciprocating in a main scanning direction, wherein the plurality of heads includes:

a first head formed with (i) a nozzle array for a reaction liquid for a white ink, the reaction liquid for the white ink reacting with the white ink, (ii) a nozzle array for the white ink, and (iii) a nozzle array for a reaction liquid for a color ink, the reaction liquid for the color ink reacting with the color ink;

a second head formed with a nozzle array that ejects the color ink; and a third head formed with (i) a nozzle array for the reaction liquid for the color ink, (ii) a nozzle array for the white ink, and (iii) a nozzle array for the reaction liquid for the white ink, the first head, the second head, and the third head are disposed to be arranged along the main scanning direction, the head unit has a first end portion which is one end portion of the head unit in the main scanning direction and a second end portion which is another end portion of the head unit in the main scanning direction, the third head is disposed closer to the second end portion than the first head, in the first head, the nozzle array for the reaction liquid for the white ink is formed at a position closest to the first end portion, and in the third head, the nozzle array for the reaction liquid for the white ink is formed at a position closest to the second end portion and the nozzle array for the white ink is formed at a position adjacent to the nozzle array for the reaction liquid for the white ink.

7. The head unit according to claim 6, wherein in the first head, the nozzle array for the reaction liquid for the white ink, the nozzle array for the white ink, and the nozzle array for the reaction liquid for the color ink are formed in this order from a side closest to the first end portion, and in the third head, the nozzle array for the reaction liquid for the white ink, the nozzle array for the white ink, and the nozzle array for the reaction liquid for the color ink are formed in this order from a side closest to the second end portion.

8. The head unit according to claim 1, further comprising:

a circulation device that supplies, for each of the liquids which are the color ink, the white ink, the reaction liquid for the white ink, and the reaction liquid for the color ink, the liquid to the nozzles, collects the liquid that has not been ejected from the nozzles, and supplies the liquid to the nozzles again.

9. The head unit according to claim 8, wherein, to the circulation device, the liquid is supplied from a tank included in an apparatus main body of the inkjet recording apparatus.

10. An inkjet recording apparatus comprising:

the head unit according to claim 1;

a carriage on which the head unit is to be mounted; and a drive unit that reciprocates the carriage in the main scanning direction, wherein of a range of the recording medium on which the recording is performed, an end portion closer to the first end portion in the main scanning direction is a third end portion and an end portion closer to the second end portion in the main scanning direction is a fourth end portion, and in a printing mode in which the recording is performed using only the color ink, when moving the carriage in a direction toward the first end portion, the drive unit moves the carriage to a position where the nozzle array for the color ink adjacent to the nozzle array for the white ink in the second head passes through the third end portion, and when moving the carriage in a direction toward the second end portion, the drive unit moves the carriage to a position where the nozzle array for the color ink which is at a position closest to the first end portion in the second head passes through the fourth end portion.

11. An inkjet recording apparatus comprising:

the head unit according to claim 1;

a carriage on which the head unit is to be mounted; and a drive unit that reciprocates the carriage in the main scanning direction, wherein of a range of the recording medium in which the recording is performed, an end portion closer to the first end portion in the main scanning direction is a third end portion and an end portion closer to the second end portion in the main scanning direction is a fourth end portion, and in a printing mode in which the recording is performed using only the color ink and the white ink, when moving the carriage in a direction toward the first end portion, the drive unit moves the carriage to a position where the nozzle array for the white ink in the second head passes through the third end portion, and when moving the carriage in a direction toward the second end portion, the drive unit moves the carriage to a position where the nozzle array for the color ink which is at a position closest to the first end portion in the second head passes through the fourth end portion.

12. An inkjet recording apparatus comprising:

the head unit according to claim 1;

a carriage on which the head unit is to be mounted; and a drive unit that reciprocates the carriage in the main scanning direction, wherein of a range of the recording medium in which the recording is performed, an end portion closer to the first end portion in the main scanning direction is a third end portion and an end portion closer to the second end portion in the main scanning direction is a fourth end portion, and in a printing mode in which the recording is performed using only the color ink and the reaction liquid for the color ink, when moving the carriage in a direction toward the first end portion, the drive unit moves the carriage to a position where the nozzle array for the color ink adjacent to the nozzle array for the white ink in the second head passes through the third end portion, and when moving the carriage in a direction toward the second end portion, the drive unit moves the carriage to a position where the nozzle array for the reaction liquid for the color ink in the first head passes through the fourth end portion.

13. An inkjet recording apparatus comprising:

the head unit according to claim 3;

a carriage on which the head unit is to be mounted; and a drive unit that reciprocates the carriage in the main scanning direction, wherein of a range of the recording medium in which the recording is performed, an end portion closer to the first end portion in the main scanning direction is a third end portion and an end portion closer to the second end portion in the main scanning direction is a fourth end portion, and in a printing mode in which the recording is performed using only the color ink, when moving the carriage in a direction toward the first end portion, the drive unit moves the carriage to a position where the nozzle array for the color ink adjacent to the nozzle array for the white ink in the third head passes through the third end portion, and when moving the carriage in a direction toward the second end portion, the drive unit moves the carriage to a position where the nozzle array for the color ink which is at a position closest to the first end portion in the second head passes through the fourth end portion.

14. An inkjet recording apparatus comprising:

the head unit according to claim 2;

a carriage on which the head unit is to be mounted; and a drive unit that reciprocates the carriage in the main scanning direction, wherein of a range of the recording medium in which the recording is performed, an end portion closer to the first end portion in the main scanning direction is a third end portion and an end portion closer to the second end portion in the main scanning direction is a fourth end portion, and in a printing mode in which the recording is performed using only the color ink and the white ink, when moving the carriage in a direction toward the first end portion, the drive unit moves the carriage to a position where the nozzle array for the white ink in the third head passes through the third end portion, and when moving the carriage in a direction toward the second end portion, the drive unit moves the carriage to a position where the nozzle array for the color ink which is at a position closest to the first end portion in the second head passes through the fourth end portion.

15. An inkjet recording apparatus comprising:

the head unit according to claim 5;

a carriage on which the head unit is to be mounted; and a drive unit that reciprocates the carriage in the main scanning direction, wherein of a range of the recording medium in which the recording is performed, an end portion closer to the first end portion in the main scanning direction is a third end portion and an end portion closer to the second end portion in the main scanning direction is a fourth end portion, and in a printing mode in which the recording is performed using only the color ink and the reaction liquid for the color ink, when moving the carriage in a direction toward the first end portion, the drive unit moves the carriage to a position where the nozzle array for the color ink adjacent to the nozzle array for the white ink in the third head passes through the third end portion, and when moving the carriage in a direction toward the second end, the drive unit moves the carriage to a position where the nozzle array for the reaction liquid for the color ink in the first head passes through the fourth end portion.

16. An inkjet recording apparatus comprising:

the head unit according to claim 6;

a carriage on which the head unit is to be mounted; and a drive unit that reciprocates the carriage in the main scanning direction, wherein of a range of the recording medium in which the recording is performed, an end portion closer to the first end portion in the main scanning direction is a third end portion and an end portion closer to the second end portion in the main scanning direction is a fourth end portion, and in a printing mode in which the recording is performed using only the color ink, when moving the carriage in a direction toward the first end portion, the drive unit moves the carriage to a position where the nozzle array for the color ink which is at a position closest to the second end portion in the second head passes through the third end portion, and when moving the carriage in a direction toward the second end portion, the drive unit moves the carriage to a position where the nozzle array for the color ink which is at a position closest to the first end portion in the second head passes through the fourth end portion.

17. An inkjet recording apparatus comprising:

the head unit according to claim 6;

a carriage on which the head unit is to be mounted; and a drive unit that reciprocates the carriage in the main scanning direction, wherein of a range of the recording medium in which the recording is performed, an end portion closer to the first end portion in the main scanning direction is a third end portion and an end portion closer to the second end portion in the main scanning direction is a fourth end portion, and in a printing mode in which the recording is performed using only the color ink and the white ink, when moving the carriage in a direction toward the first end portion, the drive unit moves the carriage to a position where the nozzle array for the white ink in the third head passes through the third end portion, and when moving the carriage in a direction toward the second end portion, the drive unit moves the carriage to a position where the nozzle array for the white ink in the first head passes through the fourth end portion.

18. An inkjet recording apparatus comprising:

the head unit according to claim 7;

a carriage on which the head unit is to be mounted; and a drive unit that reciprocates the carriage in the main scanning direction, wherein of a range of the recording medium in which the recording is performed, an end portion closer to the first end portion in the main scanning direction is a third end portion and an end portion closer to the second end portion in the main scanning direction is a fourth end portion, and wherein, in a printing mode in which the recording is performed using only the color ink and the reaction liquid for the color ink, when moving the carriage in a direction toward the first end portion, the drive unit moves the carriage to a position where the nozzle array for the reaction liquid for the color ink in the third head passes through the third end portion, and when moving the carriage in a direction toward the second end, the drive unit moves the carriage to a position where the nozzle array for the reaction liquid for the color ink in the first head passes through the fourth end portion.

* * * * *